(12) United States Patent
Zhu et al.

(10) Patent No.: US 12,041,223 B2
(45) Date of Patent: Jul. 16, 2024

(54) CHROMA INTRA MODE DERIVATION IN SCREEN CONTENT CODING

(71) Applicant: Bytedance Inc., Los Angeles, CA (US)

(72) Inventors: Weijia Zhu, San Diego, CA (US); Li Zhang, San Diego, CA (US); Jizheng Xu, San Diego, CA (US)

(73) Assignee: BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/888,956

(22) Filed: Aug. 16, 2022

(65) Prior Publication Data

US 2022/0400252 A1    Dec. 15, 2022

Related U.S. Application Data

(63) Continuation of application No. 17/528,288, filed on Nov. 17, 2021, now Pat. No. 11,445,183, which is a
(Continued)

(30) Foreign Application Priority Data

Jun. 28, 2019  (WO) ................ PCT/CN2019/093852
Jun. 29, 2019  (WO) ................ PCT/CN2019/093982

(51) Int. Cl.
*H04N 19/105*  (2014.01)
*H04N 19/132*  (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
CPC .. H04N 19/105; H04N 19/124; H04N 19/129; H04N 19/186; H04N 19/70; H04N 19/132; H04N 19/11; H04N 19/159
See application file for complete search history.

(56) References Cited

U.S. PATENT DOCUMENTS 9,432,667 B2    8/2016  Seregin et al.
9,860,559 B2    1/2018  Zhang et al.
(Continued)

FOREIGN PATENT DOCUMENTS

CN        105934948 A        9/2016
CN        107005717 A        8/2017
(Continued)

OTHER PUBLICATIONS

Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.
(Continued)

*Primary Examiner* — Mainul Hasan
(74) *Attorney, Agent, or Firm* — Conley Rose, P.C.

(57) ABSTRACT

A method includes deriving, for a current video block of a video that is a chroma block and coded in a chroma derived mode (DM), an intra prediction mode for the current video block according to a rule related to a coding mode of the current video block; and performing a conversion between the current video block and a coded presentation of the video, wherein the rule specifies to derive the intra prediction mode based on an intra prediction direction of a corresponding luma block used to derive the chroma DM mode and coded using a block differential pulse code modulation representation of a quantized residual block corresponding to the current video block.

20 Claims, 25 Drawing Sheets

Related U.S. Application Data continuation of application No. PCT/US2020/040027, filed on Jun. 28, 2020.

(51) Int. Cl.
*H04N 19/159* (2014.01)
*H04N 19/176* (2014.01)
*H04N 19/186* (2014.01)
*H04N 19/70* (2014.01)

(52) U.S. Cl.
CPC ......... *H04N 19/176* (2014.11); *H04N 19/186* (2014.11); *H04N 19/70* (2014.11)

(56) References Cited

U.S. PATENT DOCUMENTS

| | | | |
|---|---|---|---|
| 10,306,240 | B2 | 5/2019 | Xiu et al. |
| 10,484,721 | B2 | 11/2019 | Rapaka et al. |
| 10,820,015 | B2 | 10/2020 | Zhang et al. |
| 2008/0136974 | A1 | 6/2008 | Yuan et al. |
| 2013/0294524 | A1 | 11/2013 | Van Der Auwera et al. |
| 2013/0343464 | A1 | 12/2013 | Van der Auwera |
| 2014/0314142 | A1 | 10/2014 | Oh |
| 2014/0327831 | A1 | 11/2014 | Liu et al. |
| 2015/0341673 | A1 | 11/2015 | Joshi et al. |
| 2015/0358631 | A1 | 12/2015 | Zhang |
| 2015/0373327 | A1 | 12/2015 | Zhang |
| 2016/0100179 | A1 | 4/2016 | He et al. |
| 2016/0227239 | A1 | 8/2016 | Pu et al. |
| 2016/0261865 | A1 | 9/2016 | Li et al. |
| 2016/0353111 | A1 | 12/2016 | Zhang et al. |
| 2016/0353112 | A1 | 12/2016 | Zhang |
| 2017/0085891 | A1 | 3/2017 | Seregin et al. |
| 2017/0238001 | A1 | 8/2017 | Li |
| 2017/0374372 | A1 | 12/2017 | Liu et al. |
| 2018/0124398 | A1 | 5/2018 | Park et al. |
| 2018/0205946 | A1 | 7/2018 | Zhang et al. |
| 2018/0213214 | A1 | 7/2018 | Li et al. |
| 2018/0213222 | A1 | 7/2018 | Lee et al. |
| 2018/0241995 | A1* | 8/2018 | Son .................. H04N 19/11 |
| 2019/0116380 | A1 | 4/2019 | Chuang et al. |
| 2019/0158854 | A1 | 5/2019 | He et al. |
| 2019/0166370 | A1 | 5/2019 | Xiu et al. |
| 2019/0182482 | A1 | 6/2019 | Vanam et al. |
| 2019/0238864 | A1 | 8/2019 | Xiu et al. |
| 2019/0281311 | A1 | 9/2019 | Ye et al. |
| 2020/0045322 | A1 | 2/2020 | Ye et al. |
| 2020/0092546 | A1* | 3/2020 | Ye .................. H04N 19/186 |
| 2020/0275121 | A1 | 8/2020 | Zhao et al. |
| 2020/0296381 | A1* | 9/2020 | Coban .............. H04N 19/593 |
| 2020/0404324 | A1 | 12/2020 | Pham Van et al. |
| 2020/0413092 | A1* | 12/2020 | Ray .................. H04N 19/13 |
| 2021/0136395 | A1 | 5/2021 | Jun et al. |
| 2021/0344961 | A1 | 11/2021 | Zhao |
| 2022/0021902 | A1* | 1/2022 | Choi ............... H04N 19/105 |
| 2022/0046255 | A1 | 2/2022 | Zhu et al. |
| 2022/0078427 | A1 | 3/2022 | Zhu et al. |
| 2022/0232205 | A1* | 7/2022 | Chiang ............ H04N 19/157 |
| 2022/0248036 | A1* | 8/2022 | Choi ............... H04N 19/182 |
| 2022/0295102 | A1 | 9/2022 | Zhao |

FOREIGN PATENT DOCUMENTS

| | | |
|---|---|---|
| CN | 108028940 A | 5/2018 |
| CN | 109792516 A | 5/2019 |
| CN | 113574894 A | 10/2021 |
| EP | 3123716 A1 | 2/2017 |
| JP | 2018532319 A | 11/2018 |
| JP | 2020017970 A | 1/2020 |
| JP | 2022514921 A | 2/2022 |
| KR | 20180056687 A | 5/2018 |
| KR | 20210068513 A | 6/2021 |
| TW | 201806384 A | 2/2018 |
| WO | 2015138927 A1 | 9/2015 |
| WO | 2017049119 A1 | 3/2017 |
| WO | 2017206805 A1 | 12/2017 |
| WO | 2018064948 A1 | 4/2018 |
| WO | 2019112394 A1 | 6/2019 |
| WO | WO-2020213931 A1 * | 10/2020 ........... H04N 19/124 |
| WO | 2020223449 A1 | 11/2020 |
| WO | 2021003241 A1 | 1/2021 |

OTHER PUBLICATIONS

Bossen, F., Retrieved From the Internet: vcgit.hhi.fraunhofer.de/jvet/VVCSoftware_VTM/tags/VTM-4.0, Oct. 27, 2022, 2 pages.

Document: JVET-N0843-v1, Xu, X., et al., "CE8-related: Combination test of JVET-N0176/JVET-N0317/JVET-N0382 on simplification of IBC vector prediction," Joint Video Experts Team (JVET) of ITU-T SG 16 WP 3 and ISO/IEC JTC 1/SC 29/WG 11 14th Meeting: Geneva, CH, Mar. 19-27, 2019, 11 pages.

Document: JVET-M0464-v4, Bross, B., et al., "Non-CE8: Unified Transform Type Signalling and Residual Coding for Transform Skip," Joint Video Experts Team (JVET) of ITU-T SG 16 WP 3 and ISO/IEC JTC 1/SC 29/WG 11 13th Meeting: Marrakech, MA, Jan. 9-18, 2019, 13 pages.

Document: JVET-N0280, Bross, B., et al., "CE8: Residual Coding for Transform Skip Mode (CE8-4.3a, CE8-4.3b, CE8-4.4a, and CE8-4.4b)," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.

Document: JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.

Document: JVET-K0353-v1, Misra, K., et al., "CE1: Shared-separate partition tree in QT+BT configuration (Tests 5.3.1 and 5.4.1)," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.

Document: JVET-K0354-v1, Misra, K., et al., "CE1: Shared-separate partition tree in QT+BT+TT configuration (Tests 5.3.2 and 5.4.2)," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.

Document: JVET-M0471, Ikeda, M., et al., "CE11.1.6, CE11.1.7 and CE11.1.8: Joint proposals for long deblocking from Sony, Qualcomm, Sharp, Ericsson," Joint Video Experts Team (JVET) of ITU-T SG 16 WP 3 and ISO/IEC JTC 1/SC 29/WG 11 13th Meeting: Marrakesh, MA, Jan. 9-18, 2019, 11 pages.

Document: JVET-M0051, Sun, Y-C., et al., "CE8: Palette mode and intra mode combination (Test8.2.2)," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.

Document: JVET-N0259-v1, Zhu, W., et al., "CE8-related: Compound Palette Mode," Joint Video Experts Team (JVET) of ITU-T SG 16 WP 3 and ISO/IEC JTC 1/SC 29/WG 11 14th Meeting: Geneva, CH, Mar. 19-27, 2019, 14 pages.

Document: JVET-N0185-r2, Wang, B., et al., "CE3-related: A unified MPM list for intra mode coding," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.

Document: JVET-N1001-v6, Bross, B., et al., "Versatile Video Coding (Draft 5), " Joint Video Experts Team (JVET) of ITU-T SG 16 WP 3 and ISO/IEC JTC 1/SC 29/WG 11 14th Meeting: Geneva, CH, Mar. 19-27, 2019, 384 pages.

"Information Technology—High efficiency coding and media delivery in heterogeneous envoironments—Part 2: High Efficiency Video Coding," ISO/IEC Dis 23008/2:201x (4th Ed.), ISO/IEC JTC 1/SC 29/WG 11 N17661, Apr. 20, 2018, 8 pages.

Document: JVET-L0427-v1, Chernyak, R., et al., "CE15-related: Separate Palette Coding for Luma and Chroma components," Joint Video Experts Team (JVET) of ITU-T SG 16 WP 3 and ISO/IEC JTC 1/SC 29/WG 11 12th Meeting: Macao, CN, Oct. 3-12, 2018, 15 pages.

JVET-O0405-v1, Nguyen, T., et al., "Non-CE8: Minimum Allowed QP for Transform Skip Mode," Joint Video Experts Team (JVET) of ITU-T SG 16 WP 3 and ISO/IEC JTC 1/SC 29/WG 11 15th

(56) References Cited

OTHER PUBLICATIONS

Meeting: Gothenburg, SE, Jul. 3-12, 2019, 3 pages.
JVET-O0919-v2, Karczewicz, M., et al., "Non-CE8 : Minimum QP for Transform Skip Mode," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
Foreign Communication From A Related Counterpart Application, International Application No. PCT/US2020/034913, English Translation of International Search Report dated Sep. 25, 2020, 6 pages.
Foreign Communication From A Related Counterpart Application, European Application No. 20814223.2, Extended European Search Report dated May 25, 2022, 12 pages.
Foreign Communication From A Related Counterpart Application, Indian Application No. 202147055472, English Translation of Indian Office Action dated Jul. 4, 2022, 7 pages.
Office Action dated Jan. 31, 2022, 17 pages, U.S. Appl. No. 17/502,280, filed Oct. 15, 2021.
Foreign Communication From A Related Counterpart Application, International Application No. PCT/US2020/40027, English Translation of International Search Report dated Oct. 2, 2020, 4 pages.
Office Action dated Feb. 3, 2022, 10 pages, U.S. Appl. No. 17/528,288, filed Nov. 17, 2021.
Foreign Communication From A Related Counterpart Application, International Application No. PCT/US2020/40028, English Translation of International Search Report dated Sep. 28, 2020, 4 pages.
Foreign Communication From A Related Counterpart Application, European Application No. 20833143.9, Extended European Search Report dated Jun. 22, 2022, 11 pages.
Foreign Communication From A Related Counterpart Application, Indian Application No. 202147061320, English Translation of Indian Office Action dated Jul. 11, 2022, 6 pages.
Office Action dated Feb. 7, 2022, 9 pages, U.S. Appl. No. 17/528,312, filed Nov. 17, 2021.
Document: JVET-O0296-v1, Chiang, M., et al., "CE8-related: Intra prediction mode for BDPCM," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.
Document: JVET-N1002-v1, Chen, J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, 70 pages.
Document: JVET-O0651-v1, Van, L., et al., "Non-CE8: Intra prediction mode derivation for DM chroma block with corresponding IBC/PCM luma," Joint Video Experts Team (JVET) of ITU-T SG 16 WP 3 and ISO/IEC JTC 1/SC 29/WG 11 15th Meeting: Gothenburg, SE, Jul. 3-12, 2019, 2 pages.
Document: JVET-L0053-v3, Choi, N., et.al., "CE3-related: Chroma DM modification," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-O0275-v1, Chiang, M., et al., CE3-related: Chroma DM derivation for IBC an d PCM, Joint Video Experts Team (JVET) of ITU-T SG 16 WP 3 and ISO/IEC J TC 1/SC 29/WG 11 15th Meeting: Gothenburg, SE, Jul. 3-12, 2019, 5 pages.
Document: JCTVC-S0043-v5, Sole, J., et.al., "Non-CE6: Delta QP signalling for palette," Joint Collaborative Team on Video Coding (JCT-VC) of ITU-T SG 16 WP 3 and ISO/I EC JTC 1/SC 29/WG 11 19th Meeting: Strasbourg, FR, Oct. 17-24, 2014, 5 pages.
Document: JVET-N1001-v9, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 65 pages.
Foreign Communication From A Related Counterpart Application, European Application No. 20833035.7, Extended European Search Report dated Jan. 25, 2023, 11 pages.
Xu, J., et al., "Overview of the emerging HEVC screen content coding extension," IEEE Transactions on Circuits and Systems for Video Technology, vol. 26, No. 1, Jan. 2016, 19 pages.
Murakami, A., et al., "High efficiency video Coding," HEVC/H.265 and its applications, Ohmsha, HEVC/H.265 ISBN: 978-4-274-21329-8, May 26, 2022, 26 pages. With English Translation.
Sun, Y., et al., "Analysis of Palette Mode on Versatile Video Coding," Proceedings of 2019 IEEE Conference on Multimedia Information Processing and Retrieval (MIPR), ISBN: 9 78-1-7281-1198-8, DOI: 10.1109/MIPR.2019.00091, Mar. 30, 2019, 10 pages.
Pu, W., et al., "Palette Mode Coding in HEVC Screen Content Coding Extension," IEEE Journal on Emerging and Selected Topics in Circuits and Systems, vol. 6, No. 4, ISSN: 2156-3357, Doi: 10.1109/JETCAS.2016.2605661, Dec. 2016, 21 pages.
Sun, Y., "Palette Mode—A New Coding Tool in Screen Conte NT Coding Extensions of HEVC," Proceedings of 2015 IEEE International Conference on Image Processing (ICIP), IEEE, ISBN: 978-1-4799-8339-1, DOI: 10.1109/ICIP.2015.7351234, Sep. 30, 2015, 11 pages.
Document: JVET-N1001-v8, Bross, B., et al., "Versatile Video Coding (Draft 5)," Joint Video Experts Team (JVET) of Itu-T Sg 16 WP 3 and Iso/Iec Jtc 1/SC 29/WG 11 14th Meeting: Geneva, CH, Mar. 19-27, 2019, 400 pages.

\* cited by examiner

FIG. 8

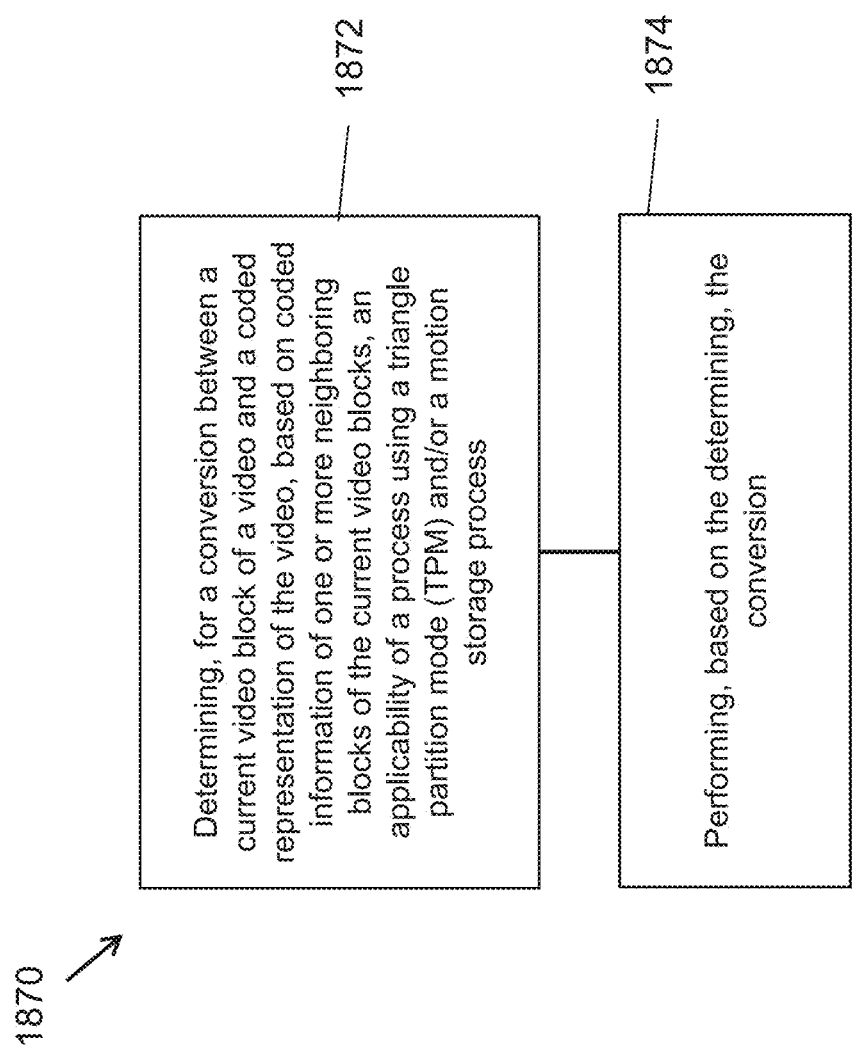

CHROMA INTRA MODE DERIVATION IN SCREEN CONTENT CODING

CROSS REFERENCE TO RELATED APPLICATIONS

This application is a continuation application of U.S. patent application Ser. No. 17/528,288, filed on Nov. 17, 2021, which is a continuation of International Patent Application No. PCT/US2020/040027, filed on Jun. 28, 2020, which claims the priority to and benefits of International Patent Application No. PCT/CN2019/093852, filed on Jun. 28, 2019 and International Patent Application No. PCT/CN2019/093982, filed on Jun. 29, 2019, all of which are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments in which a palette coding mode is used for coding or decoding video.

In one example aspect, a video processing method is disclosed. The method includes deriving, for a current video block of a video that is a chroma block and coded in a chroma DM mode, an intra prediction mode for the current video block according to a rule related to a coding mode of the current video block; and performing a conversion between the current video block and a coded presentation of the video, wherein the rule specifies to derive the intra prediction mode based on an intra prediction direction of a corresponding luma block used to derive the chroma derived mode (DM) mode and coded using a block differential pulse code modulation representation of a quantized residual block corresponding to the current video block.

In another example aspect, another video processing method is disclosed. The method includes performing a conversion between a current video block of a video that is a chroma block and a coded representation of the video, wherein an intra prediction method for generating a prediction block for the current video block is used due to a corresponding luma video block of the current video block being coded in a non-intra mode.

In yet another example aspect, another video processing method is disclosed. The method includes configuring, for a conversion between a current video block of a picture of a video and a coded representation of the video, one or more contexts for a syntax element indicative of use of an intra block copy (IBC) mode for the current video block based on a characteristic of the current video block; and performing, based on the configuring, the conversion, and wherein the use of the IBC mode includes predicting sample values for the current video block using previously-coded samples of another video block in the picture.

In yet another example aspect, another video processing method is disclosed. The method includes configuring, for a conversion between a current video block of a video and a coded representation of the video, a context model for coding a bin associated with a first syntax element based on a second syntax element associated with a neighboring block of the current video block; and performing the conversion based on the configuring.

In yet another example aspect, another video processing method is disclosed. The method includes performing a conversion between a current video block of a video and a coded representation of the video, wherein a flag is determined to indicate whether the coded representation includes non-zero coefficients for the current video block that is represented in the coded representation using a block differential pulse code modulation representation of a quantized residual block corresponding to the current video block.

In yet another example aspect, another video processing method is disclosed. The method includes performing a conversion between a current video block of a video that is a chroma block and a coded representation of the video, wherein a chroma DM mode for the current video block is disabled due to a corresponding luma block used to derive the chroma DM mode and not coded using an intra mode.

In yet another example aspect, another video processing method is disclosed. The method includes performing a conversion between a current video block of a video that is a chroma block and a coded representation of the video according to a rule, wherein the current video block is represented in the coded representation using a prediction block computed using a derived mode in which a mode for the prediction block is derived from coding information of a corresponding luma block; and wherein the rule specifies that, due to the use of the derived mode, the prediction block is determined by assuming that the current video block has invalid block vectors.

In yet another example aspect, another video processing method is disclosed. The method includes determining, for a conversion between a current video block of a video and a coded representation of the video, a default intra mode of the current video block according to a rule; and performing the conversion using the default intra mode.

In yet another example aspect, another video processing method is disclosed. The method includes determining, during a construction of a most probable mode (MPM) list, that a current video block of a video is coded with a direct current (DC) prediction mode due to a neighboring block coded in a pulse coded modulation (PCM) mode in which samples values are quantized; and performing a conversion between the current video block and a coded representation of the video.

In yet another example aspect, another method of video processing is disclosed. The method includes determining, for a conversion between a current video block of a video and a coded representation of the video, based on coded information of one or more neighboring blocks of the current video blocks, an applicability of a process using a triangle partition mode (TPM) and/or a motion storage process; and performing, based on the determining, the conversion, and wherein use of the TPM includes splitting a video block into sub-partitions including at least one non-rectangular partition.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 8 shows examples of pixels involved in filter on/off decision and strong/weak filter selection.

FIGS. 18A to 18G are flowcharts of examples of a video processing method according to various embodiments of the present disclosure.

DETAILED DESCRIPTION

Figure 1:
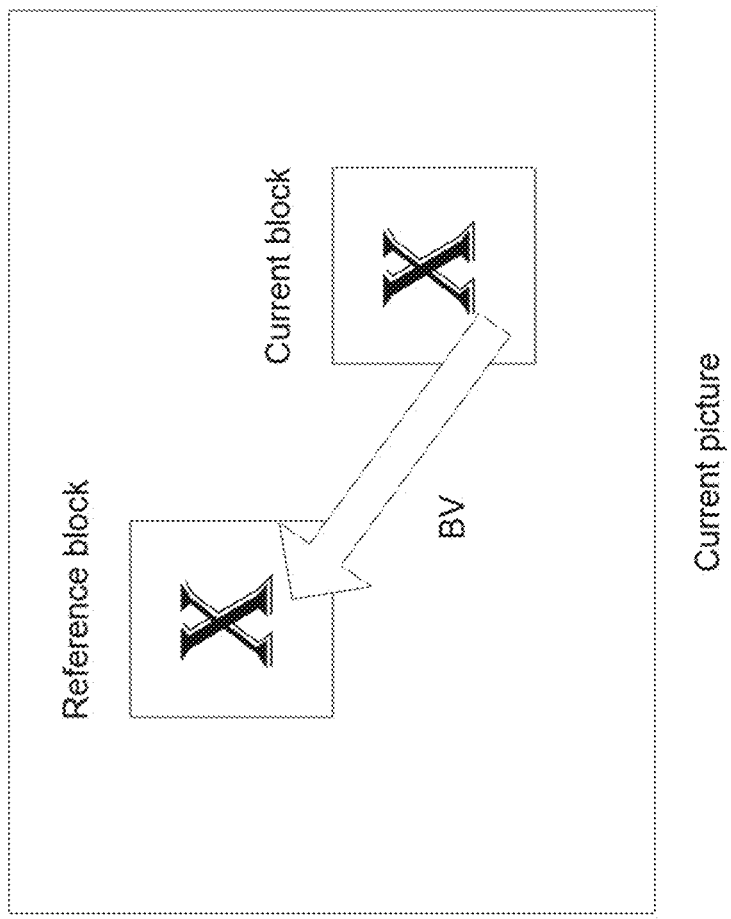
FIG. 1 shows an illustration of an intra block copy.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1 Brief Summary

This patent document is related to video coding technologies. Specifically, it is related to the palette mode in video coding. It may be applied to the existing video coding standard like High Efficiency Video Coding (HEVC), or the standard (Versatile Video Coding (VVC)) to be finalized. It may be also applicable to future video coding standards or video codec.

2 Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced moving picture experts group (MPEG-1) and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by video coding experts group (VCEG) and MPEG jointly in 2015. Since then, many new methods have been adopted by JVET and put into the reference software named Joint Exploration Model (JEM) [3,4]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 4) could be found at:
  phenix.it-sudparis.eu/jvet/doc_end_user/current_document.php?id=5755

The latest reference software of VVC, named VTM, could be found at:
  vcgit.hhi.fraunhofer.de/jvet/VVCSoftware_VTM/tags/VTM-4.0

2.1 Intra Block Copy

Intra block copy (IBC), a.k.a. current picture referencing, has been adopted in HEVC Screen Content Coding extensions (SCC) (HEVC-SCC) and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block may have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The motion vector (MV) is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

FIG. 1 shows an illustration of an intra block copy.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.2 IBC in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

offsetX = ( ChromaArrayType = = 0 ) ? 0 : ( mvCLX[ 0 ] & 0x7 ? 2 : 0 ) (2-1)
offsetY = ( ChromaArrayType = = 0 ) ? 0 : ( mvCLX[ 1 ] & 0x7 ? 2 : 0 ) (2-2)

For bitstream conformance, when the reference picture is the current picture, the luma motion vector mvLX may obey the following constraints:

When the derivation process for z-scan order block availability as specified in clause 6.4.1 is invoked with (xCurr, yCurr) set equal to (xCb, yCb) and the neighboring luma location (xNbY, yNbY) set equal to (xPb+(mvLX[0]>>2)−offsetX, yPb+(mvLX[1]>>2)−offsetY) as inputs, the output may be equal to TRUE.

When the derivation process for z-scan order block availability as specified in clause 6.4.1 is invoked with (xCurr, yCurr) set equal to (xCb, yCb) and the neighboring luma location (xNbY, yNbY) set equal to (xPb+(mvLX[0]>>2)+nPbW−1+offsetX, yPb+(mvLX[1]>>2)+nPbH−1+offsetY) as inputs, the output may be equal to TRUE.

One or both the following conditions may be true:
The value of (mvLX[0]>>2)+nPbW+xB1+offsetX is less than or equal to 0.
The value of (mvLX[1]>>2)+nPbH+yB1+offsetY is less than or equal to 0.

The following condition may be true:

2.3 IBC in VVC Test Model

In the current VVC test model, i.e. VTM-4.0 design, the whole reference block should be with the current coding tree unit (CTU) and may not overlap with the current block. Thus, there may be no need to pad the reference or prediction block. The IBC flag is coded as a prediction mode of the current CU. Thus, there are totally three prediction modes, MODE_INTRA, MODE_INTER and MODE_IBC for each CU.

2.3.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of history-based motion vector prediction (HMVP) candidates
Step 3: Insertion of pairwise average candidates In the derivation of spatial merge candidates, a maximum of four merge candidates are selected among candidates located in the positions depicted in $A_1$, $B_1$, $B_0$, $A_0$ and $B_2$. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

Figure 2:
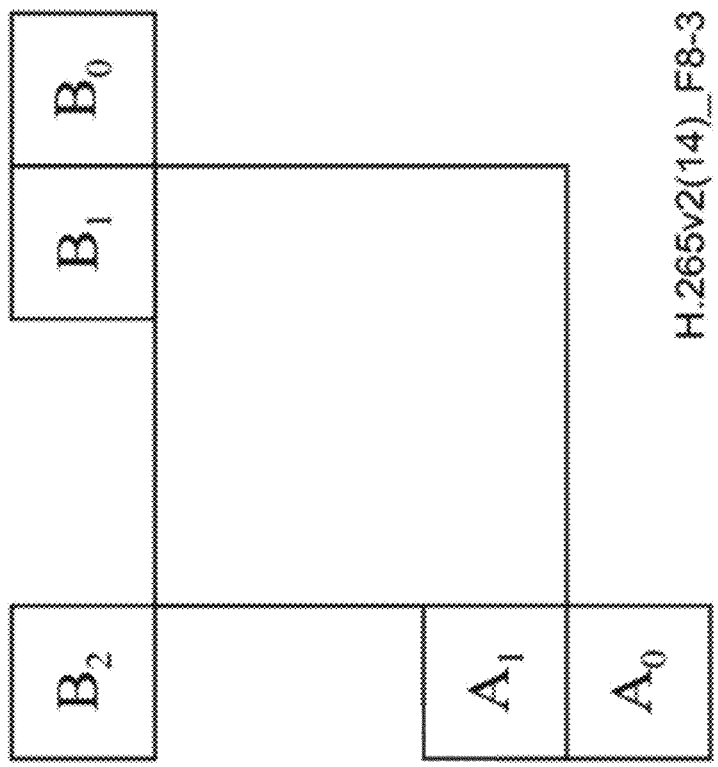
FIG. 2 shows an example of spatial neighboring candidates.

JVET-N0843 is adopted to the VVC. In the JVET-N0843. the BV predictors for merge mode and advanced motion vector prediction (AMVP) mode in IBC will share a common predictor list, which consist of the following elements:
2 spatial neighboring positions (A1, B1 as in FIG. 2)
5 HMVP entries
Zero vectors by default For merge mode, up to first 6 entries of this list will be used; for AMVP mode, the first 2 entries of this list will be used. And the list conforms with the shared merge list region requirement (shared the same list within the SMR).

( xPb + ( mvLX[ 0 ] >> 2 ) + nPbSw − 1 + offsetX) / CtbSizeY − xCurr / CtbSizeY <= yCurr/CtbSizeY − ( yPb + ( mvLX[ 1 ] >> 2 ) + nPbSh − 1 + offsetY ) / CtbSizeY (2-3)

Thus, the case that the reference block overlaps with the current block or the reference block is outside of the picture may not happen. There may be no need to pad the reference or prediction block.

In addition to the above-mentioned BV predictor candidate list, JVET-N0843 also proposed to simplify the pruning operations between HMVP candidates and the existing merge candidates (A1, B1). In the simplification there will be up to 2 pruning operations since it only compares the first HMVP candidate with spatial merge candidate(s).

In the latest VVC and VTM5, it is proposed to explicitly use syntax constraint for disabling 128×128 IBC mode on top of the current bitstream constraint in the previous VTM and VVC versions, which makes presence of IBC flag dependent on CU size <128×128.

2.3.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
  Check $A_0$, $A_1$ until an available candidate is found.
  Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.

1) The chroma block will be first partitioned into (N>>1) *(M>>1) sub blocks.
2) Each sub block with a top left sample coordinated at (x, y) fetches the corresponding luma block covering the same top-left sample which is coordinated at (2x, 2y).
3) The encoder checks the block vector(bv) of the fetched luma block. If one of the following conditions is satisfied, the by is considered as invalid.
  a. A by of the corresponding luma block is not existing.
  b. The prediction block identified by a by is not reconstructed yet.
  c. The prediction block identified by a by is partially or fully overlapped with the current block.
4) The chroma motion vector of a sub block is set to the motion vector of the corresponding luma sub block.

The IBC mode is allowed at the encoder when all sub blocks find a valid bv.

The decoding process of an IBC block is listed below. The part related to chroma mv derivation in an IBC mode is highlighted as grey.

8.6.1 General Decoding Process for Coding Units Coded in IBC Prediction

Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in IBC prediction mode consists of the following ordered steps:

1. The motion vector components of the current coding unit are derived as follows:

1. If treeType is equal to SINGLE_TREE or DUAL_TREE_LUMA, the following applies:

The derivation process for motion vector components as specified in clause 8.6.2.1 is invoked with the luma coding block location (xCb, yCb), the luma coding block width cbWidth and the luma coding block height cbHeight as inputs, and the luma motion vector mvL[0][0] as output.

When treeType is equal to SINGLE_TREE, the derivation process for chroma motion vectors in clause 8.6.2.9 is invoked with luma motion vector mvL[0][0] as input, and chroma motion vector mvC[0][0] as output.

The number of luma coding subblocks in horizontal direction numSbX and in vertical direction numSbY are both set equal to 1.

1. Otherwise, if treeType is equal to DUAL_TREE_CHROMA, the following applies:

The number of luma coding subblocks in horizontal direction numSbX and in vertical direction numSbY are derived as follows:

| | |
|---|---|
| numSbX = ( cbWidth >> 2 ) | (8-886) |
| numSbY = ( cbHeight >> 2 ) | (8-887) |

The chroma motion vectors mvC[xSbIdx][ySbIdx] are derived as follows for xSbIdx=0 . . . numSbX−1, ySbIdx=0 . . . numSbY−1:

The luma motion vector mvL[xSbIdx][ySbIdx] is derived as follows:

The location (xCuY, yCuY) of the collocated luma coding unit is dervied as follows:

| | |
|---|---|
| xCuY = xCb + xSbIdx*4 | (8-888) |
| yCuY = yCb + ySbIdx*4 | (8-889) |

If CuPredMode[xCuY][yCuY] is equal to MODE_INTRA, the following applies.

| | |
|---|---|
| mvL[ xSbIdx ][ ySbIdx ][ 0 ] = 0 | (8-890) |
| mvL[ xSbIdx ][ ySbIdx ][ 1 ] = 0 | (8-891) |
| predFlagL0[ xSbIdx ][ ySbIdx ] = 0 | (8-892) | predFlagL1[xSbIdx][ySbIdx]=0 (8-893)
Otherwise (CuPredMode[xCuY][yCuY] is equal to MODE_IBC), the following applies:

mvL[ xSbIdx ][ ySbIdx ][ 0 ]=MvL0[ xCuY ][ yCuY ][ 0 ] (8-894)
mvL[ xSbIdx ][ ySbIdx ][ 1 ]=MvL0[ xCuY ][ yCuY ][ 1 ] (8-895)
predFlagL0[ xSbIdx ][ ySbIdx ] = 1 (8-896)
predFlagL1[ xSbIdx ][ ySbIdx ] = 0 (8-897)

The derivation process for chroma motion vectors in clause 8.6.2.9 is invoked with mvL[xSbIdx][ySbIdx] as inputs, and mvC[xSbIdx][ySbIdx] as output.

For bitstream conformance, the chroma motion vector mvC[xSbIdx][ySbIdx] may obey the following constraints:

When the derivation process for block availability as specified in clause 6.4.X [Ed. (BB): Neighboring blocks availability checking process tbd] is invoked with the current chroma location (xCurr, yCurr) set equal to (xCb/SubWidthC, yCb/SubHeightC) and the neighboring chroma location (xCb/SubWidthC+(mvC[xSbIdx][ySbIdx][0]>>5), yCb/SubHeightC+(mvC[xSbIdx][ySbIdx][1]>>5)) as inputs, the output may be equal to TRUE.

When the derivation process for block availability as specified in clause 6.4.X [Ed. (BB): Neighboring blocks availability checking process tbd] is invoked with the current chroma location (xCurr, yCurr) set equal to (xCb/SubWidthC, yCb/SubHeightC) and the neighboring chroma location (xCb/SubWidthC+(mvC[xSbIdx][ySbIdx][0]>>5)+cbWidth/SubWidthC−1, yCb/SubHeightC+(mvC[xSbIdx][ySbIdx][1]>>5)+cbHeight/SubHeightC−1) as inputs, the output may be equal to TRUE.

( mvC[ xSbIdx ][ ySbIdx ][ 0 ] >> 5 ) + xSbIdx * 2 + 2 is less than or equal to 0.
( mvC[ xSbIdx ][ ySbIdx ][ 1 ] >> 5 ) + ySbIdx * 2 + 2 is less than or equal to 0.

One or both of the following conditions may be true:

2. The prediction samples of the current coding unit are derived as follows:

If treeType is equal to SINGLE_TREE or DUAL_TREE_LUMA, the prediction samples of the current coding unit are derived as follows:

The decoding process for IBC blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 . . . numSbX−1, and ySbIdx=0 . . . numSbY−1, the variable cIdx set equal to 0 as inputs, and the ibc prediction samples (predSamples) that are an (cbWidth)×(cbHeight) array predSamples$_L$ of prediction luma samples as outputs.

Otherwise if treeType is equal to SINGLE_TREE or DUAL_TREE_CHROMA, the prediction samples of the current coding unit are derived as follows:

The decoding process IBC blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 . . . numSbX−1, and ySbIdx=0 . . . numSbY−1 and the variable cIdx set equal to 1 as inputs, and the ibc prediction samples (predSamples) that are an (cbWidth/2)×(cbHeight/2) array predSamples$_{Cb}$ of prediction chroma samples for the chroma components Cb as outputs.

The decoding process for IBC blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 . . . numSbX−1, and ySbIdx=0 . . . numSbY−1 and the variable cIdx set equal to 2 as inputs, and the ibc prediction samples (predSamples) that are an (cbWidth/2)×(cbHeight/2) array predSamples$_{Cr}$ of prediction chroma samples for the chroma components Cr as outputs.

3. The variables NumSbX[xCb][yCb] and NumSbY[xCb][yCb] are set equal to numSbX and numSbY, respectively.

4. The residual samples of the current coding unit are derived as follows:

When treeType is equal to SINGLE_TREE or treeType is equal to DUAL_TREE_LUMA, the decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamples$_L$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array resSamples$_{Cb}$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array resSamples$_{Cr}$ as output.

5. The reconstructed samples of the current coding unit are derived as follows:

When treeType is equal to SINGLE_TREE or treeType is equal to DUAL_TREE_LUMA, the picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples$_L$ and the (cbWidth)×(cbHeight) array resSamples set equal to resSamples$_L$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamples$_{Cr}$ and the (cbWidth/2)×(cbHeight/2) array resSamples set equal to resSamples$_{Cr}$ as inputs, and the output is a modified reconstructed picture before in-loop filtering.

2.4 Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, integer-luma-sample or four-luma-sample.

Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signalling is needed and quarter-luma-sample MVD precision is used for the current CU. Otherwise, a second flag is signalled to indicate whether integer-luma-sample or four-luma-sample MVD precision is used for normal AMVP CU. The same second flag is used to indicate whether integer-luma-sample or 1/16 luma-sample MVD precision is used for affine AMVP CU. In order to ensure the reconstructed MV has the intended precision (quarter-luma-sample, interger-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check three times for each MVD resolution, in VTM4, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. For affine AMVP mode, if affine inter mode is not selected after checking rate-distortion costs of affine merge/skip mode, merge/skip mode, quarter-luma samplel MVD precision normal AMVP mode and quarter-luma sample MVD precision affine AMVP mode, then 1/16 luma-sample MV precision and 1-pel MV precision affine inter modes are not checked. Furthermore affine parameters obtained in quarter-luma-sample MV precision affine inter mode is used as starting search point in 1/16 luma-sample and quarter-luma-sample MV precision affine inter modes.

2.5 Palette Mode in HEVC Screen Content Coding Extensions (HEVC-SCC)

Figure 3:
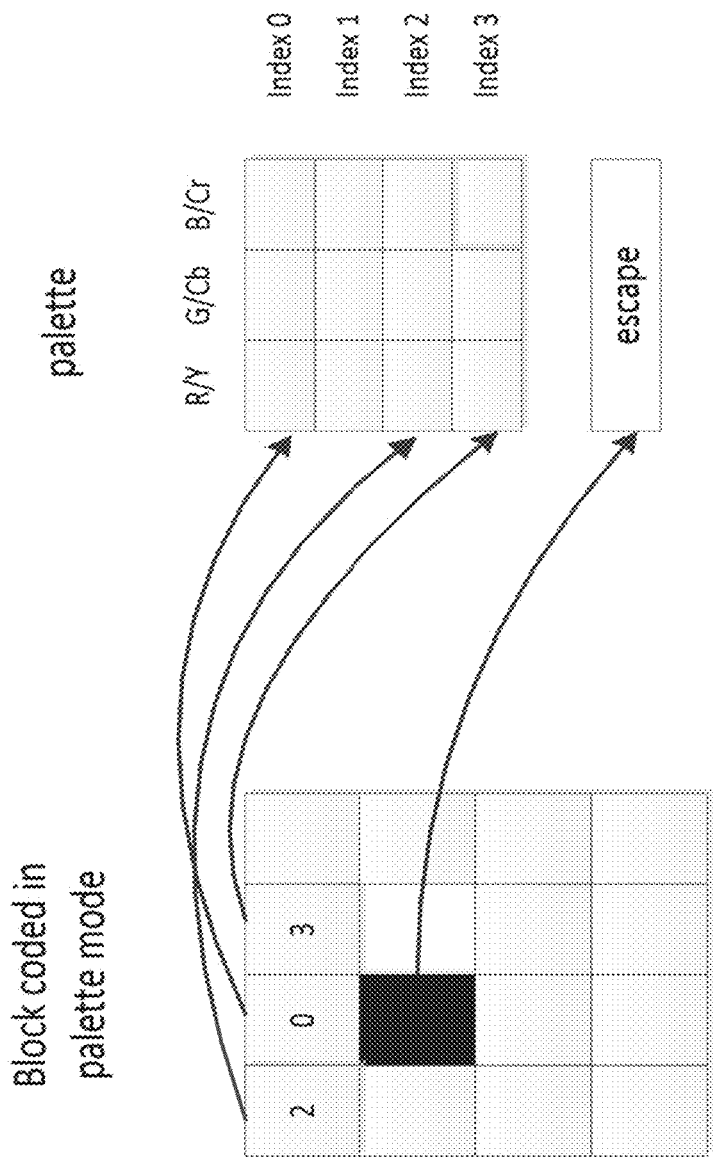
FIG. 3 shows an example of a block coded in palette mode.

The basic idea behind a palette mode is that the samples in the CU are represented by a small set of representative colour values. This set is referred to as the palette. It is also possible to indicate a sample that is outside the palette by signalling an escape symbol followed by (possibly quantized) component values. This is illustrated in FIG. 3.

In the palette mode in HEVC-SCC, a predictive way is used to code the palette and index map.

2.5.1 Coding of the Palette Entries

For coding of the palette entries, a palette predictor is maintained. The maximum size of the palette as well as the palette predictor is signalled in the SPS. In HEVC-SCC, a palette_predictor_initializer_present_flag is introduced in the PPS. When this flag is 1, entries for initializing the palette predictor are signalled in the bitstream. The palette predictor is initialized at the beginning of each CTU row, each slice and each tile. Depending on the value of the palette_predictor_initializer_present_flag, the palette predictor is reset to 0 or initialized using the palette predictor intializer entries signalled in the PPS. In HEVC-SCC, a palette predictor initializer of size 0 was enabled to allow explicit disabling of the palette predictor initialization at the PPS level.

Figure 4:
FIG. 4 shows an example use of palette predictor to signal palette entries.
Figure 4:

For each entry in the palette predictor, a reuse flag is signalled to indicate whether it is part of the current palette. This is illustrated in FIG. 4. The reuse flags are sent using run-length coding of zeros. After this, the number of new palette entries are signalled using exponential Golomb code of order 0. Finally, the component values for the new palette entries are signalled.

2.5.2 Coding of Palette Indices

Figure 5:
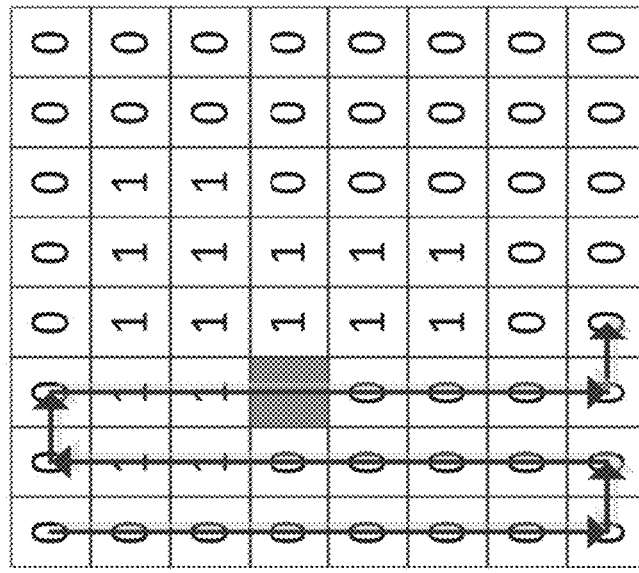
FIG. 5 shows examples of horizontal and vertical traverse scans.
Figure 5:
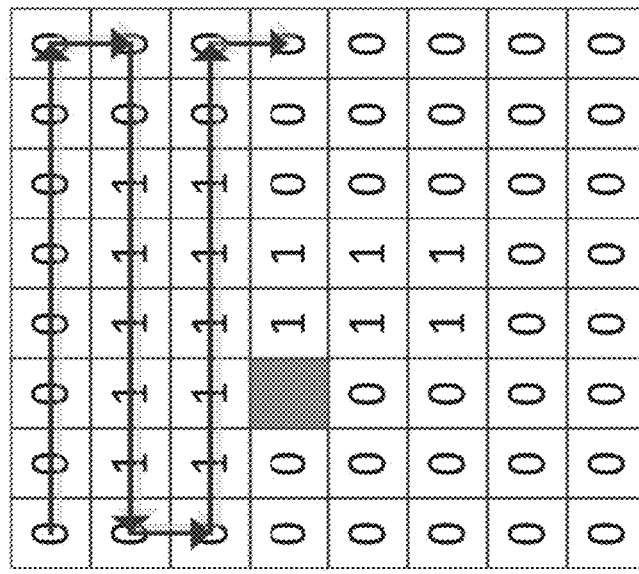

The palette indices are coded using horizontal and vertical traverse scans as shown in FIG. 5. The scan order is explicitly signalled in the bitstream using the palette_transpose_flag. For the rest of the subsection it is assumed that the scan is horizontal.

Figure 6:
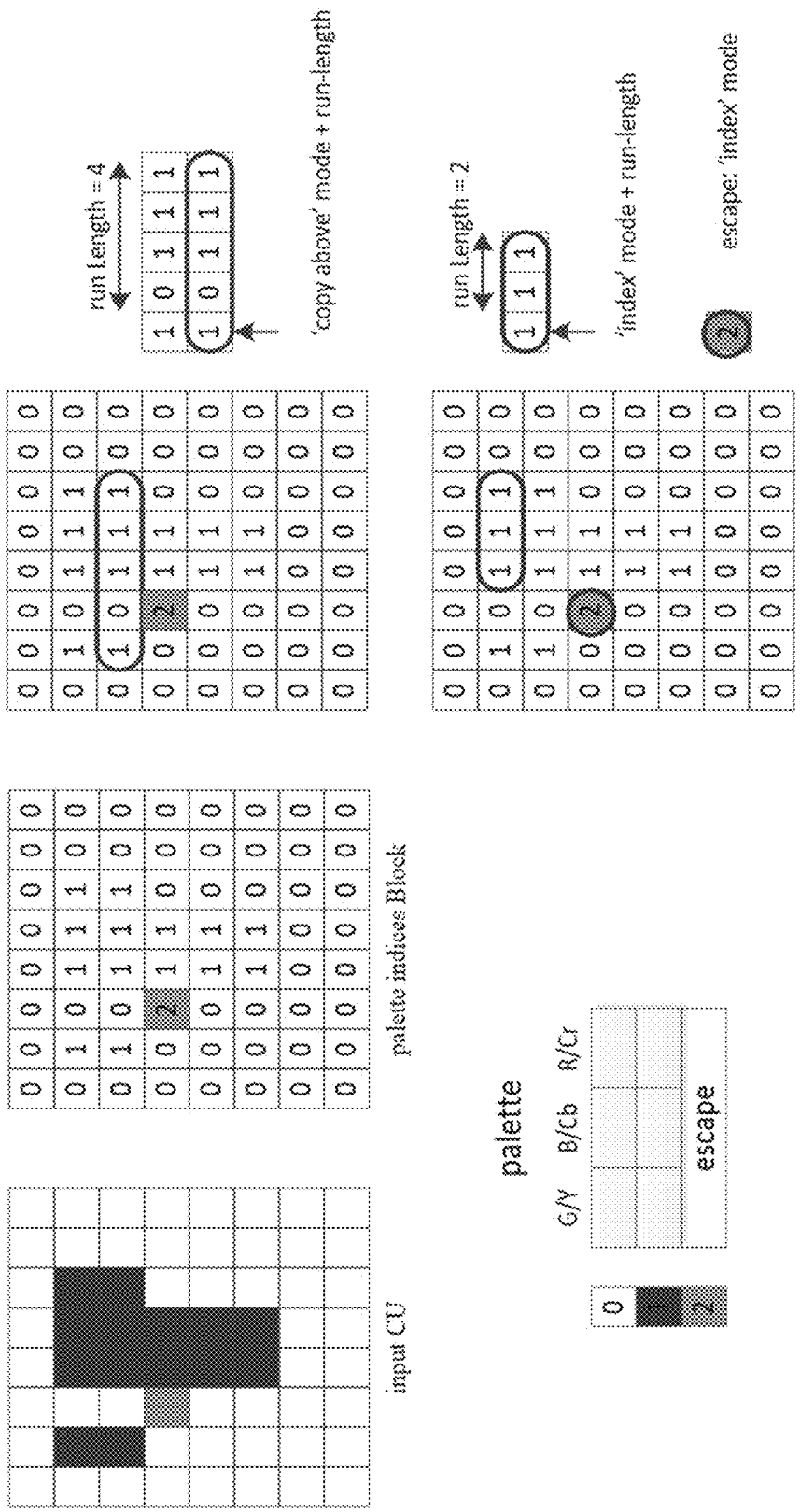
FIG. 6 shows an example of coding of palette indices.

The palette indices are coded using two main palette sample modes: 'INDEX' and 'COPY_ABOVE'. As explained previously, the escape symbol is also signalled as an 'INDEX' mode and assigned an index equal to the maximum palette size. The mode is signalled using a flag except for the top row or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number of subsequent samples that are also coded using the same mode. When escape symbol is part of the run in 'INDEX' or 'COPY_ABOVE' mode, the escape component values are signalled for each escape symbol. The coding of palette indices is illustrated in FIG. 6.

This syntax order is accomplished as follows. First the number of index values for the CU is signalled. This is followed by signalling of the actual index values for the entire CU using truncated binary coding. Both the number of indices as well as the index values are coded in bypass mode. This groups the index-related bypass bins together. Then the palette sample mode (if necessary) and run are signalled in an interleaved manner. Finally, the component escape values corresponding to the escape samples for the entire CU are grouped together and coded in bypass mode.

An additional syntax element, last_run_type_flag, is signalled after signalling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signalling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signalling is for the escape component values. For each escape sample, the number of escape component values signalled may be different depending on the number of components associated with that sample.

2.6 Coefficients Coding in Transform Skip Mode

In JVET-M0464 and JVET-N0280, several modifications are proposed on the coefficients coding in transform skip (TS) mode in order to adapt the residual coding to the statistics and signal characteristics of the transform skip levels.

The proposed modifications are listed as follows.

No last significant scanning position: Since the residual signal reflects the spatial residual after the prediction and no energy compaction by transform is performed for TS, the higher probability for trailing zeros or insignificant levels at the bottom right corner of the transform block is not given anymore. Thus, last significant scanning position signalling is omitted in this case.

Subblock CBFs: The absence of the last significant scanning position signalling may require the subblock CBF signalling with coded_sub_block_flag for TS to be modified as follows:

Due to quantization, the aforementioned sequence of insignificance may still occur locally inside a transform block. Thus, the last significant scanning position is removed as described before and coded_sub_block_flag is coded for all subblocks except the case that all CGs except the last have zero coefficients, thus, no need to code the coded_sub_block_flag for the last CG.

The coded_sub_block_flag for the subblock covering the DC frequency position (top-left subblock) presents a special case. In VVC Draft 3, the coded_sub_block_flag for this subblock is never signalled and always inferred to be equal to 1. When the last significant scanning position is located in another subblock, it means that there is at least one significant level outside the DC subblock. Consequently, the DC subblock may contain only zero/non-significant levels although the coded_sub_block_flag for this subblock is inferred to be equal to 1. With the absence of the last scanning position information in TS, the coded_sub_block_flag for each subblock is signalled. This also includes the coded_sub_block_flag for the DC subblock except when all other coded_sub_block_flag syntax elements are already equal to 0. In this case, the DC coded_sub_block_flag is inferred to be equal to 1 (inferDcSbCbf=1). Since there has to be at least one significant level in this DC subblock, the sig_coeff_flag syntax element for the first position at (0,0) is not signalled and derived to be equal to 1 (inferSbDcSigCoeffFlag=1) instead if all other sig_coeff_flag syntax elements in this DC subblock are equal to 0.

The context modelling for coded_sub_block_flag is changed. The context model index is calculated as the sum of the coded_sub_block_flag to the left and the coded_sub_block_flag abovess the current subblock instead of and a logical disjunction of both.

sig_coeff_flag context modelling: The local template in sig_coeff_flag context modelling is modified to only include the neighbor to the left ($NB_0$) and the neighbor above ($NB_1$) the current scanning position. The context model offset is just the number of significant neighboring positions sig_coeff_flag[$NB_0$]+sig_coeff_flag[$NB_1$]. Hence, the selection of different context sets depending on the diagonal d within the current transform block is removed. This results in three context models and a single context model set for coding the sig_coeff_flag flag.

abs_level_gt1_flag and par_level_flag context modelling: a single context model is employed for abs_level_gt1_flag and par_level_flag.

abs_remainder coding: Although the empirical distribution of the transform skip residual absolute levels typically still fits a Laplacian or a Geometrical distribution, there exist larger instationarities than for transform coefficient absolute levels. Particularly, the variance within a window of consecutive realization is higher for the residual absolute levels. This motivates the following modifications of the abs_remainder syntax binarization and context modelling:

Using a higher cutoff value in the binarization, i.e., the transition point from the coding with sig_coeff_flag, abs_level_gt1_flag, par_level_flag, and abs_level_gt3_flag to the Rice codes for abs_remainder, and dedicated context models for each bin position yields higher compression efficiency. Increasing the cutoff will result in more "greater than X" flags, e.g. introducing abs_level_gt5_flag, abs_level_gt7_flag, and so on until a cutoff is reached. The cutoff itself is fixed to 5 (numGtFlags=5).

The template for the rice parameter derivation is modified, i.e., only the neighbor to the left and the neighbor above the current scanning position are considered similar to the local template for sig_coeff_flag context modelling.

coeff_sign_flag context modelling: Due to the instationarities inside the sequence of signs and the fact that the prediction residual is often biased, the signs can be coded using context models, even when the global empirical distribution is almost uniformly distributed. A single dedicated context model is used for the coding of the signs and the sign is parsed after sig_coeff_flag to keep all context coded bins together.

2.7 Quantized Residual Block Differential Pulse-Code Modulation (QR-BDPCM)

In JVET-M0413, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \le i \le M-1$, $0 \le j \le N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i=0, 0 \le j \le (N-1) \\ Q(r_{i,j}) - Q(r_{(i-1),j}), & 1 \le i \le (M-1), 0 \le j \le (N-1) \end{cases}.$$

For horizontal prediction, similar rules apply, and the residual quantized samples are obtained by $$\tilde{r}_{i,j} = \begin{cases} Q(r_{i,j}), & 0 \le i \le (M-1), j=0 \\ Q(r_{i,j}) - Q(r_{i,(j-1)}), & 0 \le i \le (M-1), 1 \le j \le (N-1) \end{cases}.$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $$Q(r_{i,j}) = \Sigma_{k=0}^{i} \tilde{r}_{k,j}, 0 \le i \le (M-1), 0 \le j \le (N-1).$$

For horizontal case, $$Q(r_{i,j}) = \Sigma_{k=0}^{j} \tilde{r}_{i,k}, 0 \le i \le (M-1), 0 \le j \le (N-1).$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

The draft text changes of QR-BDPCM are shown as follows.

7.3.6.5 Coding Unit Syntax

| | Descriptor |
|---|---|
| coding_unit( x0, y0, cbWidth, cbHeight, treeType ) { | |
|   if( tile_group_type != I \|\| | |
|   sps_ibc_enabled_flag ) { | |
|     if( treeType != DUAL_ | |
|     TREE_CHROMA ) | |
|       cu_skip_flag[ x0 ][ y0 ] | ae(v) |
|     if( cu_skip_flag[ x0 ][ y0 ] = = | |
|     0 && tile_group_type != i ) | |
|       pred_mode_flag | ae(v) |
|     if( ( ( tile_group_type = = I && | |
|     cu_skip_flag[ x0 ][ y0 ] = =0 ) \|\| | |
|     ( tile_group_type != | |
|   I && CuPredMode | |
|   [ x0 ][ y0 ] != MODE_INTRA )) && | |
|   sps_ibc_enabled_flag ) | |
|     pred_mode_ibc_flag | ae(v) |
|   } | |
|   if( CuPredMode[ x0 ][ y0 ] = = | |
|   MODE_INTRA ) { | |
|     if( pred_mode_flag = = | |
|     MODE_INTRA | |
|     && ( cIdx = = 0 ) && | |
|     ( cbWidth <= 32 ) && | |
|     ( CbHeight <= 32 )) { | |
|       bdpcm_flag[ x0 ][ y0 ] | ae(v) |
|       if( bdpcm_flag[ x0 ][ y0 ] ) { | |
|         bdpcm_dir_flag[ x0 ][ y0 ] | ae(v) |
|       } | |
|     else { | |
|     if( sps_pcm_enabled_flag && | |
|     cbWidth >= MinIpcmCbSizeY && | |
|     cbWidth <= MaxIpcmCbSizeY && | |
|     cbHeight >= MinIpcmCbSizeY && | |
|     cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, | |
|       cbHeight, treeType) | |
|     } else { | |
|     if( treeType = = SINGLE_TREE \|\| | |
|     treeType = = DUAL_TREE_LUMA ) { | |
|       if( ( y0 % CtbSizeY ) > 0 ) | |
|         intra_luma_ref_idx[ x0 ][ y0 ] | ae(v) |
|       if (intra_luma_ref_idx | |
|       [ x0 ][ y0 ] = = 0 && | |
|       ( cbWidth <= MaxTbSizeY \|\| | |
|       cbHeight <= MaxTbSizeY ) && | |
|       ( cbWidth * cbHeight > | |
|       MinTbSizeY * MinTbSizeY )) | |
|         intra_subpartitions_mode_ | ae(v) |
|         flag[ x0 ][ y0 ] | |
|       if( intra_subpartitions_mode_ | |
|       flag[ x0 ][ y0 ] = = 1 && | |
|       cbWidth <= MaxTbSizeY && | |
|       cbHeight <= MaxTbSizeY ) | |
|         intra_subpartitions_ | ae(v) |
|         split_flag[ x0 ][ y0 ] | |
|       if( intra_luma_ref_idx | |
|       [ x0 ][ y0 ] = = 0 && | |
|       intra_subpartitions_mode_ | |
|       flag[ x0 ][ y0 ] = = 0 ) | |

-continued

```
coding_unit( x0, y0, cbWidth,
cbHeight, treeType ) {                                    Descriptor
    intra_luma_mpm_flag[ x0 ][ y0 ]                       ae(v)
    if( intra_luma_mpm_
    flag[ x0 ][ y0 ] )
        intra_luma_mpm_idx[ x0 ][ y0 ]                    ae(v)
    else
        intra_luma_mpm_                                   ae(v)
        remainder[ x0 ][ y0 ]
    }
    }
    if( treeType = =
SINGLE_TREE | | treeType = =
DUAL_TREE_CHROMA )
        intra_chroma_pred_                                ae(v)
        mode[ x0 ][ y0 ]
    }
} else if( treeType != DUAL_TREE_
CHROMA ) { /* MODE_INTER or
MODE_IBC */
...
}
``` bdpcm_flag[x0][y0] equal to 1 specifies that a bdpcm_dir_flag is present in the coding unit including the luma coding block at the location (x0, y0).

bdpcm_dir_flag[x0][y0] equal to 0 specifies that the prediction direction to be used in a bdpcm block is horizontal, otherwise it is vertical.

2.8 Partition Structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 7:
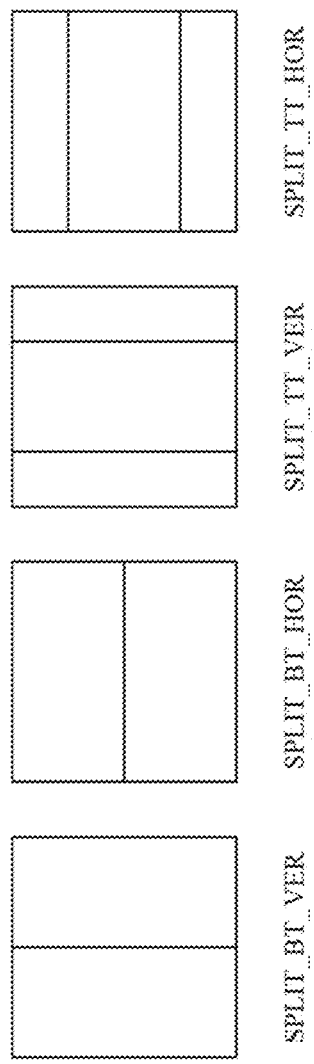
FIG. 7 shows examples of Multi-type tree splitting modes.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 7, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU. In addition, luma and chroma components have separate partition structures on I tiles. Moreover, JVET-K0353 and JVET-K0354 propose to signal a flag to determine whether to use the separate partition structures at CTU/CU level.

2.9 Deblocking Scheme in VTM-4.0

Figure 8:
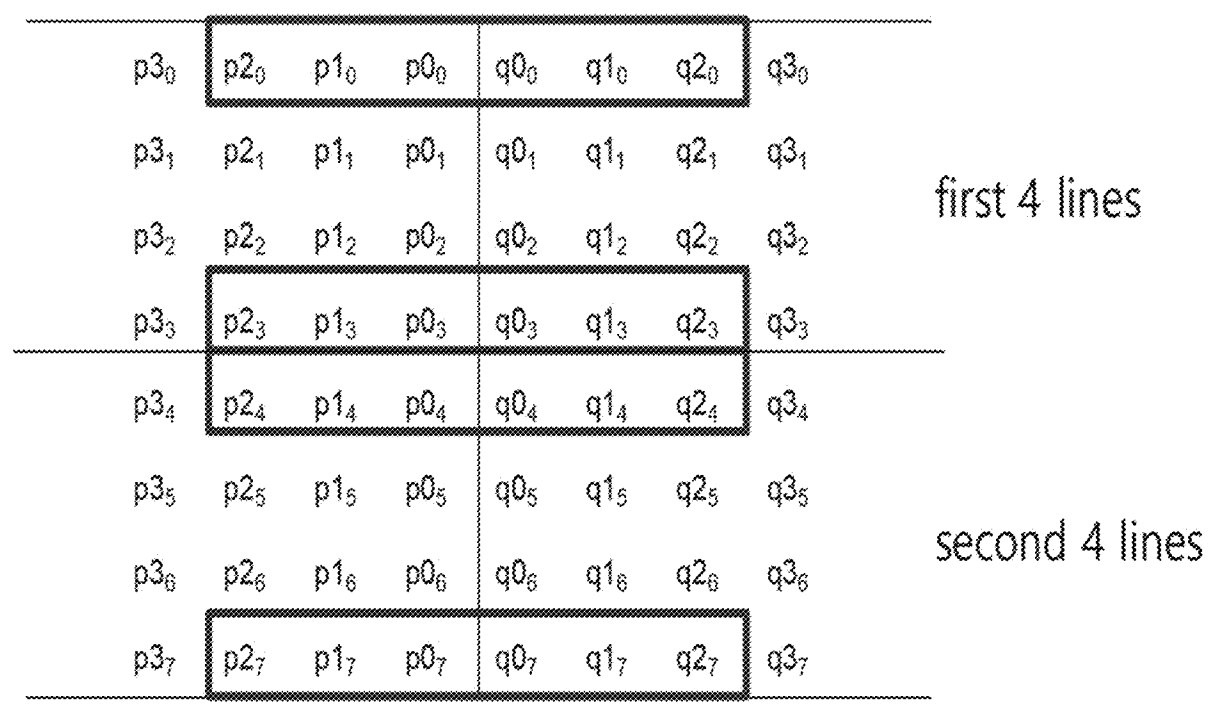

Note that, in the following descriptions, pNM denotes the left-side N-th sample in the M-th row relative to the vertical edge or the top-side N-th sample in the M-th column relative to the horizontal edge, qNM denotes the right-side N-th sample in the M-th row relative to the vertical edge or the bottom-side N-th sample in the M-th column relative to the horizontal edge. An example of $pN_M$ and $qN_M$ is depicted in FIG. 8.

Note that, in the following descriptions, pN denotes the left-side N-th sample in a row relative to the vertical edge or the top-side N-th sample in a column relative to the horizontal edge, qN denotes the right-side N-th sample in a row relative to the vertical edge or the bottom-side N-th sample in a column relative to the horizontal edge.

Filter on/off decision is done for four lines as a unit. FIG. 8 illustrates the pixels involving in filter on/off decision. The 6 pixels in the two red boxes for the first four lines are used to determine filter on/off for 4 lines. The 6 pixels in two red boxes for the second 4 lines are used to determine filter on/off for the second four lines.

In the current VTM, i.e., VTM-4.0, the deblocking scheme described in JVET-M0471 is used. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

2.9.1 Boundary Decision

Filtering is applied to 8×8 block boundaries. In addition, it may be a transform block boundary or a coding subblock boundary (e.g., due to usage of Affine motion prediction, ATMVP). For those which are not such boundaries, filter is disabled.

2.9.2 Boundary Strength Calculation

For a transform block boundary/coding subblock boundary, if it is located in the 8×8 grid, it may be filtered and the setting of $bS[xD_i][yD_j]$ (wherein $[xD_i][yD_j]$ denotes the coordinate) for this edge is defined as follows:

If the sample $p_0$ or $q_0$ is in the coding block of a coding unit coded with intra prediction mode, $bS[xD_i][yD_j]$ is set equal to 2.

Otherwise, if the block edge is also a transform block edge and the sample $p_0$ or $q_0$ is in a transform block which contains one or more non-zero transform coefficient levels, $bS[xD_i][yD_j]$ is set equal to 1.

Otherwise, if the prediction mode of the coding subblock containing the sample $p_0$ is different from the prediction mode of the coding subblock containing the sample $q_0$, $bS[xD_i][yD_j]$ is set equal to 1.

Otherwise, if one or more of the following conditions are true, $bS[xD_i][yD_j]$ is set equal to 1:

The coding subblock containing the sample $p_0$ and the coding subblock containing the sample $q_0$ are both coded in IBC prediction mode, and the absolute difference between the horizontal or vertical component of the motion vectors used in the prediction of the two coding subblocks is greater than or equal to 4 in units of quarter luma samples.

For the prediction of the coding subblock containing the sample $p_0$ different reference pictures or a different number of motion vectors are used than for the prediction of the coding subblock containing the sample $q_0$.

- NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.
- NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.

Two motion vectors for the same reference picture are used to predict the coding subblock containing the sample $p_0$, two motion vectors for the same reference picture are used to predict the coding subblock containing the sample $q_0$ and both of the following conditions are true:

- The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.
- The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.

Otherwise, the variable $bS[xD_i][yD_j]$ is set equal to 0.

Table 1 and Table 2 summarize the BS calculation rules.

TABLE 1

Boundary strength (when SPS IBC is disabled)

| Priority | Conditions | Y | U | V |
|---|---|---|---|---|
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the | 1 | N/A | N/A |

TABLE 2-continued

Boundary strength (when SPS_IBC is enabled)

| Priority | Conditions | Y | U | V |
|---|---|---|---|---|
| | adjacent blocks is greater than or equal to one integer luma sample | | | |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.9.3 Deblocking Decision for Luma Component

The deblocking decision process is described in this sub-section.

Wider-stronger luma filter is filters used only if all of the Condition 1, Condition 2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

```
bSidePisLargeBlk = ((edge type is vertical and p0
belongs to CU with width > = 32) || (edge
type is horizontal and po belongs to CU with height >= 32))?
TRUE: FALSE
bSideQisLargeBlk = ((edge type is vertical and q0
belongs to CU with width >= 32) || (edge
type is horizontal and q0 belongs to CU with height >= 32))?
TRUE: FALSE
```

Based on bSidePisLargeBlk and bSideQisLargeBlk, the condition 1 is defined as follows.

Condition1=(bSidePisLargeBlk||bSidePisLargeBlk)? TRUE: FALSE

Next, if Condition 1 is true, the condition 2 will be further checked. First, the following variables are derived:
dp0, dp3, dq0, dq3 are first derived as in HEVC
if (p side is greater than or equal to 32)
  dp0=(dp0+Abs($p5_0-2*p4_0+p3_0$)+1)>>1
  dp3=(dp3+Abs($p5_3-2*p4_3+p3_3$)+1)>>1
if (q side is greater than or equal to 32)

$$dq0=(dq0+Abs(q5_0-2*q4_0+q3_0)+1)>>1$$

$$dq3=(dq3+Abs(q5_3-2*q4_3+q3_3)+1)>>1$$

Condition2=(d<$\beta$)? TRUE: FALSE where d=dp0+dq0+dp3+dq3, as shown in section 2.2.4.

If Condition1 and Condition2 are valid, whether any of the blocks uses subblocks is further checked:

```
If (bSidePisLargeBlk)
    If (mode block P == SUBBLOCKMODE)
        Sp =5
    else
        Sp =7
else
    Sp = 3
If (bSideQisLargeBlk)
    If (mode block Q == SUBBLOCKMODE)
        Sq =5
    else
        Sq =7
else
    Sq = 3
```

Finally, if both the Condition 1 and Condition 2 are valid, the proposed deblocking method will check the condition 3 (the large block strong filter condition), which is defined as follows.

In the Condition3 StrongFilterCondition, the following variables are derived:

```
dpq is derived as in HEVC.
sp_3 = Abs( p_3 - p_0 ), derived as in HEVC
if (p side is greater than or equal to 32)
    if(Sp==5)
        sp_3 = ( sp_3 + Abs( p_5 - p_3 ) + 1 ) >> 1
    else
        sp_3 = ( sp_3 + Abs( p_7 - p_3 ) + 1 ) >> 1
sq_3 = Abs( q_0 - q_3 ), derived as in HEVC
if (q side is greater than or equal to 32)
    If(Sq==5)
        sq_3 = ( sq_3 + Abs( q_5 - q_3 ) + 1 ) >> 1
    else
        sq_3 = ( sq_3 + Abs( q_7 - q_3 ) + 1 ) >> 1
```

As in HEVC, StrongFilterCondition=(dpq is less than ($\beta$>>2), $sp_3+sq_3$ is less than (3*$\beta$>>5), and Abs($p_0-q_0$) is less than (5*$t_C$+1)>>1)? TRUE:FALSE.

2.9.4 Stronger Deblocking Filter for Luma (Designed for Larger Blocks)

Bilinear filter is used when samples at either one side of a boundary belong to a large block. A sample belonging to a large block is defined as when the width>=32 for a vertical edge, and when height>=32 for a horizontal edge.

The bilinear filter is listed below.

Block boundary samples $p_i$ for i=0 to Sp−1 and $q_j$ for j=0 to Sq−1 (pi and qi are the i-th sample within a row for filtering vertical edge, or the i-th sample within a column for filtering horizontal edge) in HEVC deblocking described above) are then replaced by linear interpolation as follows:

$p_i'=(f_i*Middle_{s,t}+(64-f_i)*P_s+32)>>6)$, clipped to $p_i \pm tcPD_i$ $q_j'=(g_j*Middle_{s,t}+(64-g_j)*Q_s+32)>>6)$, clipped to $q_j \pm tcPD_j$ where $tcPD_i$ and $tcPD_j$ term is a position dependent clipping described in Section 2.9.7 and $g_j$, $f_i$, $Middle_{s,t}$, $P_s$ and $Q_s$ are given in Table 3.

TABLE 3

Long tap deblocking filters

| Sp, Sq | |
|---|---|
| 7, 7 (p side: 7, q side: 7) | $f_i = 59 - i * 9$, can also be described as $f = \{59, 50, 41, 32, 23, 14, 5\}$<br>$g_j = 59 - j * 9$, can also be described as $g = \{59, 50, 41, 32, 23, 14, 5\}$<br>$Middle_{7,7} = (2 * (p_0 + q_0) + p_1 + q_1 + p_2 + q_2 + p_3 + q_3 + p_4 + q_4 + p_5 + q_5 + p_6 + q_6 + 8) >> 4$<br>$P_7 = (p_6 + p_7 + 1) >> 1$,<br>$Q_7 = (q_6 + q_7 + 1) >> 1$ |
| 7, 3 (p side: 7 q side: 3) | $f_i = 59 - i * 9$, can also be described as $f = \{59, 50, 41, 32, 23, 14, 5\}$<br>$g_j = 53 - j * 21$, can also be described as $g = \{53, 32, 11\}$<br>$Middle_{7,3} = (2 * (p_0 + q_0) + q_0 + 2 * (q_1 + q_2) + p_1 + q_1 + p_2 + p_3 + p_4 + p_5 + p_6 + 8) >> 4$<br>$P_7 = (p_6 + p_7 + 1) >> 1$,<br>$Q_3 = (q_2 + q_3 + 1) >> 1$ |
| 3, 7 (p side: 3 q side: 7) | $g_j = 59 - j * 9$, can also be described as $g = \{59, 50, 41, 32, 23, 14, 5\}$<br>$f_i = 53 - i * 21$, can also be described as $f = \{53, 32, 11\}$<br>$Middle_{3,7} = (2 * (q_0 + p_0) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1$,<br>$P_3 = (p_2 + p_3 + 1) >> 1$ |
| 7, 5 (p side: 7 q side: 5) | $g_j = 58 - j * 13$, can also be described as $g = \{58, 45, 32, 19, 6\}$<br>$f_i = 59 - i * 9$, can also be described as $f = \{59, 50, 41, 32, 23, 14, 5\}$<br>$Middle7,5 = (2 * (p_0 + q_0 + p_1 + q_1) + q_2 + p_2 + q_3 + p_3 + q_4 + p_4 + q_5 + p_5 + 8) >> 4$<br>$Q_5 = (q_4 + q_5 + 1) >> 1$,<br>$P_7 = (p_6 + p_7 + 1) >> 1$ |
| 5, 7 (p side: 5 q side: 7) | $g_j = 59 - j * 9$, can also be described as $g = \{59, 50, 41, 32, 23, 14, 5\}$<br>$f_i = 58 - i * 13$, can also be described as $f = \{58, 45, 32, 19, 6\}$<br>$Middle5,7 = (2 * (q_0 + p_0 + p_1 + q_1) + q_2 + p_2 + q_3 + p_3 + q_4 + p_4 + q_5 + p_5 + 8) >> 4$<br>$Q_7 = (q_6 + q_7 + 1) >> 1$,<br>$P_5 = (p_4 + p_5 + 1) >> 1$ |
| 5, 5 (p side: 5 q side: 5) | $g_j = 58 - j * 13$, can also be described as $g = \{58, 45, 32, 19, 6\}$<br>$f_i = 58 - i * 13$, can also be described as $f = \{58, 45, 32, 19, 6\}$<br>$Middle5,5 = (2 * (q_0 + p_0 + p_1 + q_1 + q_2 + p_2) + q_3 + p_3 + q_4 + p_4 + 8) >> 4$<br>$Q_5 = (q_4 + q_5 + 1) >> 1$,<br>$P_5 = (p_4 + p_5 + 1) >> 1$ |
| 5, 3 (p side: 5 q side: 3) | $g_j = 53 - j * 21$, can also be described as $g = \{53, 32, 11\}$<br>$f_i = 58 - i * 13$, can also be described as $f = \{58, 45, 32, 19, 6\}$<br>$Middle5,3 = (q_0 + p_0 + p_1 + q_1 + q_2 + p_2 + q_3 + p_3 + 4) >> 3$<br>$Q_3 = (q_2 + q_3 + 1) >> 1$,<br>$P_5 = (p_4 + p_5 + 1) >> 1$ |
| 3, 5 (p side: 3 q side: 5) | $g_j = 58 - j * 13$, can also be described as $g = \{58, 45, 32, 19, 6\}$<br>$f_i = 53 - i * 21$, can also be described as $f = \{53, 32, 11\}$<br>$Middle3,5 = (q_0 + p_0 + p_1 + q_1 + q_2 + p_2 + q_3 + p_3 + 4) >> 3$<br>$Q_5 = (q_4 + q_5 + 1) >> 1$,<br>$P_3 = (p_2 + p_3 + 1) >> 1$ |

2.9.5 Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering as shown in Table 2. The conditions in Table 2 are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition:

d is then derived as in HEVC luma deblocking.

The second condition will be TRUE when d is less than $\beta$.

In the third condition StrongFilterCondition is derived as follows:

dpq is derived as in HEVC.

$sp_3 = Abs(p_3 - p_0)$, derived as in HEVC $sq_3 = Abs(q_0 - q_3)$, derived as in HEVC As in HEVC design, StrongFilterCondition=(dpq is less than ($\beta$>>2), $sp_3+sq_3$ is less than ($\beta$>>3), and $Abs(p_0-q_0)$ is less than ($5*t_C+1$)>>1)

2.9.6 Strong Deblocking Filter for Chroma

The following strong deblocking filter for chroma is defined:

$$p_2' = (3*p_3 + 2*p_2 + p_1 + p_0 + q_0 + 4) >> 3$$

$$p_1' = (2*p_3 + p_2 + 2*p_1 + p_0 + q_0 + q_1 + 4) >> 3$$

$$p_0' = (p_3 + p_2 + p_1 + 2*p_0 + q_0 + q_1 + q_2 + 4) >> 3$$

The proposed chroma filter performs deblocking on a 4×4 chroma sample grid.

2.9.7 Position Dependent Clipping

The position dependent clipping tcPD is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in section 2.9.2, position dependent threshold table is selected from two tables (i.e., Tc7 and Tc3 tabulated below) that are provided to decoder as a side information:

Tc7 = { 6, 5, 4, 3, 2, 1, 1};
Tc3 = { 6, 4, 2 };
tcPD = (Sp == 3) ? Tc3 : Tc7;
tcQD = (Sq == 3) ? Tc3 : Tc7;

For the P or Q boundaries being filtered with a short symmetrical filter, position dependent threshold of lower magnitude is applied:

$Tc3=\{3,2,1\}$;

Following defining the threshold, filtered $p'_i$ and $q'_i$ sample values are clipped according to tcP and tcQ clipping values:

$$p''_i = \text{Clip3}(p'_i + tcP_i, p'_i - tcP_i, p'_i);$$
$$q''_j = \text{Clip3}(q'_j + tcQ_j, q'_j - tcQ_j, q'_j);$$

where $p'_i$ and $q'_i$ are filtered sample values, $p''_i$ and $q''_j$ are output sample value after the clipping and $tcP_i$, $tcP_i$ are clipping thresholds that are derived from the VVC tc parameter and tcPD and tcQD. The function Clip3 is a clipping function as it is specified in VVC.

2.9.8 Subblock Deblocking Adjustment

To enable parallel friendly deblocking using both long filters and subblock deblocking the long filters is restricted to modify at most 5 samples on a side that uses subblock deblocking (AFFINE or ATMVP or DMVR) as shown in the luma control for long filters. Additionally, the subblock deblocking is adjusted such that subblock boundaries on an 8×8 grid that are close to a CU or an implicit TU boundary is restricted to modify at most two samples on each side.

Following applies to subblock boundaries that not are aligned with the CU boundary.

```
If (mode block Q == SUBBLOCKMODE && edge !=0) {
    if (!(implicitTU && (edge == (64 / 4))))
        if (edge == 2 || edge == (orthogonalLength − 2) || edge == (56 / 4) ||
        edge == (72 / 4))
            Sp = Sq = 2;
        else
            Sp = Sq = 3;
    else
        Sp = Sq = bSideQisLargeBlk ? 5:3
}
```

Where edge equal to 0 corresponds to CU boundary, edge equal to 2 or equal to orthogonalLength-2 corresponds to subblock boundary 8 samples from a CU boundary etc. Where implicit TU is true if implicit split of TU is used.

2.9.9 Restriction to 4CTU/2CTU Line Buffers for Luma/Chroma

Filtering of horizontal edges is limiting Sp=3 for luma, Sp=1 and Sq=1 for chroma, when the horizontal edge is aligned with the CTU boundary.

2.10 Palette Mode Combining with Intra Prediction (PCIP)

In JVET-M0051, the palette mode combined with intra prediction is proposed. In this scheme, the decoder first derives the prediction block based on the intra prediction methods. Then, the decoder decodes a palette and an index map. Using the decoding palette information, the decoder refines the prediction block and reconstructs the block.

Figure 9:
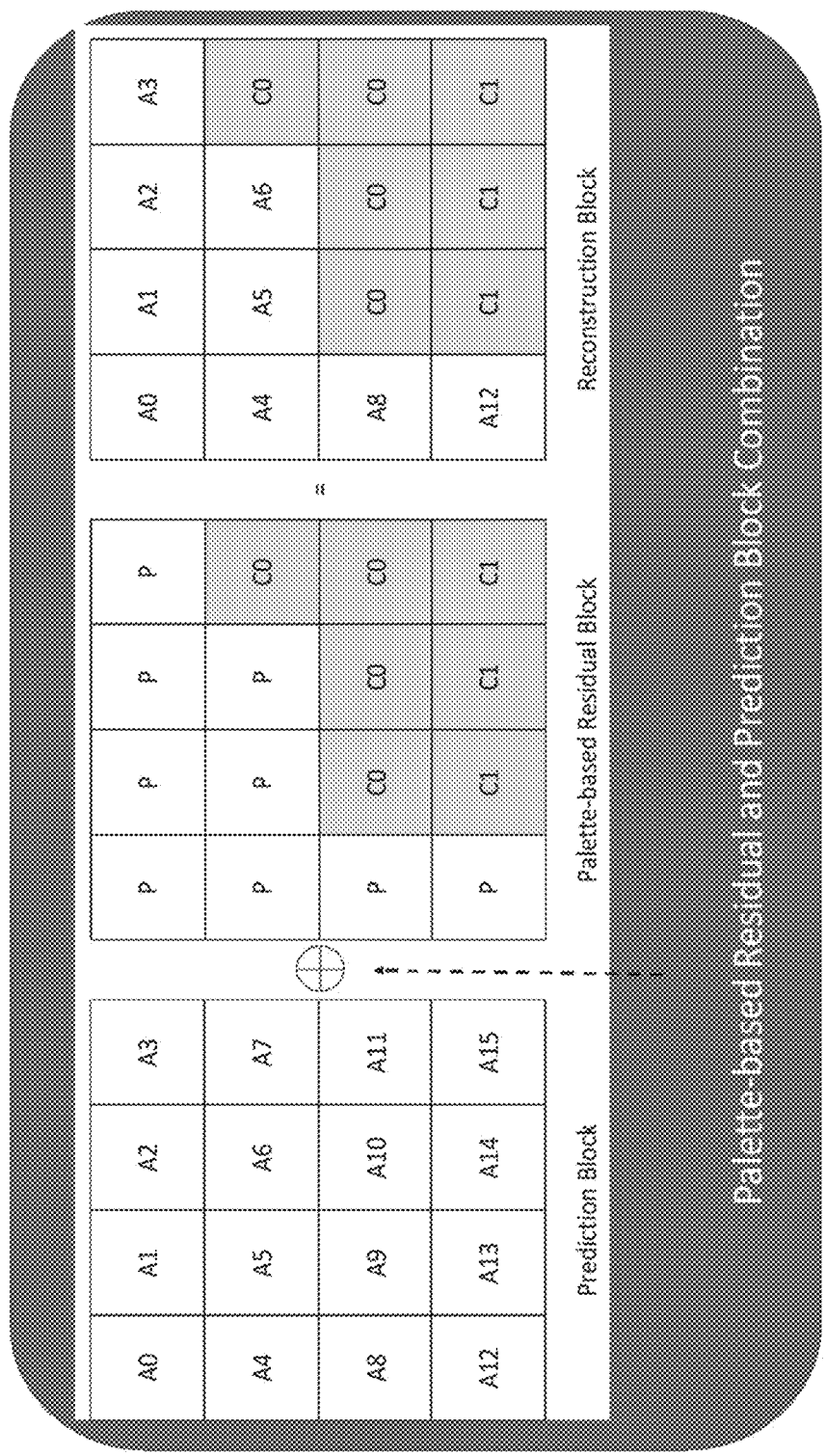
FIG. 9 shows an example method implementation of palette mode combining with intra prediction.

FIG. 9 shows an example combining the palette information and the intra prediction information. First, the decoder generates the prediction block (with pixel values A0~A15). And, the decoder decodes an index map in the palette mode. To reconstruct the block, if the decoded indices equal to "0", the corresponding pixels are marked as "P" as shown in FIG. 2-6. The pixels marked as "P" is reconstructed by pixel values in the intra prediction block. Otherwise, the pixels are reconstructed by palette colours, e.g. C0, C1.

2.11 Compound Palette Mode (CPM)

Figure 10:
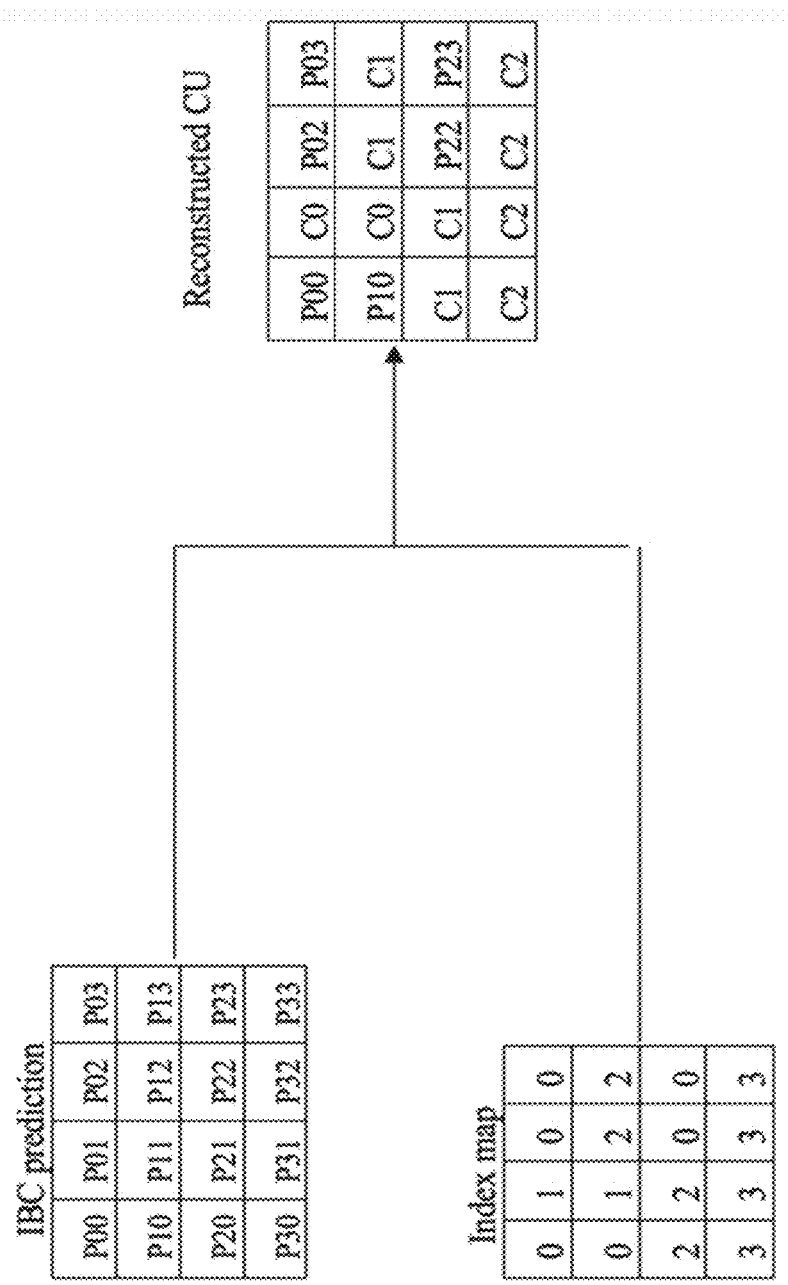
FIG. 10 shows an example implementation of the compound palette mode.

As in JVET-N0259, the samples in the compound palette mode can be reconstructed by copying the collocated sample in the IBC prediction when the current index is 0. Otherwise, the current sample will be reconstructed by the palette colours. FIG. 10 illustrates the proposed palette mode.

In the compound palette mode, on the luma blocks, IBC prediction is generated by using the first available merge candidate, so the motion information for the IBC prediction is not needed to be signalled. On the chroma blocks, the motion compensation in CPM is same with that in VTM4.

In addition, the coding of escape pixels is modified as well. The quantized residue between the original sample and the collocated IBC prediction sample is signalled. At the decoder, every escape pixel in the proposed palette mode is reconstructed by combining the decoded residue and the IBC prediction.

2.12 Intra Mode Coding with 67 Intra Prediction Modes in JVET-N0185

Figure 11:
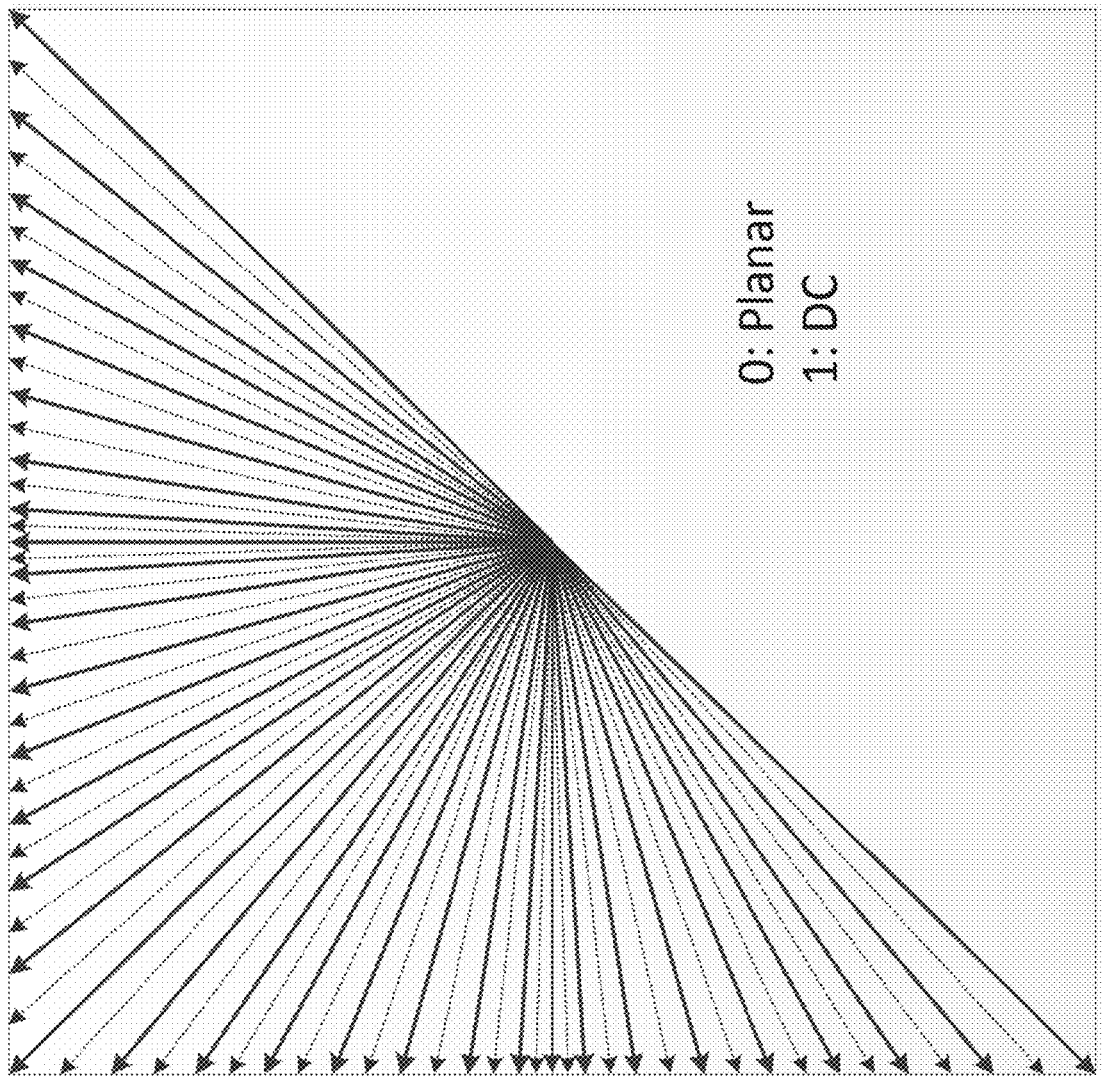
FIG. 11 shows an example of 67 modes (directions) for intra prediction.

To capture the arbitrary edge directions presented in natural video, the number of directional intra modes in VTM4 is extended from 33, as used in HEVC, to 65. The new directional modes not in HEVC are depicted as red dotted arrows in FIG. 11, and the planar and DC modes remain the same. These denser directional intra prediction modes apply for all block sizes and for both luma and chroma intra predictions.

Figure 12:
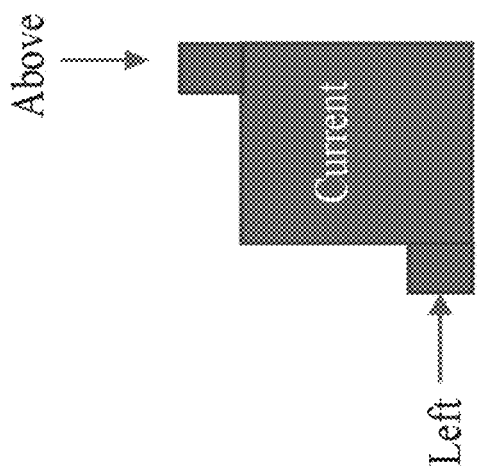
FIG. 12 shows an example of left and above neighbors of a current video block.

A unified 6-MPM list is proposed for intra blocks irrespective of whether MRL and ISP coding tools are applied or not. The MPM list is constructed based on intra modes of the left and above neighboring block as in VTM4.0, as shown in FIG. 12.

Suppose the mode of the left is denoted as Left and the mode of the above block is denoted as Above, the unified MPM list is constructed as with the following steps in order:

When the intra prediction mode of a neighboring block is invalid, its intra mode is set to Planar by default.

If Left and Above are the same and both angular:

MPM list→{Planar, Left, Left−1, Left+1, DC, Left−2}

If Left and Above are different and both angular:

Set a mode Max as the larger mode in Left and Above if the difference of mode Left and Above is in the range of 2 to 62, inclusive MPM list→{Planar, Left, Above, DC, Max−1, Max+1}

Otherwise

MPM list→{Planar, Left, Above, DC, Max−2, Max+2}

If Left and Above are different and one of modes Left and Above is angular mode, and the other is non-angular:

Set a mode Max as the larger mode in Left and Above

MPM list→{Planar, Max, DC, Max−1, Max+1, Max−2}

If both modes Left and Above are non-angular modes:

MPM list→{Planar, DC, V, H, V−4, V+4}

Note that when the mode index (e.g., Max+2) exceed the range [0, 66], it may be replaced by another valid mode index.

The first MPM candidate, i.e., the Planar mode is signalled separately from the remaining MPM candidates.

The more detailed syntax, semantics and decoding process are described as follows:

7.3.6.5 Coding Unit Syntax

| coding_unit( x0, y0, cbWidth, cbHeight, treeType ) { | Descriptor |
|---|---|
| if( tile_group_type != I \|\| sps_ibc_enabled flag ) { | |
|   if( treeType != DUAL_TREE_CHROMA ) | |
|     cu_skip_flag[ x0 ][ y0 ] | ae(v) |
|   if( cu_skip_flag[ x0 ][ y0 ] = = 0 && tile_group_type != I ) | |
|     pred_mode_flag | ae(v) |
|   if( ( ( tile_group_type = = I && cu_skip_flag[ x0 ][ y0 ] = =0 ) \|\| ( tile_group_type != I && CuPredMode[ x0 ][ y0 ] != MODE_INTRA ) ) && sps_ibc_enabled_flag ) | |
|     pred_mode_ibc_flag | ae(v) |
| } | |
| if( CuPredMode[ x0 ][ y0 ] = = MODE_INTRA ) { | |
|   if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
|     pcm_flag[ x0 ][ y0 ] | ae(v) |
|   if( pcm_flag[ x0 ][ y0 ] ) { | |
|     while( !byte_aligned( ) ) | |
|       pcm_alignment_zero_bit | f(1) |
|     pcm_sample( cbWidth, cbHeight, treeType) | |
|   } else { | |
|     if( treeType = = SINGLE_TREE \|\| treeType = = DUAL_TREE_LUMA ) | |
|     { | |
|       if( ( y0 % CtbSizeY ) > 0 ) | |
|         intra_luma_ref_idx[ x0 ][ y0 ] | ae(v) |
|       if(intra_luma_ref_idx[ x0 ][ y0 ] = = 0 && ( cbWidth <= MaxTbSizeY \|\| cbHeight <= MaxTbSizeY ) && ( cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] = = 1 && cbWidth <= MaxTbSizeY && cbHeight <= MaxTbSizeY ) | |
|         intra_subpartitions_split_flag[ x0 ][ y0 ] | ae(v) |
|       if( intra_luma_ref_idx[ x0 ][ y0 ] = = 0 && intra_subpartitions_mode_flag[ x0 ][ y0 ] = = 0 ) | |
|         intra_luma_mpm_flag[ x0 ][ y0 ] | ae(v) |
|       if( intra_luma_mpm_flag[ x0 ][ y0 ] ) { | |
|         if( intra_luma_ref_idx[ x0 ][ y0 ] = = 0 ) | |
|           intra_luma_not_planar_flag[ x0 ][ y0 ] | ae(v) |
|         if( intra_luma_not_planar_flag[ x0 ][ y0 ] ) | |
|           intra_luma_mpm_idx[ x0 ][ y0 ] | ae(v) |
|       } else | |
|         intra_luma_mpm_remainder[ x0 ][ y0 ] | ae(v) |
|     } | |
|     if( treeType = = SINGLE_TREE \|\| treeType = = DUAL_TREE_CHROMA ) | |
|       intra_chroma_pred_mode[ x0 ][ y0 ] | ae(v) |

-continued

| coding_unit( x0, y0, cbWidth, cbHeight, treeType ) { | Descriptor |
|---|---|
|   } | |
| } else if( treeType != DUAL_TREE_CHROMA ) { /* MODE_INTER or MODE_IBC */ | |
|   ... | |
| } | |
| if( !pcm_flag[ x0 ][ y0 ] ) { | |
|   if( CuPredMode[ x0 ][ y0 ] != MODE_INTRA && merge_flag[ x0 ][ y0 ] = = 0 ) | |
|     cu_cbf | ae(v) |
|   if( cu_cbf ) { | |
|     if( CuPredMode[ x0 ][ y0 ] = = MODE_INTER && sps_sbt_enabled_flag && !ciip_flag[ x0 ][ y0 ] ) { | |
|       if( cbWidth <= MaxSbtSize && cbHeight <= MaxSbtSize ) { | |
|         allowSbtVerH = cbWidth >= 8 | |
|         allowSbtVerQ = cbWidth >= 16 | |
|         allowSbtHorH = cbHeight >= 8 | |
|         allowSbtHorQ = cbHeight >= 16 | |
|         if( allowSbtVerH \|\| allowSbtHorH \|\| allowSbtVerQ \|\| allowSbtHorQ ) | |
|           cu_sbt_flag | ae(v) |
|       } | |
|       if( cu_sbt_flag ) { | |
|         if( ( allowSbtVerH \|\| allowSbtHorH ) && ( allowSbtVerQ \|\| allowSbtHorQ) ) | |
|           cu_sbt_quad_flag | ae(v) |
|         if( ( cu_sbt_quad_flag && allowSbtVerQ && allowSbtHorQ ) \|\| ( !cu_sbt_quad_flag && allowSbtVerH && allowSbtHorH ) ) | |
|           cu_sbt_horizontal_flag | ae(v) |
|         cu_sbt_pos_flag | ae(v) |
|       } | |
|     } | |
|     transform_tree( x0, y0, cbWidth, cbHeight, treeType ) | |
|   } | |
| } | |
| } | |

The syntax elements intra_luma_mpm_flag[x0][y0], intra_luma_not_planar_flag[x0][y0], intra_luma_mpm_ida[x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighboring intra-predicted coding unit according to clause 8.4.2.

When intra_luma_mpm_flag[x0][y0] is not present (e.g., ISP enabled, or MRL enabled (with reference index>0)), it is inferred to be equal to 1.

When intra_luma_not_planar_flag[x0][y0] is not present (e.g., MRL is enabled), it is inferred to be equal to 1.

8.4.2 Derivation Process for Luma Intra Prediction Mode

Input to this process are:
- a luma location (xCb, yCb) specifying the top-left sample of the current luma coding block relative to the top-left luma sample of the current picture,
- a variable cbWidth specifying the width of the current coding block in luma samples, a variable cbHeight specifying the height of the current coding block in luma samples.

In this process, the luma intra prediction mode IntraPredModeY[xCb][yCb] is derived.

Table 8-1 specifies the value for the intra prediction mode IntraPredModeY[xCb][yCb] and the associated names.

TABLE 8-1

Specification of intra prediction mode and associated names

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

NOTE-:
The intra prediction modes INTRA_LT_CCLM, INTRA_L_CCLM and INTRA_T_CCLM are only applicable to chroma components.

IntraPredModeY[xCb][yCb] is derived as follows:
  If intra_luma_not_planar_flag[xCb][yCb] is equal to 1, the following ordered steps:
    1. The neighboring locations (xNbA, yNbA) and (xNbB, yNbB) are set equal to (xCb−1, yCb+cbHeight−1) and (xCb+cbWidth−1, yCb−1), respectively.
    2. For X being replaced by either A or B, the variables candIntraPredModeX are derived as follows:
      The availability derivation process for a block as specified in clause 6.4.X [Ed. (BB): Neighboring blocks availability checking process tbd] is invoked with the location (xCurr, yCurr) set equal to (xCb, yCb) and the neighboring location (xNbY, yNbY) set equal to (xNbX, yNbX) as inputs, and the output is assigned to availableX.
      The candidate intra prediction mode candIntraPredModeX is derived as follows:
        If one or more of the following conditions are true, candIntraPredModeX is set equal to INTRA_PLANAR.
          The variable availableX is equal to FALSE.
          CuPredMode[xNbX][yNbX] is not equal to MODE_INTRA and ciip_flag[xNbX][yNbX] is not equal to 1.
          pcm_flag[xNbX][yNbX] is equal to 1.
          X is equal to B and yCb−1 is less than ((yCb>>CtbLog 2SizeY)<<CtbLog 2SizeY).
        Otherwise, candIntraPredModeX is set equal to IntraPredModeY[xNbX][yNbX].
    3. The candModeList[x] with x=0 ... 4 is derived as follows:
      If candIntraPredModeB is equal to candIntraPredModeA and candIntraPredModeA is greater than INTRA_DC, candModeList[x] with x=0 ... 4 is derived as follows:

candModeList[ 0 ] = candIntraPredModeA (8-10)
candModeList[ 1 ] = 2 + ( ( candIntraPredModeA + 61 ) % 64 ) (8-12)
candModeList[ 2 ] = 2 + ( ( candIntraPredModeA − 1 ) % 64 ) (8-13)
candModeList[ 3 ] = INTRA_DC (8-11)
candModeList[ 4 ] = 2 + ( ( candIntraPredModeA + 60 ) % 64 ) (8-14)

Otherwise if candIntraPredModeB is not equal to candIntraPredModeA and candIntraPredModeA or candIntraPredModeB is greater than INTRA_DC, the following applies:
  The variables minAB and maxAB are derived as follows:

minAB = Min( candIntraPredModeA, candIntraPredModeB ) (8-24)
maxAB = Max( candIntraPredModeA, candIntraPredModeB ) (8-25)

If candIntraPredModeA and candIntraPredModeB are both greater than INTRA_DC, candModeList[x] with x=0 ... 4 is derived as follows:

candModeList[ 0 ] = candIntraPredModeA (8-27)
candModeList[ 1 ] = candIntraPredModeB (8-29)
candModeList[ 2 ] = INTRA_DC
(8-29)

If maxAB−minAB is in the range of 2 to 62, inclusive, the following applies:

candModeList[ 3 ] = 2 + ( ( maxAB + 61 ) % 64 ) (8-30)
candModeList[ 4 ] = 2 + ( ( maxAB − 1 ) % 64 ) (8-31)

Otherwise, the following applies:

candModeList[ 3 ] = 2 + ( ( maxAB + 60 ) % 64 ) (8-32)
candModeList[ 4 ] = 2 + ( ( maxAB ) % 64 ) (8-33)

Otherwise (candIntraPredModeA or candIntraPredModeB is greater than INTRA_DC), candModeList[x] with x=0 ... 4 is derived as follows:

candModeList[ 0 ] = maxAB (8-65)
candModeList[ 1 ] = INTRA_DC (8-66)
candModeList[ 2 ] = 2 + ( ( maxAB + 61 ) % 64 ) (8-66)
candModeList[ 3 ] = 2 + ( ( maxAB − 1 ) % 64 ) (8-67)
candModeList[ 4 ] = 2 + ( ( maxAB + 60 ) % 64 ) (8-68)

Otherwise, the following applies:

candModeList[ 0 ] = INTRA_DC (8-71)
candModeList[ 1 ] = INTRA_ANGULAR50 (8-72)
candModeList[ 2 ] = INTRA_ANGULAR18 (8-73)
candModeList[ 3 ] = INTRA_ANGULAR46 (8-74)
candModeList[ 4 ] = INTRA_ANGULAR54 (8-75)

4. IntraPredModeY[xCb][yCb] is derived by applying the following procedure:
  If intra_luma_mpm_flag[xCb][yCb] is equal to 1, the IntraPredModeY[xCb][yCb] is set equal to candModeList[intra_luma_mpm_idx[xCb][yCb]].

Otherwise, IntraPredModeY[xCb][yCb] is derived by applying the following ordered steps:
1. When candModeList[j] is greater than candModeList[j] for i=0 ... 3 and for each i, j=(i+1) ... 4, both values are swapped as follows:

( candModeList[ i ], candModeList[ j ] ) = Swap( candModeList[ i ], candModeList[ j ] )(8-94)

2. IntraPredModeY[xCb][yCb] is derived by the following ordered steps:
    i. IntraPredModeY[xCb][yCb] is set equal to intra_luma_mpm_remainder[xCb][yCb].
    ii. The value of IntraPredModeY[xCb][yCb] is incremented by one.
    iii. For i equal to 0 to 4, inclusive, when IntraPredModeY[xCb][yCb] is greater than or equal to candModeList[i], the value of IntraPredModeY[xCb][yCb] is incremented by one.
    Otherwise (intra_luma_not_planar_flag[xCb][yCb] is equal to 0), IntraPredModeY[xCb][yCb] is set equal to INTRA_PLANAR.

The variable IntraPredModeY[x][y] with x=xCb ... xCb+cbWidth−1 and y=yCb ... yCb+cbHeight−1 is set to be equal to IntraPredModeY[xCb][yCb].

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 4

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

2.13 History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM5 the HMVP table size S is set to be 5, which indicates up to 5 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward. HMVP candidates could be used in the merge candidate list construction process. The latest several HMVP candidates in the table are checked in order and inserted to the candidate list after the TMVP candidate. Redundancy check is applied on the HMVP candidates to the spatial merge candidate.

2.14 Scaling Lists

Scaling lists (c.f. quantization matrices) can be applied during the (inverse) quantization process. In HEVC, the user-defined scaling values are signalled in the PPS, and each possible TB size, colour component and prediction type (intra/inter) can have its own scaling list, except for 32×32 chroma blocks, which is used only for the 4:4:4 REXt chroma format. For 16×16 and 32×32 scaling lists, the scaling lists are specified with an 8×8 grid of values which is value-repeated to the required size, along with a value used for the entry corresponding to the DC frequency location.

2.15 Triangle Partition Mode for Inter Prediction(TPM)

In VTM4, a triangle partition mode is supported for inter prediction. The triangle partition mode is only applied to CUs that are 8×8 or larger and are coded in skip or merge mode but not in MMVD or CIIP mode. For a CU satisfying these conditions, a CU-level flag is signalled to indicate whether the triangle partition mode is applied or not.

Figure 14:
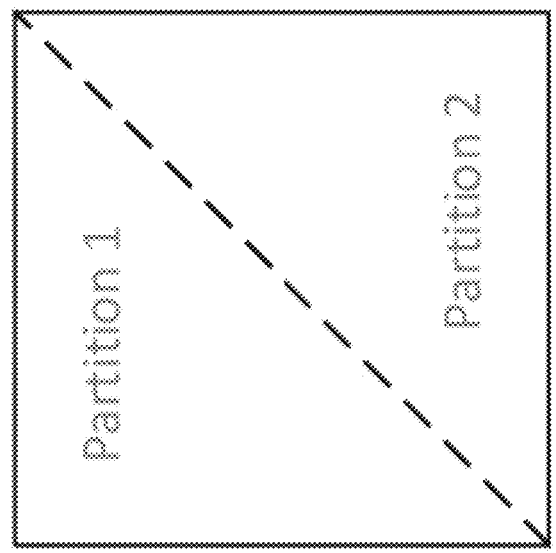
FIG. 14 shows an example of a triangle partition based inter prediction.
Figure 14:
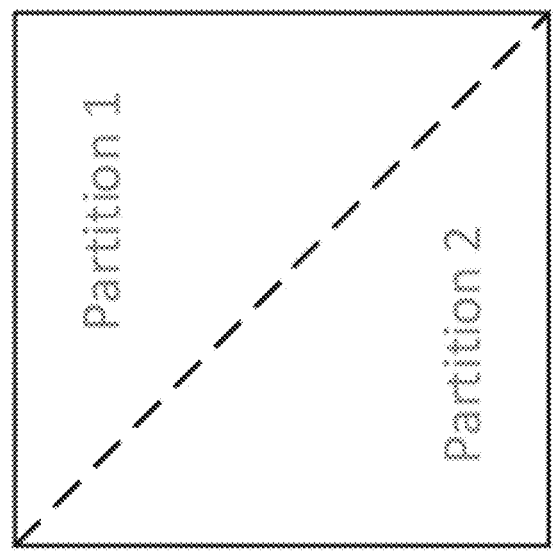

When this mode is used, a CU is split evenly into two triangle-shaped partitions, using either the diagonal split or the anti-diagonal split (FIG. 14). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived from a uni-prediction candidate list constructed using the process in 3.4.10.1.

If the CU-level flag indicates that the current CU is coded using the triangle partition mode. If triangle partition mode is used, then a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored in 4×4 units as in 2.16.3.

2.15.1 Uni-Prediction Candidate List Construction

Figure 15:
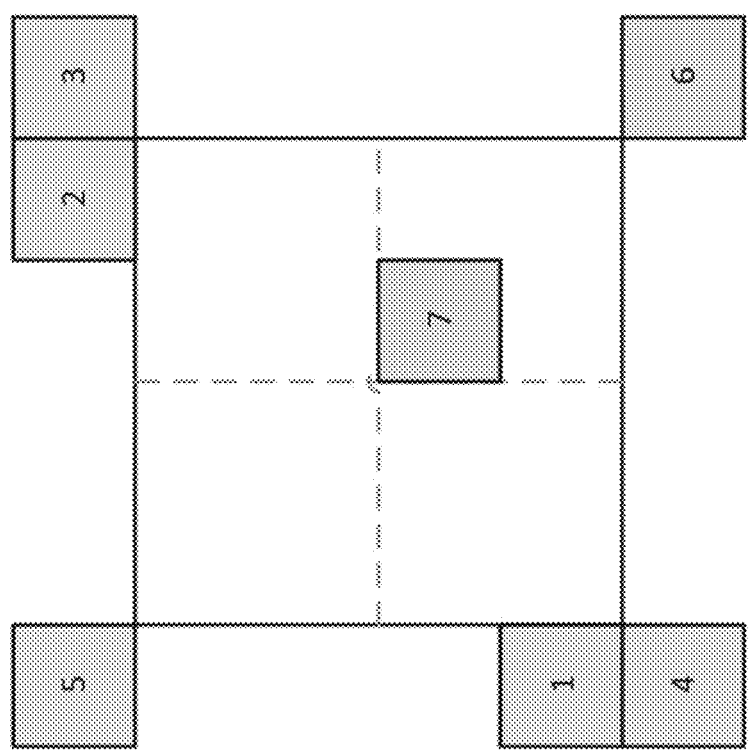
FIG. 15 shows an example of spatial and temporal neighboring blocks used to construct the uni-prediction candidate list.

The uni-prediction candidate list consists of five uni-prediction motion vector candidates. It is derived from seven neighboring blocks including five spatial neighboring blocks (labelled 1 to 5 in FIG. 15) and two temporal co-located blocks (labelled 6 to 7 in FIG. 15). The motion vectors of the seven neighboring blocks are collected and put into the uni-prediction candidate list according to the following order: first, the motion vectors of the uni-predicted neighboring blocks; then, for the bi-predicted neighboring blocks, the L0 motion vectors (that is, the L0 motion vector part of the bi-prediction MV), the L1 motion vectors (that is, the L1 motion vector part of the bi-prediction MV), and averaged motion vectors of the L0 and L1 motion vectors of the bi-prediction MVs. If the number of candidates is less than five, zero motion vector is added to the end of the list.

2.15.2 Blending Along the Triangle Partition Edge

Figure 16:
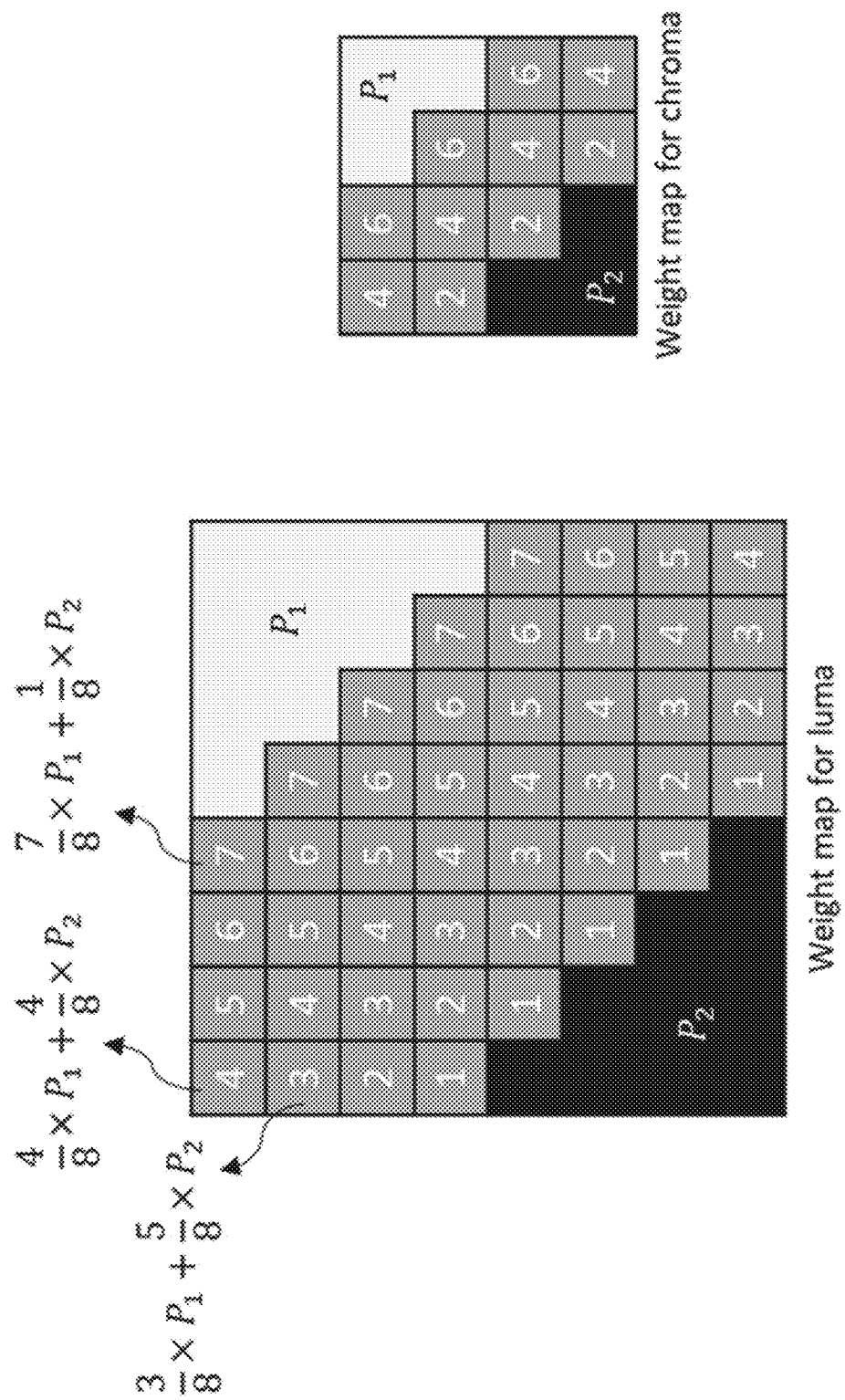
FIG. 16 shows an example of weights used in the blending process.

After predicting each triangle partition using its own motion, blending is applied to the two prediction signals to derive samples around the diagonal or anti-diagonal edge. The following weights are used in the blending process:

{7/8, 6/8, 5/8, 4/8, 3/8, 2/8, 1/8} for luma and {6/8, 4/8, 2/8} for chroma, as shown in FIG. 16.

2.15.3 Motion Field Storage

The motion vectors of a CU coded in triangle partition mode are stored in 4×4 units. Depending on the position of each 4×4 unit, either uni-prediction or bi-prediction motion vectors are stored. Denote Mv1 and Mv2 as uni-prediction motion vectors for partition 1 and partition 2, respectively. If a 4×4 unit is located in the non-weighted area shown in the example of FIG. 16, either Mv1 or Mv2 is stored for that 4×4 unit. Otherwise, if the 4×4 unit is located in the weighted area, a bi-prediction motion vector is stored. The bi-prediction motion vector is derived from Mv1 and Mv2 according to the following process:

1) If Mv1 and Mv2 are from different reference picture lists (one from L0 and the other from L1), then Mv1 and Mv2 are simply combined to form the bi-prediction motion vector.
2) Otherwise, if Mv1 and Mv2 are from the same list, and without loss of generality, assume they are both from L0. In this case,
   a) If the reference picture of either Mv2 (or Mv1) appears in L1, then that Mv2 (or Mv1) is converted to a L1 motion vector using that reference picture in L1. Then the two motion vectors are combined to form the bi-prediction motion vector;
   b) Otherwise, instead of bi-prediction motion, only uni-prediction motion Mv1 is stored.

3 Examples of Technical Limitations of Conventional Art

Several problems are observed on a block coded with palate mode or its variants (e.g. PCIP or CPM).
1. The palette mode may need to be specially treated in the deblocking process.
2. The CPM and/or PCIP may be treated as an intra prediction mode for better coding efficiency.
3. The MV/BV of a block coded with CPM may be used as a MV/BV prediction of successive blocks for coding efficiency.
4. The intra prediction direction of a block coded with PCIP may be used as an intra mode prediction of successive blocks for coding efficiency.
5. As in VTM, the chroma CPM needs to perform motion vector derivation at sub block level, which increases the complexity.
6. The signalling of chroma PCIP does not consider the availability of chroma IBC mode.
7. When non-transform mode (i.e., a block is not coded with transform; or coded with identity transform), e.g. transform skip, bdpcm mode is used, some QPs may be inefficient.
8. How to handle DM mode for chroma, when the corresponding luma block used to derive the mode is coded in IBC, is not clear.

4 Example Embodiments

The listing of embodiments below should be considered as examples to explain general concepts. These embodiments should not be interpreted in a narrow way. Furthermore, the listed techniques can be combined in any manner, for example, to improve coding efficiency and reduce decoding or coding complexity.

The methods described below may be applied to current palette mode, PCIP, CPM or other coding methods that may rely on palette for residual coding.

1. The palette mode may be treated as a separate mode (e.g. MODE_PLT) in addition to existing coding modes (e.g., intra, inter, IBC) in the deblocking process.
   a. In one example, the boundary strength may be set to 0 if the blocks at P-side and Q-side are both coded with palette mode.
   b. In one example, if a block A at one side is coded with palette mode and a block B at the other side is not coded with palette mode, the boundary strength may only depend on the information of the block B.
      i. In one example, the block B is coded with intra mode. In such a case, the boundary strength may be set to 2.
      ii. In one example, the block B is coded with IBC mode. In such a case, the boundary strength may be set to 1 if the block B has one non-zero coefficient at least.
      iii. In one example, the block B is coded with IBC mode. In such a case, the boundary strength may be set to 0 if all coefficients in the block B are 0.
   c. In one example, the above methods may be also applied on PCIP, CPM or other palette-related methods.
2. CPM may be treated in the same way as the IBC mode in the deblocking process (e.g., the boundary strength derivation).
   a. Alternatively, CPM may be treated in the same way as the Palette mode in the deblocking process (e.g., the boundary strength derivation).
   b. Alternatively, CPM may be treated in the same way as the intra mode in the deblocking process (e.g., the boundary strength derivation).
   c. Alternatively, how to apply deblocking filter may depend on the usage of CPM.
3. PCIP may be treated in the same way as the intra mode in the deblocking process (e.g., the boundary strength derivation).
   a. Alternatively, PCIP may be treated in the same way as the Palette mode in the deblocking process (e.g., the boundary strength derivation).
   b. Alternatively, how to apply deblocking filter may depend on the usage of PCIP.
4. The coded block flag of a palette coded block/CPM/PCIP may be set to a fixed value or depend on the existence of escape pixels in the block.
   a. In one example, the coded block flag may be set to 0.
   b. In one example, the coded block flag may be set to 1.
   c. In one example, the coded block flag may be set to 0 if the current block does not have any escape pixels.
   d. In one example, the coded block flag may be set to 1 if the current block has at least one escape pixel.
5. The samples coded with palette mode, and/or CPM and/or PCIP may be not deblocked.
   a. In one example, if a block at P-side or Q-side is coded with CPM and/or PCIP, the samples at P-side and/or Q-side may be not deblocked.

b. In one example, if a block at P-side is coded with CPM and/or PCIP and a block at Q-side is not coded with these modes, the samples at P-side may be not deblocked, vice versa.

c. In one example, for the CPM mode, the deblocking filters may be only performed on the samples copied from IBC predictions. Other samples from the palette entries may be not deblocked.

d. In one example, for the PCIP mode, the deblocking filters may be only performed on the samples copied from intra predictions. Other samples from the palette entries may be not deblocked.

6. Indication of usage of CPM for a transform unit/prediction unit/coding block/region may be coded separately from the existing prediction modes which may include the intra mode, inter mode, IBC mode and palette mode.

a. In one example, the prediction modes related syntax elements (e.g cu_skip_flag, pred_mode_flag, pred_mode_ibc_flag and cu_palette_flag) may be coded before the indication of usage of CPM.

i. Alternatively, furthermore, the indication of usage of CPM may be conditionally signalled based on the prediction mode.

1. In one example, when the prediction mode is the intra block copy mode (i.e., MODE_IBC), the signalling of the indication of usage of CPM mode may be skipped. Furthermore, the indication of usage of CPM may be inferred to be false when the current prediction mode is MODE_IBC.

7. Whether to signal CPM and/or PCIP related syntax for a colour component may depend on the partition structure and/or colour format and/or separate plane coding.

a. In one example, for a chroma component, signalling of CPM and/or PCIP related syntax may be skipped if single tree is applied.

b. Alternatively, for a chroma component, CPM and/or PCIP related syntax may be signalled if dual tree is applied.

c. Alternatively, signalling of CPM and/or PCIP related syntax may be skipped for chroma blocks if colour format is 4:0:0.

i. Alternatively, furthermore, they may still be signalled, but are not used in the decoding process.

8. The signalling of the indication of usage of CPM mode for chroma blocks may be based on the coded information (e.g., prediction mode) of one or more selected blocks in the corresponding luma block.

a. In one example, the indication of CPM for a chroma block may be signalled when at least one of the selected luma blocks is coded with IBC mode.

i. Alternatively, the indication of CPM for a chroma block may be signalled when all of the selected luma blocks are coded with IBC mode.

ii. Alternatively, the indication of usage of chroma CPM may be not signalled if a selected block is not coded with intra block copy mode (i.e., MODE_IBC). Furthermore, the indication of usage of CPM may be inferred to be default values (e.g., false) when the prediction mode of a selected block is not MODE_IBC.

iii. Alternatively, the indication of usage of chroma CPM may be not signalled if all of selected blocks are not coded with intra block copy mode (i.e., MODE_IBC), Furthermore, the indication of usage of CPM may be inferred to be default values (e.g., false) when all of the selected blocks are not coded with IBC mode.

b. In one example, the size of the selected luma block may be the smallest CU/PU/TU size or the unit for motion/mode storage (such as 4×4).

c. In one example, a selected luma block may be the CU/PU/TU covering the center, top left, top right, bottom left or bottom right position of the corresponding luma region. An example of a corresponding luma region is shown in FIG. 4-1.

i. In one example, suppose the top-left coordinate of current chroma block is (x0, y0), width and height of the current chroma block is w0 and h0, respectively. The coordinate of top-left sample in the corresponding luma region, width and height of the corresponding luma region may be scaled according to the colour format.

a) for the 4:2:0 colour format, the top-left coordinate of the collocated luma region is (2*x0, 2*y0), and its width and height are 2*w0 and 2*h0, respectively.

b) for the 4:4:4 colour format, the top-left coordinate of the collocated luma region is (x0, y0), and its width and height are w0 and h0, respectively.

ii. Suppose the top-left coordinate of the collocated luma region is (x, y) and its width and height are W and H, then coordinate of the center position may be:

a) (x+W/2, y+H/2)
b) (x+W/2−1, y+H/2−1)
c) (x+W/2, y+H/2−1)
d) (x+W/2−1, y+H/2)

iii. Suppose the top-left coordinate of the collocated luma region is (x, y) and its width and height are W and H, then coordinate of the top-left position may be (x, y).

iv. Suppose the top-left coordinate of the collocated luma region is (x, y) and its width and height are W and H, then coordinate of the top-right position may be:

a) (x+W, y)
b) (x+W−1, y)

v. Suppose the top-left coordinate of the collocated luma region is (x, y) and its width and height are W and H, then coordinate of the bottom-left position may be:

a) (x, y+H)
b) (x, y+H−1)

vi. Suppose the top-left coordinate of the collocated luma region is (x, y) and its width and height are W and H, then coordinate of the bottom-right position may be:

a) (x+W, y+H)
b) (x+W, y+H−1)
c) (x+W−1, y+H)
d) (x+W−1, y+H−1)

Figure 13:
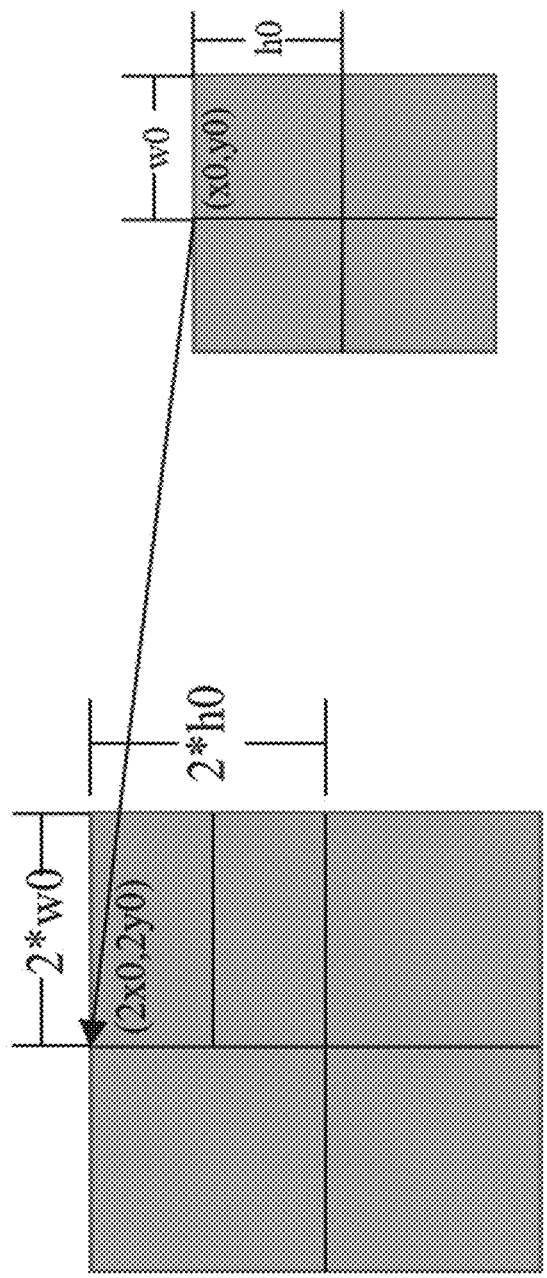
FIG. 13 shows an example of a corresponding luma region of a chroma block.

FIG. 13 shows an example of a corresponding luma region.

9. The signalling of usage of chroma PCIP mode may depend on coded information of one or more selected luma blocks.

a. In one example, if a selected block in the corresponding luma block is coded with intra block copy mode (i.e., MODE_IBC), the indication of usage of chroma PCIP may be not signalled. Furthermore, the indication of usage of PCIP may be inferred to be false when the prediction mode of a selected block of corresponding luma block is MODE_IBC.
  i. Alternatively, the indication of PCIP for a chroma block may be not signalled when all of the selected luma blocks are coded with IBC mode.
  ii. Alternatively, the indication of PCIP for a chroma block may be not signalled when all samples in the corresponding luma region are coded with IBC mode.
 b. In one example, the size of the selected luma block may be the smallest CU/PU/TU size or the unit for motion/mode storage (such as 4×4).
 c. In one example, a selected luma block may be the CU/PU/TU covering the center, top left, top right, bottom left or bottom right position of the corresponding luma region as shown in FIG. 4-1.
  i. In one example, suppose the top-left coordinate of current chroma block is (x0, y0), width and height of the current chroma block is w0 and h0, respectively. The coordinate of top-left sample in the corresponding luma region, width and height of the corresponding luma region may be scaled according to the colour format.
   a) for the 4:2:0 colour format, the top-left coordinate of the collocated luma region is (2*x0, 2*y0), its width and height are 2*w0 and 2*h0, respectively.
   b) for the 4:4:4 colour format, the top-left coordinate of the collocated luma region is (x0, y0), its width and height are w0 and h0, respectively.
  ii. Suppose the top-left coordinate of the collocated luma region is (x, y) and its width and height are W and H, then coordinate of the center position may be:
   a) (x+W/2, y+H/2)
   b) (x+W/2−1, y+H/2−1)
   c) (x+W/2, y+H/2−1)
   d) (x+W/2−1, y+H/2)
  iii. Suppose the top-left coordinate of the collocated luma region is (x, y) and its width and height are W and H, then coordinate of the top-left position may be (x, y).
  iv. Suppose the top-left coordinate of the collocated luma region is (x, y) and its width and height are W and H, then coordinate of the top-right position may be:
   a) (x+W, y)
   b) (x+W−1, y)
  v. Suppose the top-left coordinate of the collocated luma region is (x, y) and its width and height are W and H, then coordinate of the bottom-left position may be:
   a) (x, y+H)
   b) (x,y+H−1)
  vi. Suppose the top-left coordinate of the collocated luma region is (x, y) and its width and height are W and H, then coordinate of the bottom-right position may be:
   a) (x+W, y+H)
   b) (x+W,y+H−1)
   c) (x+W−1,y+H)
   d) (x+W−1,y+H−1)

10. It is proposed to treat CPM mode as a separate prediction mode (e.g., denoted by MODE_PLT_IBC) in addition to existing prediction modes.
 a. In one example, the prediction modes may include intra, intra block copy, palette modes and CPM mode for intra slices/I pictures/intra tile groups.
 b. Alternatively, the prediction modes may include intra, palette modes, CPM modes for intra slices/I pictures/intra tile groups.
 c. In one example, the prediction modes may include intra, inter, intra block copy, palette modes and CPM modes for inter slices/P and/or B pictures/inter tile groups.
 d. Alternatively, the prediction modes may include at least two of intra, inter, intra block copy, palette mode and CPM mode.
 e. In one example, when the prediction mode is the inter mode (i.e., MODE_INTER), the signalling of the indication of usage of CPM mode may be skipped. Furthermore, the indication of usage of CPM mode may be inferred to be false when the current prediction mode is MODE_INTER.
11. CPM may be treated as a special case to existing prediction mode. In this case, the CPM mode related syntax may be further signalled under certain conditions of usage of existing prediction mode.
 a. In one example, when the prediction mode is the intra mode (i.e., MODE_INTRA), the signalling of CPM related syntax may be skipped. Furthermore, the indication of usage of CPM mode may be inferred to be false when the current prediction mode is MODE_INTRA.
 b. In one example, when the prediction mode is the skip mode (i.e., the skip flag equal to 1), the signalling of the CPM related syntax may be skipped. Furthermore, the indication of usage of CPM may be inferred to be false when the skip mode is employed on the current CU.
 c. In one example, when the prediction mode is the palette mode (e.g. MODE_PLT), the indication of usage of CPM and CPM related syntax may be signalled.
 d. Alternatively, when the prediction mode is the intra mode, inter mode or intra block copy mode, the CPM related syntax may be skipped.
 e. Alternatively, when the prediction mode is the intra mode and not the Pulse-code modulation (PCM) mode, the CPM related syntax may be signalled.
 f. In one example, when the prediction mode is the palette mode (e.g. MODE_PLT), the indication of usage of CPM and CPM related syntax may be signalled before or after the indication of usage of the PCM mode. In one example, when CPM mode is applied, the signalling of CPM related syntax may be signalled.
 g. when the prediction mode is intra mode, inter mode or intra block copy mode, the signalling of CPM related syntax may be skipped.
 h. Alternatively, when the prediction mode is the intra mode and not the Pulse-code modulation (PCM) mode, the CPM related syntax may be signalled.
 i. In one example, when the prediction mode is the intra block copy mode, the CPM related syntax may be signalled.

j. Alternatively, when the prediction mode is the palette mode, inter mode or intra mode, the signalling of CPM related syntax may be skipped.
k. The above methods may be also applied on PCIP or other palette related methods.

12. The MV of a block coded with CPM may be also used as a MV prediction for the subsequent blocks.
    a. In one example, the MV of a block coded with CPM may be used as a merge candidate for other blocks.
    b. In one example, the MV of a block coded with CPM may be used as a HMVP candidate for other blocks.
        i. Alternatively, furthermore, the HMVP table may be updated after coding a block coded with CPM.
    c. In one example, the MV of a block coded with CPM may be used as an AMVP candidate for other blocks.
    d. Alternatively, the HMVP table updating process is disallowed after coding one CPM-coded block.
    e. Alternatively, the BV of a CPM-coded block may be disallowed to be used as motion vector predictors for subsequent blocks.
13. The intra prediction direction of a block coded with PCIP may be also used as an intra mode predictor of the subsequent blocks.
    a. In one example, the intra prediction direction of a block coded with PCIP may be used as a MPM mode for subsequent blocks.
        i. In one example, if a block coded with PCIP selects horizontal direction, the intra mode may be set to VER_IDX and may be used as a MPM mode for subsequent blocks.
        ii. In one example, if a block coded with PCIP selects vertical direction, the intra mode may be set to HOR_IDX and may be used as a MPM mode for subsequent blocks.
    b. Alternatively, the intra prediction direction of a CPM-coded block may be disallowed to be used as a MPM for subsequent blocks.
14. Maximum number of entries in the palette to be used may be changed from one video unit (e.g., CTB, CU, PU, TU) to another video unit. Binarization may be changed according to the maximum number of entries in the palette to be used.
    a. In one example, it may depend on the coded information.
        i. In one example, it may depend on the block dimension.
            a) In one example, the sizes of larger block coded with palette mode may have larger maximum number of entries while the sizes of smaller block coded with palette mode may have smaller maximum number of entries.
            b) In one example, for 4×4 blocks, only N0 palette entries may be allowed.
            c) In one example, for 8×4 block and/or 4×8 blocks, only N1 palette entries may be allowed.
            d) In one example, for 8×8 blocks, only N2 palette entries may be allowed.
            e) In one example, for 16×16 blocks, only N3 palette entries may be allowed.
            f) In one example, N0, N1, N2 and N3 are fixed number (e.g. 3, 7 or 15) and they may be same or different.
            g) In one example, the relationship between maximum of palette entries and block dimension is tabulated as follows: where the W and H denote the current block width and block height respectively and Max is an operation to get a larger one between two inputs.

TABLE 4-1

One example of relationship between maximum palette entries and block dimension

| Max (W, H) | Maximum of palette entries |
| --- | --- |
| 4 | 3 |
| 8 | 7 |
| 16 | 15 |
| 32 | 31 |
| 64 | 31 |
| 128 | 31 | h) In one example, the relationship between maximum of palette entries and block dimension is tabulated as follows: where the W and H denote the current block width and block height respectively and Max is an operation to get a larger one between two inputs.

TABLE 4-2

One example of relationship between maximum palette entries and block dimension

| Max(W, H) | Maximum of palette entries |
| --- | --- |
| 4 | 3 |
| 8 | 15 |
| 16 | 15 |
| 32 | 31 |
| 64 | 31 |
| 128 | 31 | b. In one example, it may depend on the colour component.
        i. In one example, luma blocks coded with palette mode may have larger maximum number of entries while chroma blocks coded with palette mode may have smaller maximum number of entries.
            a) In one example, the maximum number of entries of luma blocks may be N, thus the maximum number of entries of chroma blocks may be M.
                i. In one example, M is a fixed number(e.g 3, 7 or 15) and M may be smaller than N.
    c. In one example, it may depend on partitioning structures, such as dual tree or single tree.
15. It is proposed to disallow scaling matrix (e.g., user-defined scaling matrix) for palette/CPM/PCIP coded blocks.
    a. Alternatively, scaling matrix may be applied to palette/CPM/PCIP coded blocks.
    b. In one example, how to select scaling matrix for palette/CPM/PCIP coded blocks may be performed in the same way as transform skip coded blocks.
16. Context modelling for coding the usage of IBC mode (e.g., cu_skip_flag and/or pred_mode_ibc_flag) may depend on coded information of current block, such as block dimension/block shape/partitioning tree depth (e.g., QT/BT/TT/MTT depth) and/or slice types.

a. In one example, the contexts for coding the indication of IBC flags may be derived based on the block size.
   i. In one example, the indication of usage of IBC mode under different block size may be signalled by using different contexts.
   ii. Alternatively, the indication of usage of IBC mode of blocks with block size smaller than or no greater than T may use one context. The blocks with other block sizes may use the other contexts (e.g., only one).
   iii. Alternatively, the indication of usage of IBC mode of blocks with block size greater than or no smaller than T may use one context. The blocks with other block sizes may use the other contexts (e.g., only one).
   iv. In one example, T may be based on:
      1. Video contents (e.g. screen contents or natural contents)
      2. A message signalled in the DPS/SPS/VPS/PPS/APS/picture header/slice header/tile group header/Largest coding unit (LCU)/Coding unit (CU)/LCU row/group of LCUs/TU/PU
      3. Indication of the colour format (such as 4:2:0, 4:4:4)
      4. Coding tree structure
      5. Slice/tile group type and/or picture type
      6. Colour component (e.g. may be only applied on chroma components or luma component)
      7. Temporal layer ID
      8. Profiles/Levels/Tiers of a standard
      9. Signalled to the decoder
b. In one example, the context modelling for coding the usage of IBC mode may be derived based on the block shape (e.g., square or non-square; ratios between width and height).
   i. Alternatively, the indication of IBC flags under different block shape may be signalled by using different context.
c. In one example, the context modelling of cu_skip_flag for I slices may be different from that for P/B slices.
   i. In one example, the context modelling of cu_skip_flag may be dependent on the neighboring blocks' cu_skip_flag information. While for PB slices, only one context may be used for coding cu_skip_flag. Or vice versa.
d. In one example, only one context may be utilized to code the usage of IBC mode.
e. The above methods may be only applied to those used for a specific slice/picture type.

17. The context modelling of cu_skip_flag may depend on whether a neighboring block is coded with IBC mode or not.
    a. In one example, a context may be used when at least one or both of neighboring blocks are coded with IBC mode.

18. Context coding of a bin associated with a first syntax element may depend on the values of a second syntax element associated with neighboring blocks (adjacent or non-adjacent).
    a. In one example, the first syntax element may be that used for indications of combined intra-inter prediction mode/triangular prediction mode.
    b. In one example, the second syntax element may be those related to IBC usage or context coding of a bin associated with a first syntax element may depend on the usage of IBC mode of neighboring blocks.
    c. Alternatively, the message may indicate whether the current slice/tile/sequence is screen content.

19. The coded block flag (cbf) may be inferred for a block coded with QR-BDPCM mode instead of being signalled.
a. Alternatively, in one example, the cbf may be inferred to 1 on a block coded with QR-BDPCM mode.
b. The above method may be applied on luma cbf and/or chroma cbf.

20. The chroma DM mode may be not allowed when the corresponding luma block covering the center position of the current chroma block and/or used to derive DM mode is not coded with an intra mode (e.g. MODE_INTRA). Let A be the corresponding luma block to be used in the DM mode derivation process (e.g., the one covering the corresponding center position of the current chroma block).
    a. In one example, the chroma DM mode may be not allowed when A is coded with IBC and/or variance of IBC mode.
    b. In one example, the chroma DM mode may be not allowed when A is coded with palette and/or variance of palette mode.
    c. In one example, the chroma DM mode may be not allowed when A is coded with PCM and/or variance of PCM mode.
    d. In above examples, if the chroma DM mode is not allowed (e.g., due to the prediction mode of corresponding luma block equal to certain mode), the indication of chroma DM mode/or may be not signalled.
       i. Alternatively, the indication of chroma DM mode may be signalled. However, a conformance bitstream should satisfy that when the chroma DM mode is not allowed (e.g., due to the prediction mode of corresponding luma block equal to certain mode), the decoded intra_chroma_pred_mode is not equal to a specific value (e.g., 4 when CCLM is off; 7 when CCLM is on).
    e. In one example, the intra prediction mode in the chroma DM mode may be derived based on the intra prediction direction (e.g., bdpcm_dir_flag) of A if A is coded with QR-BDPCM mode.
       i. In one example, the intra prediction mode in the chroma DM mode may be vertical mode (e.g, VER_IDX) if the intra prediction direction of A is vertical (e.g., bdpcm_dir_flag is equal to 1).
       ii. In one example, the intra prediction mode in the chroma DM mode may be horizontal mode (e.g, HOR_IDX) if the intra prediction direction of A is horizontal (e.g., bdpcm_dir_flag is equal to 0).
    f. In one example, the intra prediction mode in the chroma DM mode may be derived based on the usage of compound IBC and Palette mode.
       i. In one example, DM may be set to Planar or Horizontal/Vertical prediction mode.

21. The prediction block of a chroma block with DM mode may be filled by the prediction block generated from an intra prediction method when the corresponding luma block covering the center position of the current chroma block and/or used to derive the DM mode is not coded with an intra mode (e.g. MODE_INTRA). Let A be the corresponding luma block to be used in the DM mode derivation process (e.g., the one covering the corresponding center position of the current chroma block).
  a. In one example, intra prediction method may be that used for vertical intra prediction when A is coded with palette and/or variance of palette mode.
    i. Alternatively, in one example, the predictions of chroma DM mode may be filled by horizontal predictions when A is coded with palette and/or variance of palette mode.
    ii. Alternatively, in one example, the predictions of chroma DM mode may be filled by planar predictions when A is coded with palette and/or variance of palette mode.
    iii. Alternatively, in one example, the predictions of chroma DM mode may be filled by DC predictions when A is coded with palette and/or variance of palette mode.
    iv. Alternatively, in one example, the predictions of chroma DM mode may be filled by any intra prediction mode when A is coded with palette and/or variance of palette mode.
  b. In one example, the prediction of a chroma block may be generated based on the intra prediction mode of the neighboring (adjacent or non-adjacent) luma block and/or the intra prediction mode of the neighboring (adjacent or non-adjacent) chroma block in current colour component or the other colour component.
  c. In one example, the intra prediction method may be corresponding to the intra prediction mode assigned to PCM blocks during MPM list construction.
  d. In one example, the intra prediction method may be corresponding to the intra prediction mode assigned to luma PCM blocks.
  e. In one example, the intra prediction method may be corresponding to the intra prediction mode assigned to chroma PCM blocks.
  f. In one example, the intra prediction method may be corresponding to the $1^{st}$ intra prediction mode in the MPM list of A.
  g. The above methods may be applied when A is coded with IBC and/or variance of IBC mode.
    i. Alternatively, the above methods may be applied when A is coded with PCM and/or variance of PCM mode.
    ii. Alternatively, the above methods may be applied when A is coded with QR-BDPCM and/or variance of QR-BDPCM mode.
22. The prediction block of a chroma block with DM mode may be derived following the way of handling chroma blocks with invalid block vectors.
  a. In one example, the prediction block of a chroma block with DM mode may be filled with default values.
    i. Alternatively, furthermore, the default values may be fixed to be M.
    ii. Alternatively, furthermore, the default values may be dependent on input and/or internal bit-depth.
  b. In one example, the above method may be applied when the prediction mode of the corresponding luma block is not intra mode.
    i. In one example, the above method may be applied when the prediction mode of the corresponding luma block is IBC mode and/or variance of IBC mode.
    ii. In one example, the above method may be applied when the prediction mode of the corresponding luma block is Palette mode and/or variance of Palette mode.
23. A block may have a default intra mode.
  a. In one example, the default mode may be DC/PLANAR/VER/HOR mode.
  b. In one example, the default mode may be any intra mode.
  c. In one example, the default mode may be used as a most probable mode (MPM) in the intra modes coding process.
    i. Alternatively, in one example, when fetching the intra modes from neighboring blocks, the default mode of a neighboring block is used if this block and the current block are in different video coding unit (e.g. Tile, slice and brick).
  d. In one example, in the chroma DM mode, the default mode of the corresponding luma block may be used to derive the DM mode.
  e. The above methods may be used if the block is not coded with an intra mode.
    i. Alternatively, the above methods may be used if the block is coded with IBC/Inter/QRDPCM/PCM/Palette mode.
    ii. Alternatively, the above methods may be used if the intra mode of the current block is not decoded.
24. During MPM list construction, if a neighboring block is coded in PCM mode, it may be considered as DC prediction mode.
25. How to apply the TPM and/or TPM blending process and/or storage of motion information may be based on the coded information of neighboring blocks.
  a. In one example, if its neighboring blocks (e.g. left and above neighboring blocks in FIG. 12) are coded with IBC/palette/TS/QR-BDPCM mode, TPM blending process may be disabled for the current block.
  b. In one example, if its neighboring blocks (e.g. left and above neighboring blocks in FIG. 12) are coded with IBC/palette/TS/QR-BDPCM mode, a different blending process/motion storage process for the current block may be applied.

Quantization Parameters for Blocks Coded with Identity Transform (e.g., Transform Skip Mode, QR-BDPCM etc. al)
26. Signalling of indications of coding tools using identity transform may depend on decoded quantization parameter from the bitstream.
  a. In one example, transform_skip_flag may be not signalled for some QPs; then the flag is inferred to be 0.
    i. In one example, when QP is smaller than (4+QpBdOffsetY), transform_skip_flag may be not signalled.
  b. intra_bdpcm_flag may be not signalled for some QPs; then the flag is inferred to be 0.
    i. In one example, when QP is smaller than (4+QpBdOffsetY), intra_bdpcm_flag may be not signalled.
27. Decoded quantization parameter from the bitstream for a block coded with identity transform may be modified according to the luma/chroma quantization parameter range offset (QpBdOffsetY, QpBdOffsetC).

a. In one example, if transform_skip_flag is equal to 1, a QP clipping may be applied.
   i. In one example, when transform_skip_flag is equal to 1, QP value may be set to (4+QpBdOffsetY) if it is smaller than (4+QpBdOffsetY).
   ii. In one example, when transform_skip_flag is equal to 1, QP value may be set to a certain value QT if it is smaller than QT.
b. If transform_skip_flag is equal to 1, an offset may be added to the decoded QP values, denoted by QPdec.
   i. In one example, QPdec+4+QpBdOffsetY instead of QPdec may be applied to blocks with transform_skip_flag being 1.
c. The above methods may be also applicable to QR-DPCM coded blocks, e.g., when intra_bdpcm_flag is equal to 1.
d. In one example, the modified quantization parameter may be used in the quantization/de-quantization/filtering/prediction of delta QP signalling of subsequent blocks.

28. Decoded quantization parameter from the bitstream for a block coded with identity transform may be modified according to a fixed offset.
   a. In one example, if transform_skip_flag is equal to 1, a QP clipping may be applied.
      i. In one example, when transform_skip_flag is equal to 1, QP value may be set to 4 if it is smaller than 4.
      ii. In one example, when transform_skip_flag is equal to 1, QP value may be set to a certain value QT if it is smaller than QT.
   b. If transform_skip_flag is equal to 1, an offset may be added to the decoded QP values, denoted by QPdec.
      i. In one example, QPdec+4 instead of QPdec may be applied to blocks with transform_skip_flag being 1.
   c. The above methods may be also applicable to QR-DPCM coded blocks, e.g., when intra_bdpcm_flag is equal to 1.
   d. In one example, the modified quantization parameter may be used in the quantization/de-quantization/filtering/prediction of delta QP signalling of subsequent blocks.

29. Decoded quantization parameter from the bitstream for a block coded with identity transform may be modified according to input bitdepth, denoted as bdi.
   a. In one example, if transform_skip_flag is equal to 1, a QP clipping may be applied.
      i. In one example, when transform_skip_flag is equal to 1, QP value may be set to (4+6*(bdi−8)) if it is smaller than (4+6*(bdi−8)).
   b. If transform_skip_flag is equal to 1, an offset may be added to the decoded QP values, denoted by QPdec.
      i. In one example, QPdec+(4+6*(bdi−8)) instead of QPdec may be applied to blocks with transform_skip_flag being 1.
   c. The above methods may be also applicable to QR-DPCM coded blocks, e.g., when intra_bdpcm_flag is equal to 1.
   d. In one example, the modified quantization parameter may be used in the quantization/de-quantization/filtering/prediction of delta QP signalling of subsequent blocks.

30. Decoded quantization parameter from the bitstream for a block coded with identity transform may be modified according to internal bitdepth (bd) and input bitdepth denoted as (bdi).
   a. In one example, if transform_skip_flag is equal to 1, a QP clipping may be applied.
      i. In one example, when transform_skip_flag is equal to 1, QP value may be set to (4+6*(bd−bdi)) if it is smaller than (4+6*(bd−bdi)).
   b. If transform_skip_flag is equal to 1, an offset may be added to the decoded QP values, denoted by QPdec.
      i. In one example, QPdec+(4+6*(bd−bdi)) instead of QPdec may be applied to blocks with transform_skip_flag being 1.
   c. The above methods may be also applicable to QR-DPCM coded blocks, e.g., when intra_bdpcm_flag is equal to 1.
   d. In one example, the modified quantization parameter may be used in the quantization/de-quantization/filtering/prediction of delta QP signalling of subsequent blocks.

31. The decoded quantization parameter mentioned above may be the quantization parameter without considering internal bitdepth QP offset (e.g., without adding QpBdOffsetY).
   a. Alternatively, the decoded quantization parameter mentioned above may be the quantization parameter considering internal bitdepth QP offset.

32. It is proposed to indicate the input bitdepth in the bitstream.
   a. In one example, a syntax element input_bitdepth_minus8 that is equal to (input_bitdepth−8) may be signalled in SPS/VPS to indicate the bitdepth of input video.
      i. In one example, the syntax element has a range 0 . . . dQP, where dQP is a fixed value.
   b. In one example, a syntax element bitdepth_minus_input_bitdepth that is equal to (internal_bitdepth−input_bitdepth) may be signalled in SPS/VPS to indicate the bitdepth of input video.
      i. In one example, the syntax element has a range 0 . . . dQP, where dQP is a fixed value.

33. Whether to and/or how to apply above methods may be based on:
   a. Video contents (e.g. screen contents or natural contents)
   b. A message signalled in the DPS/SPS/VPS/PPS/APS/picture header/slice header/tile group header/Largest coding unit (LCU)/Coding unit (CU)/LCU row/group of LCUs/TU/PU block/Video coding unit
   c. Position of CU/PU/TU/block/Video coding unit
   d. Block dimension of current block and/or its neighboring blocks
      i. In one example, the above methods may be applied only when both the width and height of current block is smaller than T (e.g. 32 or 64).
   e. Block shape of current block and/or its neighboring blocks
   f. Prediction mode (e.g. pred_mode_ibc_flag) of the current block and/or its neighboring blocks
   g. The intra mode of the current block and/or its neighboring blocks
   h. The motion/block vectors of the current block and/or its neighboring blocks
   i. Indication of the colour format (such as 4:2:0, 4:4:4)
   j. Coding tree structure
   k. Slice/tile group type and/or picture type
   l. Colour component (e.g. may be only applied on chroma components or luma component)
   m. Temporal layer ID
   n. Profiles/Levels/Tiers of a standard

5 Embodiment on Top of JVET-N1001-v6

The following changes on top of the draft provided by JVET-N1001-v6 are highlighted in boldface italics. Deleted texts are marked with double brackets (e.g., [[a]] denotes the deletion of the character "a").

Sequence Parameter Set RBSP Syntax

| seq_parameter_set_rbsp( ) { | Descriptor |
|---|---|
| sps_max_sub_layers_minus1 | u(3) |
| ... | |

| seq_parameter_set_rbsp( ) { | Descriptor |
|---|---|
| sps_ibc_enabled_flag | u(1) |
| sps_palette_enabled_flag | u(1) |
| ... | u(1) |
| } | |

Coding Unit Syntax

| | Descriptor |
|---|---|
| coding_unit( x0, y0, cb Width, cbHeight, treeType ) { | |
|   if( slice_type != I \|\| sps_ibc_enabled_flag ) { | |
|     if( treeType != DUAL_TREE_CHROMA && | |
|     !( cbWidth = = 4 && cbHeight = = 4 && ! sps_ibc_enabled_flag ) ) | |
|       cu_skip_flag[ x0 ][ y0 ] | ae (v) |
|   [[ if( cu_skip_flag[ x0 ][ y0 ] = = 0 && slice_type != I | |
|     && !( cbWidth = = 4 && cbHeight = = 4 ) ) | |
|     pred_mode_flag | ae (v) |
|     if( ( ( slice_type = = I && cu_skip_flag[ x0 ][ y0 ] = =0 ) \|\| | |
|     ( slice_type != I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0 ) ) ) ) && | |
|     sps_ibc_enabled_flag && ( cbWidth != 128 \|\| cbHeight != 128 ) ) | |
|     pred_mode_ibc_flag | ae (v)]] |
|   } | |
|   if(cu_skip_flag[ x0 ][ y0 ] == 0) | |
|     pred_modes( x0, y0, cbWidth, cbHeight) | |
|   if(cu_palette_flag [ x0 ][ y0 ])· { | |
|     cu_palette_ibc_mode | |
|     if(treeType = = SINGLE_TREE) { | |
|       palette_coding( x0, y0, , nWidth, nHeight, 0, 3) | |
|     } else { | |
|     if(treeType = = DUAL_TREE_LUMA ) | |
|       palette_coding( x0, y0, , nWidth, nHeight, 0, 1 ) | |
|     if(treeType = = DUAL_TREE_CHROMA) | |
|       palette_coding( x0, y0, , nWidth/SubWidthC, nHeight/SubHeightC , 1, 2 ) | |
|   } | |
| } else { | |
|   if( CuPredMode[ x0 ][ y0 ] = = MODE_INTRA ) { | |
|     if(sps_pcm_enabled_flag && | |
|     cbWidth >= MinIpcmCbSizeY && cbWidth <= MaxIpcmCbSizeY && | |
|     cbHeight >= MinIpcmCbSizeY && cbHeight <= MaxIpcmCbSizeY ) | |
|     pcm_flag[ x0 ][ y0 ] | |
| ... | |
|   } | |
| } | |

Prediction Mode Syntax

The entire text and tables hereafter are proposed to be new additions to the current version of VVC.

| | Descriptor |
|---|---|
| pred_modes ( x0, y0, cbWidth, cbHeight) { | |
|   if(sps_ibc_enabled_flag) { | |
|     if(slice_type == I \|\| ( cbWidth == 4 && cbHeight == 4)){ | |
|       if(cbWidth <128 \|\| cbHeight < 128) | |
|         pred_mode_ibc_flag | ae (v) |
|     if(!pred_mode_ibc_flag && sps_plt_enabled_flag && cbWidth <=64 && cbHeight <= 64) | |
|       cu_palette_flag | |
|   }else{ | |
|     pred_mode_flag | ae (v) |
|     if(CuPredMode[ x0 ][ y0 ] == MODE_INTRA){ | |
|       if(sps_plt_enabled_flag && cbWidth <=64 && cbHeight <= 64) | |
|         cu_palette_flag | ae (v) |
|   } | |

|  | Descriptor |
|---|---|
| ```
        else{
            if(cbWidth < 128 || cbHeight < 128)
                pred_mode_ibc_flag
        }
      }
    }
  }
  else{
    if(slice_type == I ||( cbWidth == 4 && cbHeight == 4)){
      if(sps_plt_enabled_flag && cbWidth <=64 && cbHeight <= 64)
        cu_palette_flag
    }else{
      pred_mode_flag
      if(CuPredMode[ x0 ][ y0 ] != MODE_INTRA && sps_plt_enabled_flag
&& cbWidth
        <=64 && cbHeight <= 64)
          cu_palette_flag
      }
  }
}
``` | <br><br>ae (v) <br><br><br><br><br><br><br><br><br><br><br><br>ae (v) |

Palette Syntax

The entire text and tables hereafter are proposed to be new additions to the current version.

|  | Descriptor |
|---|---|
| ```
palette_coding( x0, y0, nWidth, nHeight, startComp, numComps) {
  palettePredictionFinished = 0
  NumPredictedPaletteEntries = 0
  for( predictorEntryIdx = 0; predictorEntryIdx < PredictorPaletteSize
[startComp] &&
      !palettePredictionFinished && NumPredictedPaletteEntries
[startComp] < palette_max_size;
      predictorEntryIdx++ ) {
    palette_predictor_run
    if( palette_predictor_run != 1) {
      if( palette_predictor_run > 1 )
        predictorEntryIdx += palette_predictor_run − 1
      PalettePredictorEntryReuseFlags[startComp][ predictorEntryIdx ] =
1
      NumPredictedPaletteEntries[startComp]++
    } else
      palettePredictionFinished = 1
  }
  if( NumPredictedPaletteEntries[startComp] < palette_max_size )
    num_signalled_palette_entries[ startComp ]
  for( cIdx = startComp; cIdx < ( startComp + numComps); cIdx++ )
    for( i = 0; i < num_signalled_palette_entries[ startComp ]; i++ )
      new_palette_entries[ startComp] [ i ]
  if( CurrentPaletteSize != 0 )
    palette_escape_val_present_flag[ startComp ]
  if( MaxPaletteIndex > 1) {
    num_palette_indices_minus1
    adjust = 0
    for( i = 0; i <= num_palette_indices_minus1; i++ ) {
      if( MaxPaletteIndex − adjust > 1 ) {
        palette_index_idc
        PaletteIndexIdc [ i ] = palette_index_idc
      }
      adjust = 1
    }
    copy_above_indices_for_final_run_flag
    palette_transpose_flag[ startComp ]
  }
  remainingNumIndices = num_palette_indices_minus1 + 1
  PaletteScanPos = 0
  while( PaletteScanPos <nWidth*nHeightt) {
    xC = x0 + ScanOrder[nWidth][nHeight][ 3 ][ PaletteScanPos ] [ 0 ]
    yC = y0 + ScanOrder[nWidth][nHeight][ 3 ][ PaletteScanPos ] [ 1 ]
    if( PaletteScanPos > 0) {
      xcPrev = x0 + ScanOrder[nWidth][nHeight][ 3 ][ PaletteScanPos −
1 ][ 0 ]
      ycPrev = y0 + ScanOrder[nWidth][nHeight][ 3 ][ PaletteScanPos −
1 ][ 1 ]
``` | <br><br><br><br><br><br><br><br>ae (v)<br><br><br><br><br><br><br><br><br>ae (v)<br><br><br>ae (v)<br>ae (v)<br>ae (v)<br><br><br><br>ae (v)<br><br><br><br>ae (v)<br>ae (v) |

-continued

|  | Descriptor |
|---|---|
|     }<br>    PaletteRun = nWidth * nHeight − PaletteScanPos − 1<br>    CopyAboveIndicesFlag[ xC ][ yC ] = 0<br>    if( MaxPaletteIndex > 1 )<br>      if( ((!palette_transpose_flag && PaletteScanPos>=nWidth) \|\| (<br>(palette_transpose_flag && PaletteScanPos>=nHeight)) &&<br>CopyAboveIndicesFlag[ xcPrev ][ ycPrev ] = = 0 )<br>        if( remainingNumIndices > 0 && PaletteScanPos < nWidth*<br>nHeight − 1 ) {<br>          copy_above_palette_indices_flag | ae (v) |
|           CopyAboveIndicesFlag[ xC ] [ yC ] =<br>copy_above_palette_indices_flag<br>        } else<br>          if( PaletteScanPos = = nWidth * nHeight − 1 &&<br>remainingNumIndices > 0 )<br>            CopyAboveIndicesFlag[ xC ][ yC ] = 0<br>          Else<br>            CopyAboveIndicesFlag[ xC ][ yC ] = 1<br>    if ( CopyAboveIndicesFlag[ xC ][ yC ] == 0 ) {<br>      currNumIndices = num_palette_indices_minus1 + 1−<br>remainingNumIndices<br>      CurrPaletteIndex = PaletteIndexIdc[ currNumIndices ]<br>    }<br>    if( MaxPaletteIndex > 1 ) {<br>      if ( CopyAboveIndicesFlag[ xC ] [ yC ] = = 0 )<br>        remainingNumIndices − = 1<br>      PaletteMaxRun = nCbS * nCbS − PaletteScanPos − 1 −<br>remainingNumIndices −<br>      copy_above_indices_for_final_run_flag<br>    if( remainingNumIndices > 0 \|\| CopyAboveIndicesFlag[ xC ][ yC ]<br>!=<br>        copy_above_indices_for_final_run_flag )<br>        if( PaletteMaxRun > 0 ) {<br>          palette_run_prefix | ae (v) |
|           if( ( palette_run_prefix > 1 )&&( PaletteMaxRun !=<br>            ( 1 << ( palette_run_prefix − 1 ) ) ) )<br>          palette_run_suffix | ae (v) |
|         }<br>    }<br>    runPos = 0<br>    while ( runPos <= PaletteRun ) {<br>      xR = x0 + ScanOrder[nWidth][nHeight][ 3 ][ PaletteScanPos ] [ 0 ]<br>      yR = y0 + ScanOrder[nWidth][nHeight][ 3 ][ PaletteScanPos ] [ 1 ]<br>      if( CopyAboveIndicesFlag[ xC ][ yC ] = = 0 ) {<br>        CopyAboveIndicesFlag[ xR ] [ yR ] = 0<br>        PaletteIndexMap[ startComp ][ xR ][ yR ] = CurrPaletteIndex<br>      } else {<br>        CopyAboveIndicesFlag[ xR ] [ yR ] = 1<br>      if (!palette_transpose_flag)<br>        PaletteIndexMap[ startComp ] [xR][yR] =<br>PaletteIndexMap[ startComp ] [xR] [yR − 1]<br>        else<br>        PaletteIndexMap[ startComp ] [xR][yR] =<br>PaletteIndexMap[ startComp ] [xR − 1][yR]<br>      }<br>      runPos++<br>      PaletteScanPos++<br>  }<br>}<br>if( palette_escape_val_present_flag ) {<br>   for( cIdx = startComp; cIdx < (startComp + numComps); cIdx++ )<br>     for(sPos = 0; sPos < nWidth* nHeight; sPos++ ) {<br>        xC = x0 + ScanOrder[ nWidth][nHeight][ 3 ][ sPos ] [ 0 ]<br>        yC = y0 + ScanOrder[ nWidth][nHeight][ 3 ][ sPos ] [ 1 ]<br>        if( PaletteIndexMap[ startComp ] [xC][yC] = =<br>(MaxPaletteIndex − !)){<br>          if( cIdx == 0 \|\| startComp != 0){<br>            palette_escape_sign | u (1) |
|             palette_escape_val | ue3 (v) |
|             PaletteEscapeVal[ cIdx ][ xC ][ yC ] = palette_escape_sign > 0 ?<br>palette_escape_val : −palette_escape_val<br>          }<br>          if(startComp == 0 && cIdx != 0 && xC % 2 = = 0 && yC %2 = =<br>0 ){<br>            palette_escape_sign | u (1) |
|             palette_escape_val | ue3 (v) |

| | Descriptor |
|---|---|
| PaletteEscapeVal[ cIdx ][ xC ][ yC ] = palette_escape_sign > 0 ? palette_escape_val : −palette_escape_val <br>        } <br>       } <br>      } <br>     } <br>    } <br> } | |

Palette Semantics

In the following semantics, the array indices x0, y0 specify the location (x0, y0) of the top-left luma sample of the considered coding block relative to the top-left luma sample of the picture.

cu_palette_flag specifies the use of palette mode in the current coding unit. cu_palette_flag==1 indicates that palette mode is applied in the current coding unit. cu_palette_flag==0 indicates that palette mode is not applied for the current coding unit.

palette_predictor_run is used to determine the number of zeros that precede a non-zero entry in the array PalettePredictorEntryReuseFlags.

For bitstream conformance, the value of palette_predictor_run may be in the range of 0 to (PredictorPaletteSize−predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries may be in the range of 0 to palette_max_size, inclusive.

num_signalled_palette_entries [startComp] specifies the number of entries in the current palette that are explicitly signalled for the first colour component of the current palette table startComp. When num_signalled_palette_entries [startComp] is not present, it is inferred to be equal to 0.

The variable CurrentPaletteSize specifies the size of the current palette and is derived as follows:

CurrentPaletteSize [startComp]=NumPredictedPaletteEntries [startComp]+num_signalled_palette_entries [startComp]   (XX)

The value of CurrentPaletteSize [startComp] may be in the range of 0 to palette_max_size, inclusive.

new_palette_entries[cIdx][i] specifies the value for the i-th signalled palette entry for the colour component cIdx.

The variable PredictorPaletteEntries[cIdx][i] specifies the i-th element in the predictor palette for the colour component cIdx.

The variable CurrentPaletteEntries[cIdx][i] specifies the i-th element in the current palette for the colour component cIdx and is derived as follows:

```
numPredictedPaletteEntries = 0
for( i = 0; i < PredictorPaletteSize[ startComp]; i++ )
   if( PalettePredictorEntryReuseFlags[ i ] ) {
      for( cIdx =startComp; cIdx < (startComp + numComps); cIdx++ )
         CurrentPaletteEntries[ cIdx ][ numPredictedPaletteEntries ] =
            PredictorPaletteEntries[ cIdx ][ i ]
         numPredictedPaletteEntries++
   }
for( i = 0; i < num_signalled_palette_entries[startComp]; i++ )
   for( cIdx = startComp; cIdx < (startComp + numComps); cIdx++)
      CurrentPaletteEntries[ cIdx ][ numPredictedPaletteEntries + i ] =
         new_palette_entries[ cIdx ][ i ]   (XX)
``` palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.

The variable MaxPaletteIndex specifies the maximum possible value for a palette index for the current coding unit. The value of MaxPaletteIndex is set equal to CurrentPaletteSize+palette_escape_val_present_flag if the cu_palette_ibc_mode is 0. Otherwise, if the cu_palette_ibc_mode is 1, the MaxPaletteIndex is set equal to CurrentPaletteSize+palette_escape_val_present_flag+1 num_palette_indices_minus1 plus 1 is the number of palette indices explicitly signalled or inferred for the current block. When num_palette_indices_minus1 is not present, it is inferred to be equal to 0.

palette_index_idc is an indication of an index to the array represented by CurrentPaletteEntries. The value of palette_index_idc may be in the range of 0 to MaxPaletteIndex, inclusive, for the first index in the block and in the range of 0 to (MaxPaletteIndex−1), inclusive, for the remaining indices in the block.

When palette_index_idc is not present, it is inferred to be equal to 0.

The variable PaletteIndexIdc[i] stores the i-th palette_index_idc explicitly signalled or inferred. All elements of the array PaletteIndexIdc[i] are initialized to 0.

copy_above_indices_for_final_run flag equal to 1 specifies that the palette indices of the last positions in the coding unit are copied from the palette indices in the row above if horizontal traverse scan is used or the palette indices in the left column if vertical traverse scan is used.

copy_above_indices_for_final_run flag equal to 0 specifies that the palette indices of the last positions in the coding unit are copied from PaletteIndexIdc[num_palette_indices_minus1].

When copy_above_indices_for_final_run_flag is not present, it is inferred to be equal to 0.

palette_transpose_flag equal to 1 specifies that vertical traverse scan is applied for scanning the indices for pixels in the current coding unit. palette_transpose_flag equal to 0 specifies that horizontal traverse scan is applied for scanning the indices for pixels in the current coding unit.

copy_above_palette_indices_flag equal to 1 specifies that the palette index is equal to the palette index at the same location in the row above if horizontal traverse scan is used or the same location in the left column if vertical traverse scan is used. copy_above_palette_indices_flag equal to 0 specifies that an indication of the palette index of the sample is coded in the bitstream or inferred.

The variable CopyAboveIndicesFlag[xC][yC] equal to 1 specifies that the palette index is copied from the palette index in the row above (horizontal scan) or left column (vertical scan).

CopyAboveIndicesFlag[xC][yC] equal to 0 specifies that the palette index is explicitly coded in the bitstream or inferred.

The array indices xC, yC specify the location (xC, yC) of the sample relative to the top-left luma sample of the picture.
The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] may be in the range of 0 to MaxPaletteIndex, inclusive.
The variable PaletteRun specifies the number of consecutive locations minus 1 with the same palette index as the position in the above row (horizontal scan) or in the left column (vertical scan) when CopyAboveIndicesFlag[xC][yC] is equal to 1 or specifies the number of consecutive locations minus 1 with the same palette index when CopyAboveIndicesFlag[xC][yC] is equal to 0.

The variable PaletteMaxRun represents the maximum possible value for PaletteRun. For bitstream conformance, the value of PaletteMaxRun may be greater than or equal to 0.
palette_run_prefix specifies the prefix part in the binarization of PaletteRun.
palette_run_suffix specifies the suffix part in the binarization of PaletteRun. When palette_run_suffix is not present, the value of palette_run_suffix is inferred to be equal to 0.
The value of PaletteRun is derived as follows:
If palette_run_prefix is less than 2, the following applies:

$$\text{PaletteRun} = \text{palette\_run\_prefix} \quad (XX)$$

Otherwise (palette_run_prefix is greater than or equal to 2), the following applies:

$$\text{PrefixOffset} = 1 << (\text{palette\_run\_prefix} - 1)$$
$$\text{PaletteRun} = \text{PrefixOffset} + \text{palette\_run\_suffix} \quad (XX)$$

palette_escape_val specifies the quantized escape coded sample value for a component.
The variable PaletteEscapeVal[cIdx][xC][yC] specifies the escape value of a sample for which PaletteIndexMap[xC][yC] is equal to (MaxPaletteIndex−1) and palette_escape_val_present_flag is equal to 1. The array index cIdx specifies the colour component. The array indices xC, yC specify the location (xC, yC) of the sample relative to the top-left luma sample of the picture.
For bitstream conformance, PaletteEscapeVal[cIdx][xC][yC] may be in the range of 0 to (1<<(BitDepthY+1))−1, inclusive, for cIdx equal to 0, and in the range of 0 to (1<<(BitDepthC+1))−1, inclusive, for cIdx not equal to 0.

General Decoding Process for Coding Units Coded in Intra Prediction Mode

Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.4.1 is invoked with the luma location (xCb, yCb), the width of the current coding block in luma samples cbWidth and the height of the current coding block in luma samples cbHeight, and the variable treeType as inputs.

When treeType is equal to SINGLE_TREE or treeType is equal to DUAL_TREE_LUMA, the decoding process for luma samples is specified as follows:

If pcm_flag[xCb][yCb] is equal to 1, the reconstructed picture is modified as follows:

$$S_L[\ xCb + i\ ][\ yCb + j\ ] =$$
$$\text{pcm\_sample\_luma}[\ (\text{cbHeight} * j\ ) + i\ ] << (\ \text{BitDepth}_Y - \text{PcmBitDepth}_Y\ ), (8\text{-}1)$$
$$\text{with } i = 0..\text{cbWidth} - 1, j = 0..\text{cbHeight} - 1$$

Otherwise, if cu_palette_flag[xCb][yCb] is equal to 1, the following applies:
    If treeType is equal to SINGLE_TREE, the following applies:
      1. The general decoding process for palette blocks as specified in clause XXX is invoked with the luma location (xCb, yCb), the variable startComp set equal to 0, the variable cIdx set to 0, the variable nTbW set equal to cbWidth, the variable nTbH set equal to cbHeight.
    Otherwise, the following applies:
      1. The general decoding process for palette blocks as specified in clause XXX is invoked with the luma location (xCb, yCb), the variable startComp set equal to 0, the variable cIdx set to 0, the variable nTbW set equal to cbWidth, the variable nTbH set equal to cbHeight.
      2. The general palette predictor updating process for palette blocks as specified in clause 8.X.X is invoked with the luma location (xCb, yCb), the variable startComp set equal to 0, the variable numComps set equal to 1.
  Otherwise, the following applies:
    1. The derivation process for the luma intra prediction mode as specified in clause 8.2.2 is invoked with the luma location (xCb, yCb), the width of the current coding block in luma samples cbWidth and the height of the current coding block in luma samples cbHeight as input.
    2. The general decoding process for intra blocks as specified in clause 8.2.4.1 is invoked with the luma location (xCb, yCb), the tree type treeType, the variable nTbW set equal to cbWidth, the variable nTbH set equal to cbHeight, the variable predModeIntra set equal to IntraPredModeY[xCb][yCb], and the variable cIdx set equal to 0 as inputs, and the output is a modified reconstructed picture before in-loop filtering.

When treeType is equal to SINGLE_TREE or treeType is equal to DUAL_TREE_CHROMA, the decoding process for chroma samples is specified as follows:
  If pcm_flag[xCb][yCb] is equal to 1, the reconstructed picture is modified as follows:

$S_{Cb}[\ xCb\ /\ SubWidthC + i\ ][\ yCb\ /\ SubHeightC + j\ ] =$
  $pcm\_sample\_chroma[\ (\ cbHeight\ /\ SubWidthC\ *\ j\ ) + i\ ] << (\ BitDepth_C - PcmBitDepth_C\ ),$
    with $i = 0..\ cbWidth\ /\ SubWidthC - 1$ and $j = 0..\ cbHeight\ /\ SubHeightC - 1 (8\text{-}2)$ $S_{Cr}[\ xCb\ /\ SubWidthC + i\ ][\ yCb\ /\ SubHeightC + j\ ] =$
  $pcm\_sample\_chroma[\ (\ cbHeight\ /\ SubWidthC\ *\ (j + cbHeight\ /\ SubHeightC\ )\ ) + i\ ]$
  $<<$
    $(\ BitDepth_C - PcmBitDepth_C\ ),$
    with $i = 0..cbWidth\ /\ SubWidthC - 1$ and $j = 0..cbHeight\ /\ SubHeightC - 1(8\text{-}3)$ Otherwise, if cu_palette_flag[xCb][yCb] is equal to 1, the following applies:
  If treeType is equal to SINGLE_TREE, the following applies:
    1. The general decoding process for palette blocks as specified in clause XXX is invoked with the luma location (xCb, yCb), the variable startComp set equal to 0, the variable cIdx set to 1, the variable nTbW set equal to (cbWidth/2), the variable (cbHeight/2) set equal to cbHeight.
    2. The general decoding process for palette blocks as specified in clause XXX is invoked with the luma location (xCb, yCb), the variable startComp set equal to 0, the variable cIdx set to 2, the variable nTbW set equal to (cbWidth/2), the variable (cbHeight/2) set equal to cbHeight.
    3. The general palette predictor updating process for palette blocks as specified in clause 8.X.X is invoked with the luma location (xCb, yCb), the variable startComp set equal to 0, the variable numComps set equal to 3.
  Otherwise, the following applies:
    1. The general decoding process for palette blocks as specified in clause XXX is invoked with the luma location (xCb, yCb), the variable startComp set equal to 1, the variable cIdx set to 1, the variable nTbW set equal to (cbWidth/2), the variable (cbHeight/2) set equal to cbHeight.
    2. The general decoding process for palette blocks as specified in clause XXX is invoked with the luma location (xCb, yCb), the variable startComp set equal to 1, the variable cIdx set to 2, the variable nTbW set equal to (cbWidth/2), the variable (cbHeight/2) set equal to cbHeight.
    3. The general palette predictor updating process for palette blocks as specified in clause XXX is invoked with the luma location (xCb, yCb), the variable startComp set equal to 1, the variable numComps set equal to 2.
Otherwise, the following applies:
  1. The derivation process for the chroma intra prediction mode as specified in clause 8.2.3 is invoked with the luma location (xCb, yCb), the width of the current coding block in luma samples cbWidth and the height of the current coding block in luma samples cbHeight as input.
  2. The general decoding process for intra blocks as specified in clause 8.2.4.1 is invoked with the chroma location (xCb/2, yCb/2), the tree type treeType, the variable nTbW set equal to (cbWidth/2), the variable nTbH set equal to (cbHeight/2), the variable predModeIntra set equal to IntraPredModeC [xCb][yCb], and the variable cIdx set equal to 1, and the output is a modified reconstructed picture before in-loop filtering.
  3. The general decoding process for intra blocks as specified in clause 8.2.4.1 is invoked with the chroma location (xCb/2, yCb/2), the tree type treeType, the variable nTbW set equal to (cbWidth/2), the variable nTbH set equal to (cbHeight/2), the variable predModeIntra set equal to IntraPredModeC [xCb][yCb], and the variable cIdx set equal to 2, and the output is a modified reconstructed picture before in-loop filtering.

Decoding Process for Palette Mode

Inputs to this process are:
  a location (xCb, yCb) specifying the top-left luma sample of the current block relative to the top-left luma sample of the current picture,
  a variable startComp specifies the first colour component in the palette table,
  a variable cIdx specifying the colour component of the current block,
  two variables nTbW and nTbH specifying the width and height of the current block, respectively.
Output of this process is an array recSamples[x][y], with x=0 . . . nTbW−1, y=0 . . . nTbH−1 specifying reconstructed sample values for the block.
Depending on the value of cIdx, the variables nSubWidth and nSubHeight are derived as follows:
  If cIdx is equal to 0, nSubWidth is set to 1 and nSubHeight is set to 1.
  If startComp is equal to 1 and if cIdx>1, nSubWidth is set to 1 and nSubHeight is set to 1.
  Otherwise, nSubWidth is set to SubWidthC and nSubHeight is set to SubHeightC.
If cu_palette_ibc_mode[xCb][yCb] is equal to 1 the following applies:
  The derivation process for the motion vectors as specified in clause 8.6.2 is invoked with a luma location (xCb, yCb) of the top-left sample of the current luma coding block relative to the top-left luma sample of the current picture, a variable cbWidth specifying the width of the current coding block in luma samples, and a variable cbHeight specifying the height of the current coding block in luma samples. The outputs are the luma motion vector in 1/16 fractional-sample accuracy mvL.

The general IBC prediction process as specified in clause 8.6.3 is invoked with a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, variables numSbX and numSbY specifying the number of luma coding subblocks in horizontal and vertical direction, the motion vectors mv[xSbIdx][ySbIdx] with xSbIdx=0 . . . numSbX−1, and ySbIdx=0 . . . numSbY−1, a variable cIdx specifying the colour component index of the current block. The output is an array predSamples of prediction samples predSamples[x][y].

The (nTbW×nTbH) block of the reconstructed sample array recSamples at location (xCb, yCb) is represented by recSamples[x][y] with x=0 . . . nTbW−1 and y=0 . . . nTbH−1, and the value of recSamples[x][y] for each x in the range of 0 to nTbW−1, inclusive, and each y in the range of 0 to nTbH−1, inclusive, is derived as follows:

The variables xL and yL are derived as follows:

$$xL = \text{palette\_transpose\_flag} \ ? \ x * \text{nSubHeight} : x * \text{nSubWidth} \quad (5\text{-}4)$$
$$yL = \text{palette\_transpose\_flag} \ ? \ y * \text{nSubWidth} : y * \text{nSubHeight} \quad (5\text{-}5)$$

The variable bIsEscapeSample is derived as follows:
If PaletteIndexMap[xCb+xL][yCb+yL] is equal to MaxPaletteIndex and palette_escape_val_present_flag is equal to 1, bIsEscapeSample is set equal to 1.

Otherwise, bIsEscapeSample is set equal to 0.
If bIsEscapeSample is equal to 0, the following applies:
If cu_palette_ibc_mode[xCb][yCb] is equal to 1 the following applies:
If PaletteIndexMap[xCb+xL][yCb+yL] is equal to 0, the following applies: recSamples[x][y]=predSamples[x][y]
Otherwise, the following applies:

$$\text{recSamples}[x][y] = \text{CurrentPaletteEntries}[cIdx][\text{PaletteIndexMap}[xCb + xL][yCb + yL] - 1] \quad (5\text{-}6)$$

Otherwise, the following applies:

$$\text{recSamples}[x][y] = \text{CurrentPaletteEntries}[cIdx][\text{PaletteIndexMap}[xCb + xL][yCb + yL]] \quad (5\text{-}7)$$

Otherwise, if cu_transquant_bypass_flag is equal to 1, the following applies:

$$\text{recSamples}[x][y] = \text{PaletteEscapeVal}[cIdx][xCb+xL][yCb+yL] \quad (5\text{-}8)$$

Otherwise (bIsEscapeSample is equal to 1 and cu_transquant_bypass_flag is equal to 0), the following ordered steps apply:
1. The derivation process for quantization parameters is invoked with the location (xCb, yCb) specifying the top-left sample of the current block relative to the top-left sample of the current picture.
2. The quantization parameter qP is derived as follows:
If cIdx is equal to 0, $$qP = \text{Max}(0, Qp'_Y) \quad (5\text{-}9)$$

Otherwise, if cIdx is equal to 1, $$qP = \text{Max}(0, Qp'_{Cb}) \quad (5\text{-}10)$$

Otherwise (cIdx is equal to 2), $$qP = \text{Max}(0, Qp'_{Cr}) \quad (5\text{-}11)$$

3. The variables bitDepth is derived as follows:

$$\text{bitDepth} = (cIdx == 0)?\text{BitDepth}_Y : \text{BitDepth}_C \quad (5\text{-}12)$$

4. The list levelScale[ ] is specified as levelScale[k]={40, 45, 51, 57, 64, 72} with k=0 . . . 5.
5. The following applies:

$$\text{tmpVal} = ( \text{PaletteEscapeVal}[ cIdx ][ xCb + xL ][ yCb + yL ] * \text{levelScale}[ qP\%6 ] ) << ( qP / 6 ) + 32 ) >> 6 \quad (5\text{-}13)$$
$$\text{recSamples}[ x ][ y ] = \text{Clip3}( 0, ( 1 << \text{bitDepth} ) - 1, \text{tmpVal} ) \quad (5\text{-}14)$$

Palete Predictor Update Process for Palette Mode
Inputs to this process are:
a location (xCb, yCb) specifying the top-left luma sample of the current block relative to the top-left luma sample of the current picture,
a variable startComp specifies the first colour component in the palette table,
a variable numComps specifies the number of colour components in the palette table, Output of this process is a variable PredictorPaletteSize[startComp] specifying the size of the updated palette predictor, and an array PredictorPaletteEntries[cIdx][i], with cIdx=startComp, . . . , startComp+numComps−1, i=0 . . . PredictorPaletteSize−1 specifying the updated palette predictor for the next block.
The variable PredictorPaletteSize and the array PredictorPaletteEntries are derived or modified as follows:

```
for( i = 0; i < CurrentPalette Size; i++ )
  for( cIdx = startComp; cIdx < (startComp + numComps); cIdx++ )
    newPredictorPaletteEntries[ cIdx ][ i ] = CurrentPaletteEntries[ cIdx ][ i ]
newPredictorPaletteSize = CurrentPaletteSize
for( i = 0; i < PredictorPaletteSize && newPredictorPaletteSize < PaletteMaxPredictorSize;
i++ )
  if( !PalettePredictorEntryReuseFlags[ i ] ) {
    for( cIdx = startComp; cIdx < (startComp + numComps); cIdx++ )
    (5-15)
      newPredictorPaletteEntries[ cIdx ][ newPredictorPaletteSize ] =
        PredictorPaletteEntries[ cIdx ][ i ]
    newPredictorPaletteSize++
  }
for( cIdx = startComp; cIdx < (startComp + numComps); cIdx++ )
  for( i = 0; i < newPredictorPaletteSize; i++ )
    PredictorPaletteEntries[ cIdx ][ i ] = newPredictorPaletteEntries[ cIdx ][ i ]
PredictorPaletteSize = newPredictorPaletteSize
For bitstream conformance, the value of PredictorPaletteSize may be in the range of 0 to
PaletteMaxPredictorSize, inclusive.
```

5.1 Embodiment #2

5.1.1 Scaling process for transform coefficients

Inputs to this process are:

a luma location (xTbY, yTbY) specifying the top-left sample of the current luma transform block relative to the top-left luma sample of the current picture, a variable nTbW specifying the transform block width, a variable nTbH specifying the transform block height, a variable cIdx specifying the colour component of the current block, a variable bitDepth specifying the bit depth of the current colour component.

Output of this process is the (nTbW)×(nTbH) array d of scaled transform coefficients with elements d[x][y].

The quantization parameter qP is derived as follows:

If cIdx is equal to 0, the following applies:

if transform_skip_flag[xTbY][yTbY] is equal to 1 or intra_bdpcm_flag[xTbY][yTbY] is equal to 1, the following applies:

$$qP=\text{Max}(4+QpBdOffset_Y, Qp'_Y) \quad (8\text{-}954)$$

Otherwise $$qP=Qp'_Y \quad (8\text{-}954)$$

Otherwise, if cIdx is equal to 1 and tu_joint_cbcr_residual [xTbY][yTbY] is equal to 1, the following applies:

$$qP=Qp'_{CbCr} \quad (8\text{-}955)$$

Otherwise, if cIdx is equal to 1, the following applies:

$$qP=Qp'_{Cb} \quad (8\text{-}956)$$

Otherwise (cIdx is equal to 2), the following applies:

$$qP=Qp'_{Cr}$$

In one example, the highlighted conditions may be further changed to:

if transform_skip_flag[xTbY][yTbY] is equal to 1, the following applies.

5.2 Embodiment #3

5.2.1 Scaling Process for Transform Coefficients

Inputs to this process are:

a luma location (xTbY, yTbY) specifying the top-left sample of the current luma transform block relative to the top-left luma sample of the current picture, a variable nTbW specifying the transform block width, a variable nTbH specifying the transform block height, a variable cIdx specifying the colour component of the current block, a variable bitDepth specifying the bit depth of the current colour component.

Output of this process is the (nTbW)×(nTbH) array d of scaled transform coefficients with elements d[x][y].

The quantization parameter qP is derived as follows:

If cIdx is equal to 0, the following applies:

if transform_skip_flag[xTbY][yTbY] is equal to 1 or intra_bdpcm_flag[xTbY][yTbY] is equal to 1, the following applies:

$$qP=\text{Max}(4+(6*(\text{input\_bit\_depth}-8)), Qp'_Y) \quad (8\text{-}954)$$

Otherwise $$qP=Qp'_Y \quad (8\text{-}954)$$

Otherwise, if cIdx is equal to 1 and tu_joint_cbcr_residual [xTbY][yTbY] is equal to 1, the following applies:

$$qP=Qp'_{CbCr} \quad (8\text{-}955)$$

Otherwise, if cIdx is equal to 1, the following applies:

$$qP=Qp'_{Cb} \quad (8\text{-}956)$$

Otherwise (cIdx is equal to 2), the following applies:

$$qP=Qp'_{Cr}$$

In one example, the highlighted conditions may be further changed to:

if transform_skip_flag[xTbY][yTbY] is equal to 1, the following applies.

5.3 Embodiment #4

5.3.1 Scaling process for transform coefficients
Inputs to this process are:
- a luma location (xTbY, yTbY) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)×(nTbH) array d of scaled transform coefficients with elements d[x][y].
The quantization parameter qP is derived as follows:
If cIdx is equal to 0, the following applies:
  if transform_skip_flag[xTbY][yTbY] is equal to 1 or intra_bdpcm_flag[xTbY][yTbY] is equal to 1, the following applies:

$$qP = \text{Max}(4, Qp'_Y) \quad (8\text{-}954)$$

Otherwise $$qP = Qp'_Y \quad (8\text{-}954)$$

Otherwise, if cIdx is equal to 1 and tu_joint_cbcr_residual[xTbY][yTbY] is equal to 1, the following applies:

$$qP = Qp'_{CbCr} \quad (8\text{-}955)$$

Otherwise, if cIdx is equal to 1, the following applies:

$$qP = Qp'_{Cb} \quad (8\text{-}956)$$

Otherwise (cIdx is equal to 2), the following applies:

$$qP = Qp'_{Cr}$$

Figure 17A:
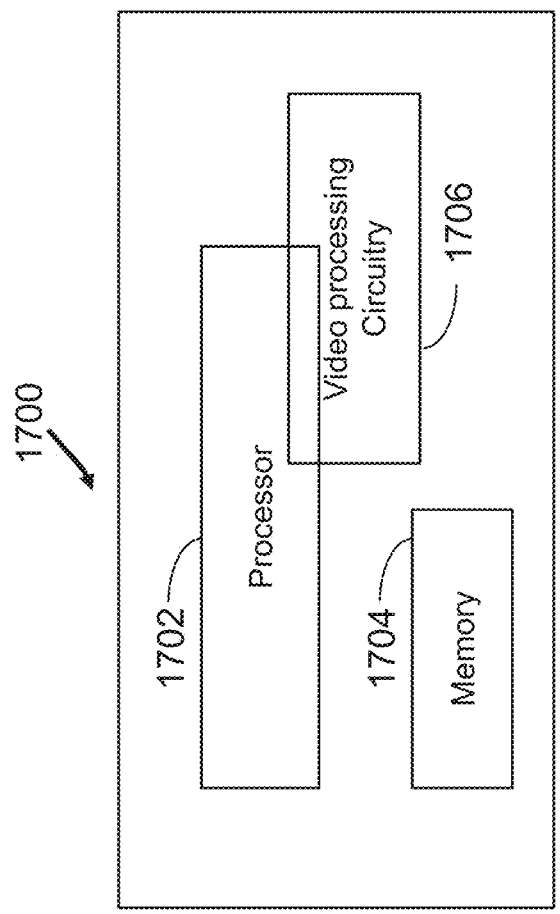
FIGS. 17A and 17B are block diagrams of examples of a video processing apparatus.

In one example, the highlighted conditions may be further changed to:
if transform_skip_flag[xTbY][yTbY] is equal to 1, the following applies:

FIG. 17A is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods described in the present document. The memory (memories) 1704 may be used for storing data and code used for implementing the methods and techniques described herein. The video processing hardware 1706 may be used to implement, in hardware circuitry, some techniques described in the present document. The video processing hardware 1706 may be partially or completely includes within the processor(s) 1702 in the form of dedicated hardware, or graphical processor unit (GPU) or specialized signal processing blocks.

Figure 17B:
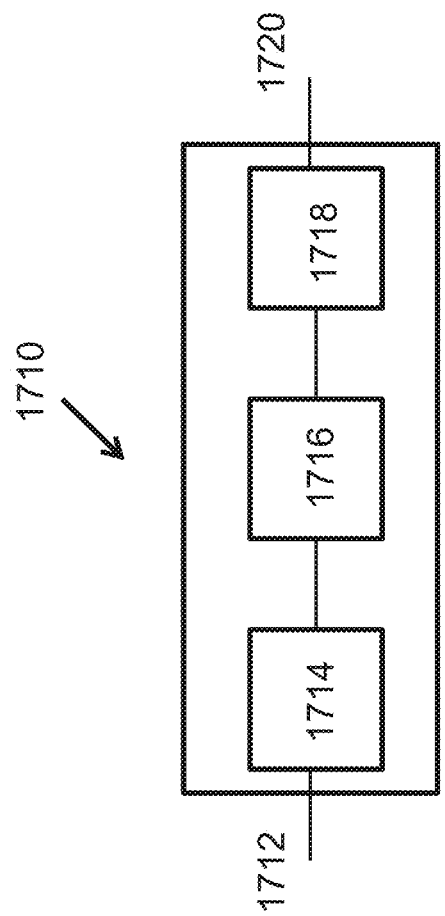

FIG. 17B is another example of a block diagram of a video processing system in which disclosed techniques may be implemented. FIG. 17B is a block diagram showing an example video processing system 1710 in which various techniques disclosed herein may be implemented. Various implementations may include some or all of the components of the system 1710. The system 1710 may include input 1712 for receiving video content. The video content may be received in a raw or uncompressed format, e.g., 8 or 10 bit multi-component pixel values, or may be in a compressed or encoded format. The input 1712 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1710 may include a coding component 1714 that may implement the various coding or encoding methods described in the present document. The coding component 1714 may reduce the average bitrate of video from the input 1712 to the output of the coding component 1714 to produce a coded representation of the video. The coding techniques are therefore sometimes called video compression or video transcoding techniques. The output of the coding component 1714 may be either stored, or transmitted via a communication connected, as represented by the component 1716. The stored or communicated bitstream (or coded) representation of the video received at the input 1712 may be used by the component 1718 for generating pixel values or displayable video that is sent to a display interface 1720. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 18A:
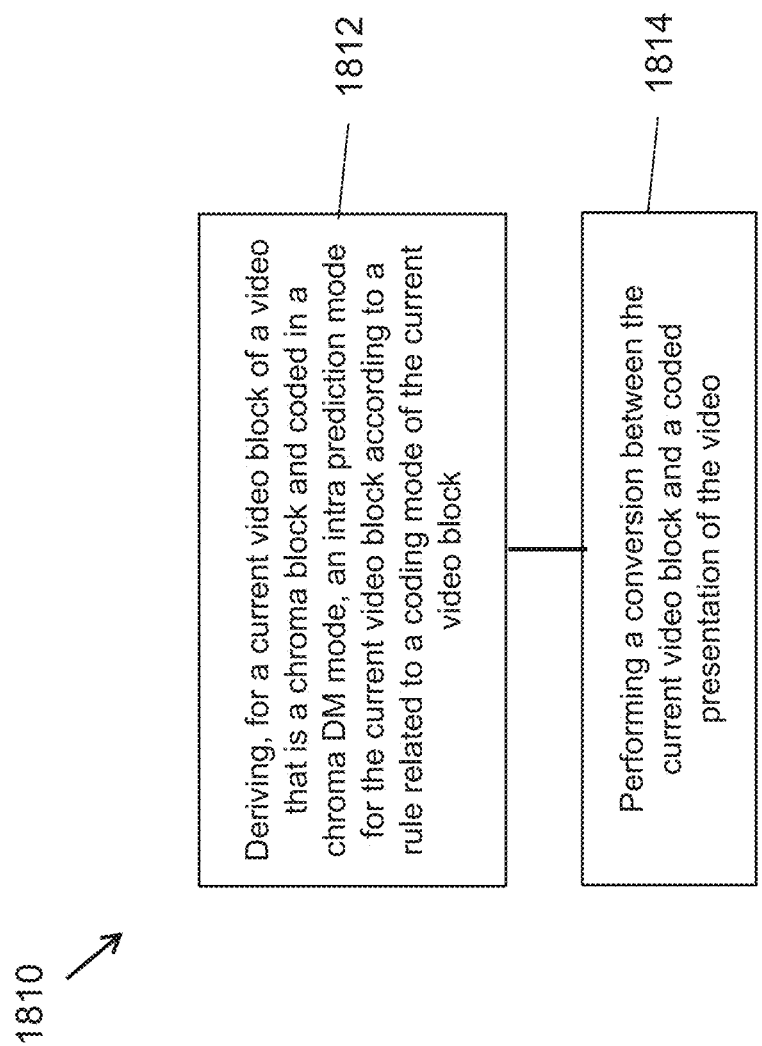

FIG. 18A shows an example method 1810 of video processing. The method 1810 includes, at step 1812, deriving, for a current video block of a video that is a chroma block and coded in a chroma DM mode, an intra prediction mode for the current video block according to a rule related to a coding mode of the current video block. The method 1810 further includes, at step 1814, performing a conversion between the current video block and a coded presentation of the video. In some implementations, the rule specifies to derive the intra prediction mode based on an intra prediction direction of a corresponding luma block used to derive the chroma DM mode and coded using a block differential pulse code modulation representation of a quantized residual block corresponding to the current video block.

Figure 18B:
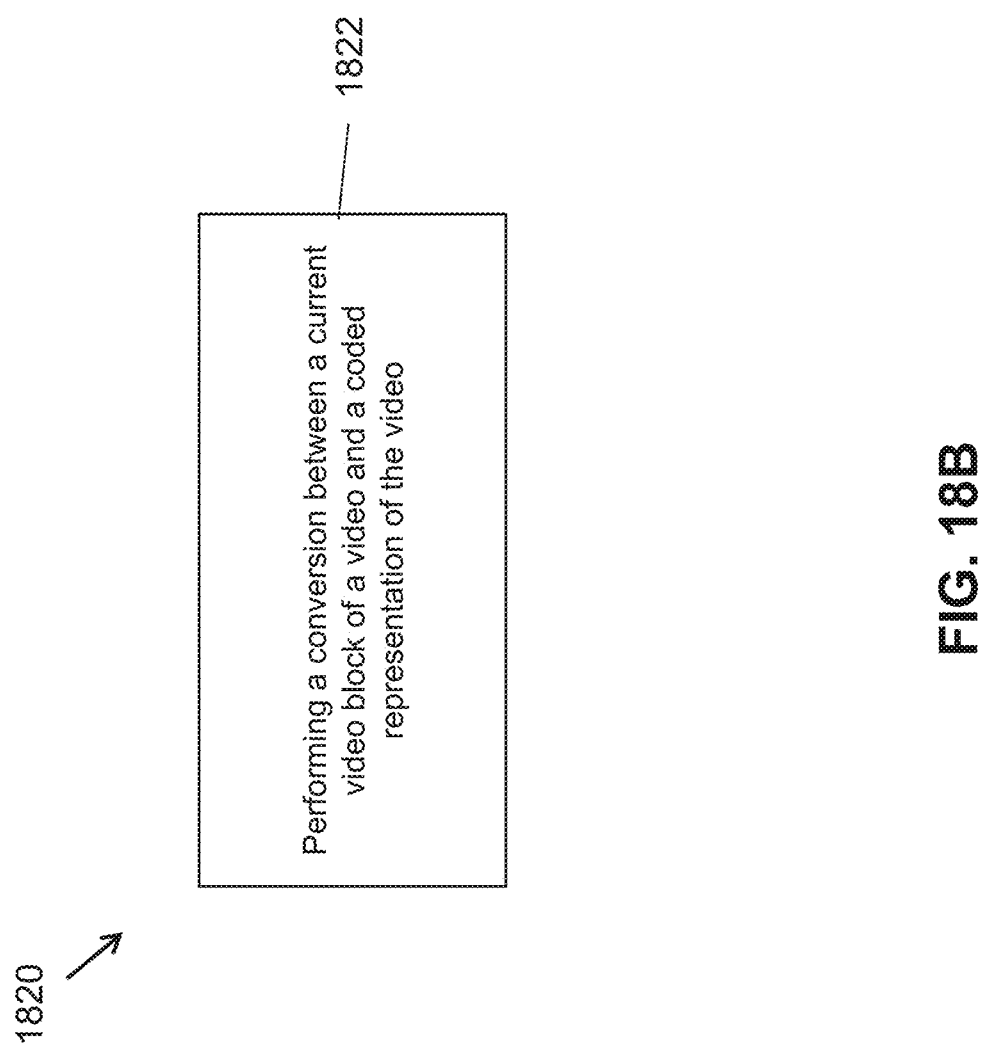

FIG. 18B shows an example method 1810 of video processing. The method 1810 includes, at step 1822, performing a conversion between a current video block of a video and a coded representation of the video. In some implementations, a flag is determined to indicate whether the coded representation includes non-zero coefficients for the current video block that is represented in the coded representation using a block differential pulse code modulation representation of a quantized residual block corresponding to the current video block.

In some implementations, the current video block of the video is a chroma block. In some implementations, an intra prediction method for generating a prediction block for the current video block is used due to a corresponding luma video block of the current video block being coded in a non-intra mode. In some implementations, a chroma DM mode for the current video block is disabled due to a corresponding luma block used to derive the chroma DM mode and not coded using an intra mode. In some implementations, the conversion is performed according to a rule, wherein the current video block is represented in the coded representation using a prediction block computed using a derived mode in which a mode for the prediction block is derived from coding information of a corresponding luma block; and wherein the rule specifies that, due to the use of the derived mode, the prediction block is determined by assuming that the current video block has invalid block vectors.

Figure 18C:
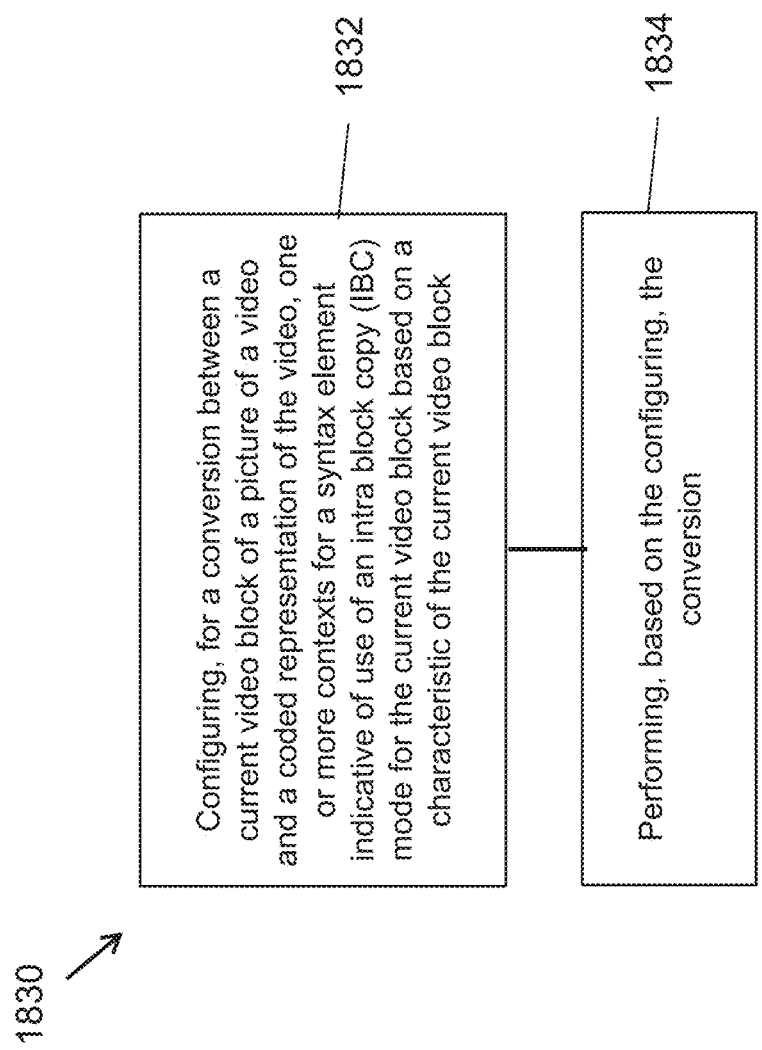

FIG. 18C shows an example method 1830 of video processing. The method 1830 includes, at step 1832, configuring, for a conversion between a current video block of a picture of a video and a coded representation of the video, one or more contexts for a syntax element indicative of use of an intra block copy (IBC) mode for the current video block based on a characteristic of the current video block. The method 1830 further includes, at step 1834, performing, based on the configuring, the conversion, and wherein the use of the IBC mode includes predicting sample values for the current video block using previously-coded samples of another video block in the picture.

Figure 18D:
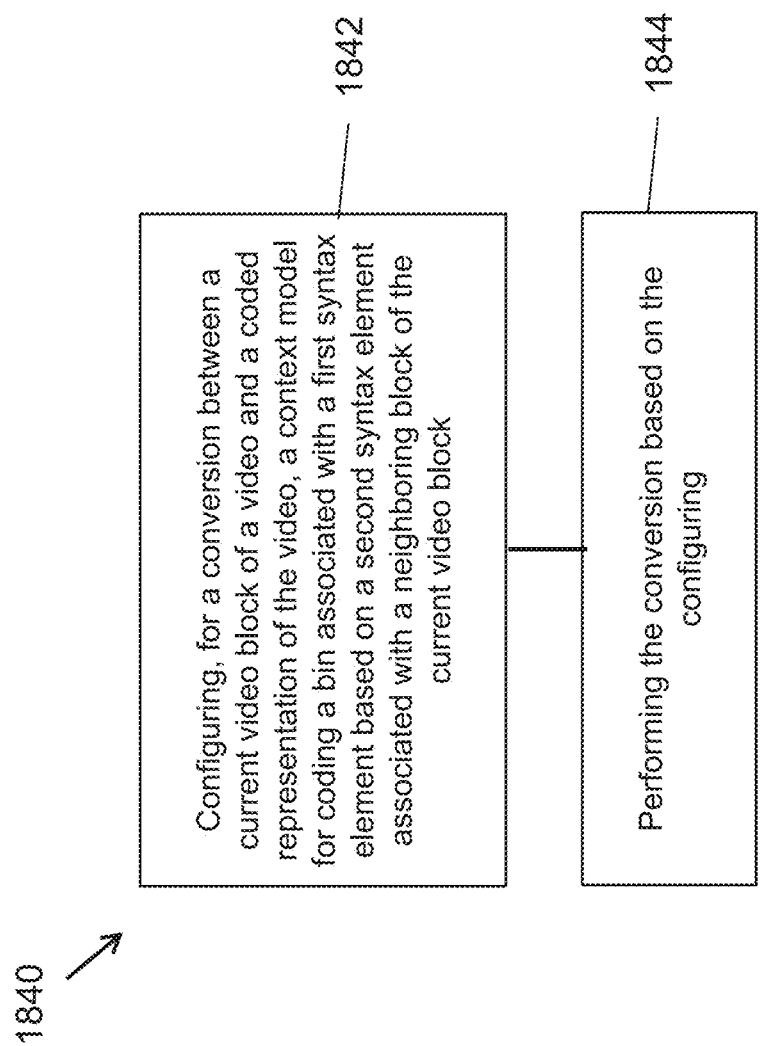

FIG. 18D shows an example method 1840 of video processing. The method 1840 includes, at step 1842, configuring, for a conversion between a current video block of a video and a coded representation of the video, a context model for coding a bin associated with a first syntax element based on a second syntax element associated with a neighboring block of the current video block. The method 1840 further includes, at step 1844, performing the conversion based on the configuring.

Figure 18E:
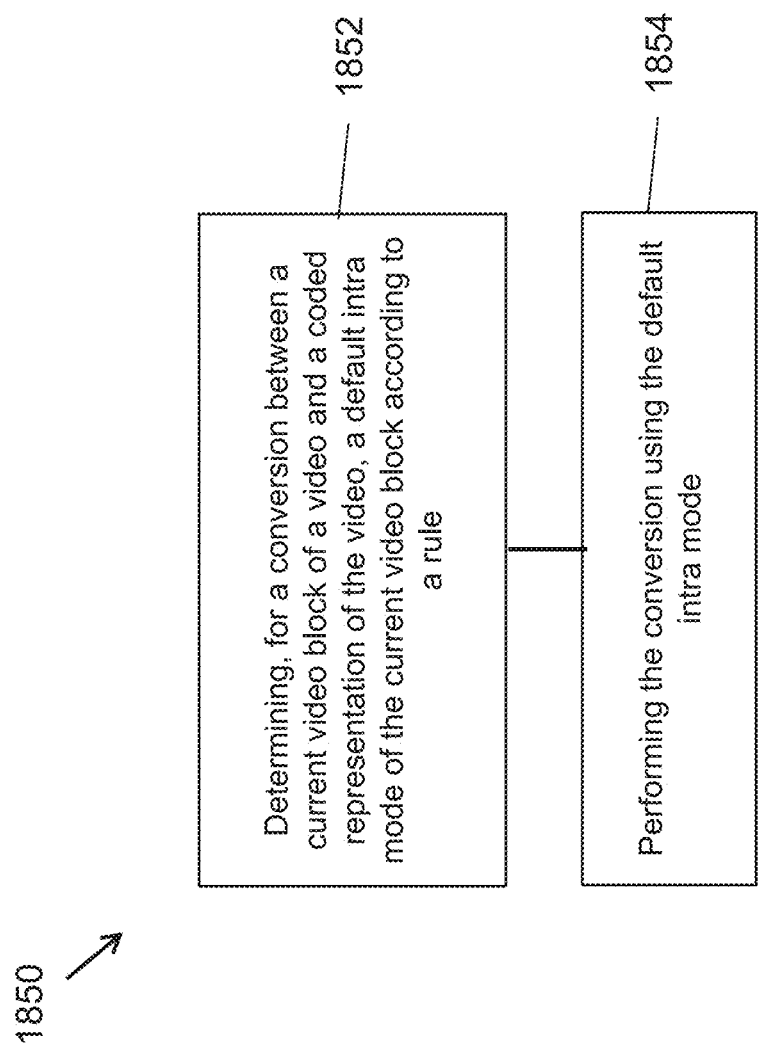

FIG. 18E shows an example method 1850 of video processing. The method 1850 includes, at step 1852, determining, for a conversion between a current video block of a video and a coded representation of the video, a default intra mode of the current video block according to a rule. The method 1850 further includes, at step 1854, performing the conversion using the default intra mode.

Figure 18F:
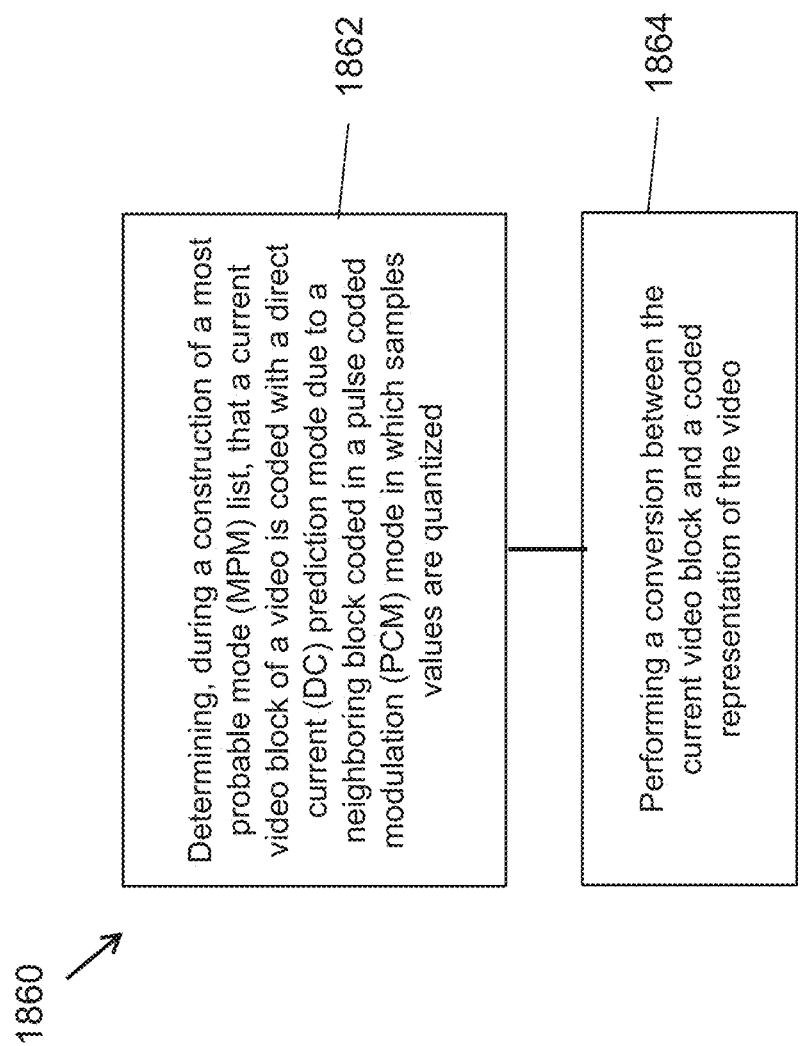

FIG. 18F shows an example method 1860 of video processing. The method 1860 includes, at step 1862, determining, during a construction of a most probable mode (MPM) list, that a current video block of a video is coded with a direct current (DC) prediction mode due to a neighboring block coded in a pulse coded modulation (PCM) mode in which samples values are quantized. The method 1860 further includes, at step 1864, performing a conversion between the current video block and a coded representation of the video.

FIG. 18G shows an example method 1870 of video processing. The method 1870 includes, at step 1872, determining, for a conversion between a current video block of a video and a coded representation of the video, based on coded information of one or more neighboring blocks of the current video blocks, an applicability of a process using a triangle partition mode (TPM) and/or a motion storage process. The method 1870 includes, at step 1874, performing, based on the determining, the conversion, and wherein use of the TPM includes splitting a video block into sub-partitions including at least one non-rectangular partition.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The following clauses describe some embodiments and techniques. The first set of clauses describe certain features and aspects of the disclosed techniques in the previous section.

1. A method of video coding, comprising: determining, during a conversion between a video region of a video and a bitstream representation of the video region, parameters of a deblocking process for the video region based on a palette coding mode condition related to the video region; and using the deblocking process during the conversion using the selected parameters.

2. The method of clause 1, wherein the parameters of the deblocking process are different from parameters used for conversion of another video region coded using an intra coding mode or an inter coding mode or an intra block copy coding mode.

3. The method of any of clauses 1-2, wherein the parameters include a boundary strength value that is determined based on whether or not neighboring video regions of the video region on P-side and Q-side are coded using palette mode coding.

4. The method of clause 3, wherein the boundary strength is equal to zero due to both P-side and Q-side video regions being coded using the palette mode.

5. The method of any of clauses 1-4 wherein the palette mode corresponds to palette mode combining with intra prediction (PCIP) mode or a compound palette mode (CPM).

Item 1 in section 4 provides additional examples and embodiments of the above-described method.

6. A method of video processing, comprising: selecting, during a conversion between a video picture and a bitstream representation of the video picture, deblocking filter parameters for applying a deblocking process to a video block of the video picture based on a coding mode of neighboring video blocks based on an assignment rule; and performing the conversion by applying the deblocking process according to the assignment rule; wherein the assignment rule specifies to use same parameters for cases in which neighboring blocks are compound palette mode coded or coded using another coding mode.

7. The method of clause 6, wherein the other coding mode corresponds to an intra block copy mode.

8. The method of clause 6, wherein the other coding mode corresponds to a palette coding mode.

Item 2 in section 4 provides additional examples and embodiments of the above-described method.

9. A method of video processing, comprising: selecting, during a conversion between a video picture and a bitstream representation of the video picture, deblocking filter parameters for applying a deblocking process to a video block of the video picture based on a coding mode of neighboring video blocks based on an assignment rule; and performing the conversion by applying the deblocking process according to the assignment rule; wherein the assignment rule specifies to use same parameters for cases in which neighboring blocks are palette mode combining with intra prediction (PCIP) mode coded or coded using another coding mode.

10. The method of clause 9, wherein the other coding mode corresponds to an intra block copy mode.

11. The method of clause 9, wherein the other coding mode corresponds to a palette coding mode.

Item 3 in section 4 provides additional examples and embodiments of the above-described method.

12. A method of video processing, comprising: performing a conversion between video blocks of a video picture and a bitstream representation of the video blocks using a palette coding mode in which a palette of component values is used for coding pixels of a corresponding video block, wherein a flag in the bitstream representation provides an indication of presence of non-zero coefficients in the corresponding video block and the flag is used for signalling video blocks coded using a palette coding mode, a combining with intra prediction (PCIP) mode or a compound palette mode (CPM).

13. The method of clause 12, wherein a value of the flag depends on whether or not the corresponding block has escape pixels.

Item 4 in section 4 provides additional examples and embodiments of the above-described method.

14. A method of video processing, comprising: determining, during a conversion between a video picture comprising multiple video blocks and a bitstream representation of the video picture, an applicability of a deblocking process for each of the multiple video blocks based on a palette coding mode condition related to the each of the multiple video blocks; and selectively using, based on the applicability, the deblocking process on the multiple blocks during the conversion.

15. The method of clause 14, wherein the determining the applicability determines that the deblocking process is inapplicable to blocks coded using a palette mode or a combining with intra prediction (PCIP) mode or a compound palette mode (CPM).

16. The method of clause 14, wherein the determining the applicability includes determining that P-side samples or Q-side samples are inapplicable in case that a P-side block or a Q-side block is coded using the palette mode or the PCIP mode or the CPM mode, respectively.

Item 5 in section 4 provides additional examples and embodiments of the above-described method.

17. A method of video processing, comprising: performing a conversion between a video frame comprising multiple video blocks and a bitstream representation of the video frame that is coded using a compound palette mode (CPM); wherein the bitstream representation includes an indication of the CPM mode at a video region level that is separate from indications for an intra mode, an inter mode, an intra block copy mode or a palette mode applicable to the video region.

18. The method of clause 17, wherein the video region corresponds to a transform unit or a prediction unit or a coding block unit.

19. The method of any of clauses 17-18, wherein the bitstream representation includes the indication of the CPM mode after indications for the intra mode, the inter mode, the intra block copy mode or the palette mode applicable to the video region.

Item 6 in section 4 provides additional examples and embodiments of the above-described method.

20. A method of video processing, comprising: performing a conversion between video blocks of a video picture and a bitstream representation of the video blocks using a coding mode in which a palette of component values is used for coding pixels of a corresponding video block, wherein syntax elements related to the palette coding mode are selectively included in the bitstream representation for a given video block based on a characteristic of a colour component to which the given video block belongs; wherein the coding more includes a palette coding mode, a combining with intra prediction (PCIP) mode or a compound palette mode (CPM).

21. The method of video processing, wherein syntax elements related to the palette coding mode are selectively included further based on a partition structure or a plane coding used for the given video block.

22. The method of any of clauses 20-21, wherein the syntax elements are included only for dual tree partition structure.

23. The method of any of clauses 20-21, wherein, due to the video picture being in 4:0:0 format, and the given video block being a chroma block, syntax elements are skipped.

Item 7 in section 4 provides additional examples and embodiments of the above-described method.

24. The method of clause 20, wherein the given video block corresponds to a chroma component and wherein the syntax elements related to the palette coding mode are selectively included based on a coded information of one or more selected blocks of a luma block corresponding to the given video block.

25. The method of clause 24, wherein the one or more selected block of the luma block correspond to a smallest coding unit or a smallest prediction unit or a smallest transform unit size.

Item 8 in section 4 provides additional examples and embodiments of the above-described method.

26. The method of any of clauses 20-25, wherein the coding mode is the PCIP mode.

Item 9 in section 4 provides additional examples and embodiments of the above-described method.

27. A method of video processing, comprising: performing a conversion between a video picture comprising multiple video blocks and a bitstream representation of the video picture in which at least some of the multiple blocks are coded using a predictive coding mode and wherein a video block is coded using a compound palette mode (CPM) that is identified separately from or as a special case of other predictive coding modes used for coding other video blocks of the video picture.

28. The method of clause 27, wherein the other predictive coding modes include an intra mode, an intra block copy, a palette mode and a CPM mode for intra slices or I pictures or intra tile groups.

Item 10 in section 4 provides additional examples and embodiments of the above-described method.

29. The method of clause 27, wherein the CPM is identified as the special case of other predictive coding modes in the bitstream representation and syntax elements signalling the CPM are selectively signalled based on a type of the other predictive mode of which the CPM is the special case.

30A. The method of clause 29, wherein the type of the other predictive mode is intra mode, and wherein signalling of the syntax elements of the CPM is skipped.

30B. The method of clause 29, wherein the type of the other predictive mode is a skipped mode, and wherein signalling of the syntax elements of the CPM is skipped.

Item 11 in section 4 provides additional examples and embodiments of the above-described method.

31. A video processing method, comprising: performing a first conversion between a current video block and a first bitstream representation of the current video block in which the current video block is coded using a compound palette mode (CPM), the current video block having a motion vector associated with the current video block; and performing a second conversion between a next video block and a second bitstream representation of the next video block in which a motion prediction using the motion vector associated with the current video block is used during the second conversion.

32. The method of clause 31, wherein the motion prediction is used as a merge candidate for the second conversion.

33. The method of clause 31 or 32, wherein the motion prediction is used as a history based motion vector predictor during the second conversion.

Item 12 in section 4 provides additional examples and embodiments of the above-described method.

34. A video processing method, comprising: performing a first conversion between a current video block and a first bitstream representation of the current video block in which the current video block is coded using combining with intra prediction (PCIP) mode, the current video block having an intra prediction direction associated with the current video block; and performing a second conversion between a next video block and a second bitstream representation of the next video block in which an intra mode predictor based on the intra prediction direction associated with the current video block is used during the second conversion.

35. The method of clause 34, wherein the intra prediction direction associated with the current video block is used as a most probable mode candidate during the second conversion.

Item 13 in section 4 provides additional examples and embodiments of the above-described method.

36. A video processing method, comprising: determining a maximum number of entries of a palette used during a conversion between a current video block of a video and a bitstream representation of the video, and performing the conversion using the maximum number, wherein a field in the bitstream representation signals changing of the maximum number across a video unit.

37. The method of clause 36, wherein the video unit corresponds to a coding tree block or a coding unit or a prediction unit or a transform unit.

38. The method of clauses 36-37, wherein the maximum number is based on coded information of the current video block.

Item 14 in section 4 provides additional examples and embodiments of the above-described method.

39. A video processing method, comprising: determining, due to using a palette coding mode during a conversion between a video picture comprising one or more video blocks and a bitstream representation of the video picture, that using a scaling matrix is disabled; and performing the conversion based on the determining that using the scaling matrix is disabled.

40. A video processing method, comprising: determining, due to using a palette coding mode during a conversion between a video picture comprising one or more video blocks and a bitstream representation of the video picture, that using a scaling matrix is permitted; and performing the conversion based on the determining that using the scaling matrix is permitted.

Item 15 in section 4 provides additional examples and embodiments of the above-described method.

41. The method of any of clauses 1 to 40, wherein the method is applied upon determining a characteristic of the video for which the conversion is being performed.

42. The method of clause 41, wherein the characteristic of video comprises a content type of the video.

43. The method of clause 41, wherein the characteristic of video comprises block dimensions used for the conversion.

44. The method of clause 41, wherein the characteristic of video comprises a partition tree structure used for the conversion.

Item 25 in section 4 provides additional examples and embodiments of the above-described method.

46. A video processing method, comprising: configuring, based on one or more characteristics of a current video block, a context for coding a usage of an intra block copy (IBC) mode on the current video block; and performing, based on the configuring, a conversion between the current video block and a bitstream representation of the current video block.

47. The method of clause 46, wherein the one or more characteristics comprise a block size of the current video block.

48. The method of clause 46, wherein the one or more characteristics comprise a shape of the current video block.

49. The method of clause 48, wherein the shape is square or non-square.

Item 16 in section 4 provides additional examples and embodiments of the above-described method.

50. The method of clause 46, wherein the configuring is further based on a coding mode of a neighboring block of the current video block.

Item 17 in section 4 provides additional examples and embodiments of the above-described method.

51. The method of clause 46, wherein the context comprises a first syntax element, and wherein the configuring is further based on a second syntax element associated with a neighboring block of the current video block.

Item 18 in section 4 provides additional examples and embodiments of the above-described method.

52. A video processing method, comprising: making a decision, for a current video block, regarding a selective inclusion of an indication of a coding mode in a bitstream representation of the current video block, wherein the coding mode uses an identity transform; and performing, based on the decision, a conversion between the current video block and the bitstream representation.

53. The method of clause 52, wherein the coding mode is a transform skip mode or a quantized residual block differential pulse-code modulation (QR-BDPCM).

Item 23 in section 4 provides additional examples and embodiments of the above-described method.

54. The method recited in any of clauses 1-53, wherein the conversion comprises generating pixel values of the video region from the bitstream representation.

55. The method recited in any of clauses 1-53, wherein the conversion comprises generating the bitstream representation from pixel values of the video region.

56. A video processing apparatus comprising a processor configured to implement a method recited in any one or more of clauses 1 to 55.

57. A computer readable medium storing program code that, when executed, causes a processor to implement a method recited in any one or more of clauses 1 to 55.

The second set of clauses describe certain features and aspects of the disclosed techniques in the previous section, for example, Example Implementations 16 to 25.

1. A method of video processing, comprising: deriving, for a current video block of a video that is a chroma block and coded in a chroma DM mode, an intra prediction mode for the current video block according to a rule related to a coding mode of the current video block; and performing a conversion between the current video block and a coded presentation of the video, wherein the rule specifies to derive the intra prediction mode based on an intra prediction direction of a corresponding luma block used to derive the chroma DM mode and coded using a block differential pulse code modulation representation of a quantized residual block corresponding to the current video block.

2. The method of clause 1 wherein the intra prediction mode used in the chroma DM mode is a vertical mode in a case that the intra prediction direction of the corresponding luma block is vertical.

3. The method of clause 1, wherein the intra prediction mode used in the chroma DM mode is a horizontal mode in a case that the intra prediction direction of the corresponding luma block is horizontal.

4. The method of clause 1, wherein the rule specifies to derive the intra prediction mode based on use of a compound IBC and/or a palette mode.

5. The method of clause 4, wherein the intra prediction mode is planar or horizontal or vertical prediction mode.

6. A method of video processing, comprising: performing a conversion between a current video block of a video that is a chroma block and a coded representation of the video, wherein an intra prediction method for generating a prediction block for the current video block is used due to a corresponding luma video block of the current video block being coded in a non-intra mode.

7. The method of clause 6, wherein the intra prediction method corresponds to a vertical intra prediction in a case that the corresponding luma block is coded with a palette mode and/or a variance of the palette mode, the palette mode allowing to represent or reconstruct the current video block using a palette of representative sample values.

8. The method of clause 6, wherein the prediction block is filled by horizontal predictions in a case that the corresponding luma block is coded with a palette mode and/or a variance of the palette mode, the palette mode allowing to represent or reconstruct the current video block using a palette of representative sample values.

9. The method of clause 6, wherein the prediction block is filled by planar predictions in a case that the corresponding luma block is coded with a palette mode and/or a variance of the palette mode, the palette mode allowing to represent or reconstruct the current video block using a palette of representative sample values.

10. The method of clause 6, wherein the prediction block is filled by DC predictions in a case that the corresponding luma block is coded with a palette mode and/or a variance of the palette mode, the palette mode allowing to represent or reconstruct the current video block using a palette of representative sample values.

11. The method of clause 6, wherein the prediction block is filled by an intra prediction mode in a case that the corresponding luma block is coded with a palette mode and/or a variance of the palette mode, the palette mode allowing to represent or reconstruct the current video block using a palette of representative sample values.

12. The method of clause 6, wherein the prediction block is generated based on an intra prediction mode of a neighboring luma block and/or an intra prediction mode of a neighboring chroma block.

13. The method of clause 6, wherein the corresponding luma block is coded with an IBC mode and/or a variance of the IBC mode, the IBC mode allowing to predict sample values for the current video block using previously-coded samples of another video block.

14. The method of clause 6, wherein the corresponding luma block is coded with a pulse code modulation (PCM) mode and/or a variance of the PCM mode, the PCM mode allowing to digitally represents a sampled analog signal.

15. The method of clause 6, wherein the corresponding luma block is coded with QR-BDPCM mode in which residual samples in a residual block are quantized and a differential pulse-code modulation is applied to the quantized residual samples.

16. The method of clause 6, wherein the intra prediction method corresponds to an intra prediction mode assigned to PCM blocks during constructing a most probable mode (MPM) list.

17. The method of clause 6, wherein the intra prediction method corresponds to an intra prediction mode assigned to luma PCM blocks.

18. The method of clause 6, wherein the intra prediction method corresponds to an intra prediction mode assigned to chroma PCM blocks.

19. The method of clause 6, wherein the intra prediction method corresponds to a first intra prediction mode in a MPM list of the corresponding luma block.

20. A method of video processing, comprising: configuring, for a conversion between a current video block of a picture of a video and a coded representation of the video, one or more contexts for a syntax element indicative of use of an intra block copy (IBC) mode for the current video block based on a characteristic of the current video block; and performing, based on the configuring, the conversion, and wherein the use of the IBC mode includes predicting sample values for the current video block using previously-coded samples of another video block in the picture.

21. The method of clause 20, wherein the characteristic includes a block size of the current video block.

22. The method of clause 20, wherein the syntax element is signalled by using different contexts for video blocks having different block sizes.

23. The method of clause 20, wherein the syntax element is signalled by using a single context for video blocks whose block sizes are smaller than or no greater than a predetermined value.

24. The method of clause 20, wherein the syntax element is signalled by using a single context for video blocks whose block sizes are greater than or no smaller than a predetermined value.

25. The method of clause 23 or 24, wherein the predetermined value is determined based on at least one of i) a content type of the video, ii) a message signalled in a parameter set, header, coding unit, transform unit, or prediction unit, iii) an indication of a colour format of the video, iv) a coding tree structure, v) a type of a slice, tile group, or a picture, vi) a colour component, vii) a temporal layer identification (ID), viii) information related to a standard, or xi) information signalled to a decoder.

26. The method of clause 20, wherein the characteristic includes a block shape of the current video block.

27. The method of clause 26, wherein the syntax element is signalled by using different contexts for video blocks having different block sizes.

28. The method of clause 20, wherein the one or more contexts are different based on whether a type of a slice including the current video block is an I slice or not.

29. The method of clause 28, wherein the configuring the one or more contexts is further based on another syntax element associated with a neighboring block of the current video block.

30. The method of clause 20, wherein only one context is configured to code the syntax element.

31. The method of clause 20, wherein the current video block is included in a specific type of a slice or a picture.

32. The method of clause 20, wherein the syntax element is dependent on whether one or more neighboring blocks of the current video block is coded with the IBC mode or not.

33. The method of clause 32, wherein the one or more contexts are configured in a case that at least one of the neighboring blocks are coded with the IBC mode.

34. A method of video processing, comprising: configuring, for a conversion between a current video block of a video and a coded representation of the video, a context model for coding a bin associated with a first syntax element based on a second syntax element associated with a neighboring block of the current video block; and performing the conversion based on the configuring.

35. The method of clause 34, wherein the first syntax element is used to indicate use of a combined intra-inter prediction mode in which an inter prediction and an intra prediction are combined or a triangular prediction mode (TPM) in which a video block is split into sub-partitions and at least one of the sub-partitions is a non-rectangular partition.

36. The method of clause 34, wherein the second syntax element relates to use of an IBC mode of the neighboring block.

37. A video processing method, comprising: performing a conversion between a current video block of a video and a coded representation of the video, wherein a flag is determined to indicate whether the coded representation includes non-zero coefficients for the current video block that is represented in the coded representation using a block differential pulse code modulation representation of a quantized residual block corresponding to the current video block.

38. The method of clause 37, wherein the flag is inferred to 1 for the current video block.

39. The method of clause 37 or 38, wherein the flag is for a luma component and/or a chroma component.

40. A method of video processing, comprising: performing a conversion between a current video block of a video that is a chroma block and a coded representation of the video, wherein a chroma DM mode for the current video block is disabled due to a corresponding luma block used to derive the chroma DM mode and not coded using an intra mode.

41. The method of clause 40, wherein the chroma DM mode is not applied in a case that the corresponding luma block is not coded with an intra mode.

42. The method of clause 40, wherein the chroma DM mode is not applied in a case that the corresponding luma block is coded with an IBC mode and/or a variance of the IBC mode, the IBC mode allowing to predict sample values for the current video block using previously-coded samples of another video block.

43. The method of clause 40, wherein the chroma DM mode is not applied in a case that the corresponding luma block is coded with a palette mode and/or a variance of the palette mode, the palette mode allowing to represent or reconstruct the current video block using a palette of representative sample values.

44. The method of clause 40, wherein the chroma DM mode is not applied in a case that the corresponding luma block is coded with a pulse code modulation (PCM) mode and/or a variance of the PCM mode, the PCM mode allowing to digitally represents a sampled analog signal.

45. The method of any of clauses 40 to 44, wherein an indication of the chroma DM mode is not included in the coded representation of the video in a case that the chroma DM mode is not allowed for the current video block.

46. The method of any of clauses 40 to 44, wherein an indication of the chroma DM mode is included in the coded representation of the video in a case that a conformance bitstream satisfies that decoded information of a corresponding syntax element is not equal to a specific value.

47. A video processing method, comprising: performing a conversion between a current video block of a video that is a chroma block and a coded representation of the video according to a rule, wherein the current video block is represented in the coded representation using a prediction block computed using a derived mode in which a mode for the prediction block is derived from coding information of a corresponding luma block; and wherein the rule specifies that, due to the use of the derived mode, the prediction block is determined by assuming that the current video block has invalid block vectors.

48. The method of clause 47, wherein the prediction block is filled with default values.

49. The method of clause 48, wherein the default values are dependent on an input and/or an internal bit-depth.

50. The method of clause 47, wherein a prediction mode of the corresponding luma block is non-intra mode.

51. The method of clause 50, wherein the prediction mode of the corresponding luma block is an IBC mode and/or a variance of the IBC mode, the IBC mode allowing to predict sample values for the current video block using previously-coded samples of another video block.

52. The method of clause 50, wherein the prediction mode of the corresponding luma block is a palette mode and/or a variance of the palette mode, the palette mode allowing to represent or reconstruct the current video block using a palette of representative sample values.

53. A method of video processing, comprising: determining, for a conversion between a current video block of a video and a coded representation of the video, a default intra mode of the current video block according to a rule; and performing the conversion using the default intra mode.

54. The method of clause 53, wherein, in absence of additional information, it is assumed that the default mode is used for representing the current video block into the coded representation.

55. The method of clause 53, wherein the default intra mode is a direct current (DC) mode, a planar mode, a vertical mode, or a horizontal mode.

56. The method of clause 53, wherein the default intra mode is used as a most probable mode (MPM) in an intra mode coding process.

57. The method of clause 53, wherein, for the current video block that is a chroma block coded with a DM mode, a default mode of a corresponding luma block is used to derive a DM mode of the current video block.

58. The method of clause 53, wherein the current video block is coded with a non-intra mode.

59. The method of clause 53, wherein the current video block is coded with an IBC mode, an inter mode, a QR-DPCM mode, a PCM mode, or a palette mode.

60. A method of video processing, comprising: determining, during a construction of a most probable mode (MPM) list, that a current video block of a video is coded with a direct current (DC) prediction mode due to a neighboring block coded in a pulse coded modulation (PCM) mode in which samples values are quantized; and performing a conversion between the current video block and a coded representation of the video.

61. A method of video processing, comprising: determining, for a conversion between a current video block of a video and a coded representation of the video, based on coded information of one or more neighboring blocks of the current video blocks, an applicability of a process using a triangle partition mode (TPM) and/or a motion storage process; and performing, based on the determining, the conversion, and wherein use of the TPM includes splitting a video block into sub-partitions including at least one non-rectangular partition.

62. The method of clause 61, wherein the determining determines not to apply the process using the TPM in a case that the neighboring blocks are coded with at least one of an IBC mode, a palette mode, a TS mode, a quantized residual block differential pulse-code modulation (QR-BDPCM) mode.

63. The method of clause 61, wherein the determining determines to apply a modified TPM-related process and/or a motion storage process due to the neighboring blocks coded with at least one of an IBC mode, a palette mode, a TS mode, a quantized residual block differential pulse-code modulation (QR-BDPCM) mode.

64. The method of any of clauses 1 to 63, wherein the performing of the conversion includes generating the coded representation from the video.

65. The method of any of clauses 1 to 63, wherein the performing of the conversion includes generating the video from the coded representation.

66. A video processing apparatus comprising a processor configured to implement a method recited in any one or more of clauses 1 to 65.

67. A computer readable medium storing program code that, when executed, causes a processor to implement a method recited in any one or more of clauses 1 to 65.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    deriving, for a conversion between a current chroma block of a video and a bitstream of the video, a chroma prediction mode for the current chroma block based on a luma coding information of a first luma block corresponding to the current chroma block; and
    performing the conversion based on the derived chroma prediction mode,
    wherein in response to the first luma block being coded with a differential coding mode in which differences between quantized residuals derived with a luma prediction mode and predictions of the quantized residuals are included in the bitstream:
        the luma prediction mode is a vertical prediction mode or a horizontal prediction mode, and
        the chroma prediction mode is identical to the luma prediction mode, and
        wherein when the first luma block is a neighboring block of a second luma block, a default mode is assigned to the first luma block for constructing an intra mode candidate list of the second luma block in response to the second luma block and the first luma block being in a different slice or tile.

2. The method of claim 1, wherein the first luma block covers a corresponding center position of the current chroma block.

3. The method of claim 1, wherein the chroma prediction mode being identical to the luma prediction mode is further based on a value of a syntax element intra_chroma_pred_mode, and wherein the syntax element intra_chroma_pred_mode is used to specify a mapping relation between a chroma component intra mode and a luma component intra mode.

4. The method of claim 3, wherein the syntax element intra_chroma_pred_mode specifies that a derived mode (DM) is applied on the current chroma block, and wherein in the DM mode, the chroma component intra mode is identical to the luma component intra mode.

5. The method of claim 1, wherein the chroma prediction mode is the vertical prediction mode when the luma prediction mode is the vertical prediction mode.

6. The method of claim 1, wherein the chroma prediction mode is the horizontal prediction mode when the luma prediction mode is a horizontal prediction mode.

7. The method of claim 3, wherein in response to the first luma block being coded with a first prediction mode or a variance of the first prediction mode, the chroma prediction mode is derived as a DC mode,
    wherein in the first prediction mode, reconstructed samples are represented by a set of representative colour values, and
    wherein the set of representative colour values comprises at least one of palette predictors, escaped samples, or palette information included in the bitstream.

8. The method of claim 3, wherein in response to the first luma block being coded with a second prediction mode or a variance of the second prediction mode, the chroma prediction mode is derived as a DC mode,
    wherein in the second prediction mode, prediction samples are derived from blocks of sample values of a same decoded picture as determined by block vectors.

9. The method of claim 1, wherein when the first luma block is the neighboring block of the second luma block, the default mode is assigned to the first luma block for constructing the intra mode candidate list of the second luma block in response to the first luma block being coded with a first prediction mode or a second prediction mode,
    wherein in the first prediction mode, reconstructed samples are represented by a set of representative colour values,
    wherein the set of representative colour values comprises at least one of palette predictors, escaped samples, or palette information included in the bitstream, and
    wherein in the second prediction mode, prediction samples are derived from blocks of sample values of a same decoded picture as determined by block vectors.

10. The method of claim 9, wherein the default mode is a planar mode.

11. The method of claim 1, wherein the conversion comprises encoding the current chroma block into the bitstream.

12. The method of claim 1, wherein the conversion comprises decoding the current chroma block from the bitstream.

13. An apparatus for processing video data comprising a processor and a non-transitory memory with instructions thereon, wherein the instructions upon execution by the processor, cause the processor to:
    derive, for a conversion between a current chroma block of a video and a bitstream of the video, a chroma prediction mode for the current chroma block based on a luma coding information of a first luma block corresponding to the current chroma block; and
    perform the conversion based on the derived chroma prediction mode,
    wherein in response to the first luma block being coded with a differential coding mode in which differences between quantized residuals derived with a luma prediction mode and predictions of the quantized residuals are included in the bitstream:
the luma prediction mode is a vertical prediction mode or a horizontal prediction mode, and
the chroma prediction mode is identical to the luma prediction mode, and
wherein when the first luma block is a neighboring block of a second luma block, a default mode is assigned to the first luma block for constructing an intra mode candidate list of the second luma block in response to the second luma block and the first luma block being in a different slice or tile.

14. The apparatus of claim 13, wherein the first luma block covers a corresponding center position of the current chroma block.

15. The apparatus of claim 13, wherein the chroma prediction mode being identical to the luma prediction mode is further based on a value of a syntax element intra_chroma_pred_mode, and wherein the syntax element intra_chroma_pred_mode is used to specify a mapping relation between a chroma component intra mode and a luma component intra mode,
wherein the syntax element intra_chroma_pred_mode specifies that a derived mode (DM) is applied on the current chroma block, and
wherein in the DM mode, the chroma component intra mode is identical to the luma component intra mode.

16. The apparatus of claim 13, wherein the chroma prediction mode is the vertical prediction mode when the luma prediction mode is the vertical prediction mode, or the chroma prediction mode is the horizontal prediction mode when the luma prediction mode is the horizontal prediction mode.

17. The apparatus of claim 15, wherein in response to the first luma block being coded with a first prediction mode or a variance of the first prediction mode, the chroma prediction mode is derived as a DC mode, wherein in the first prediction mode, reconstructed samples are represented by a set of representative colour values, and wherein the set of representative colour values comprises at least one of palette predictors, escaped samples, or palette information included in the bitstream, or
wherein in response to the first luma block being coded with a second prediction mode or a variance of the second prediction mode, the chroma prediction mode is derived as a DC mode, and wherein in the second prediction mode, prediction samples are derived from blocks of sample values of a same decoded picture as determined by block vectors.

18. A non-transitory computer-readable storage medium storing instructions that cause a processor to:
derive, for a conversion between a current chroma block of a video and a bitstream of the video, a chroma prediction mode for the current chroma block based on a luma coding information of a first luma block corresponding to the current chroma block; and
perform the conversion based on the derived chroma prediction mode,
wherein in response to the first luma block being coded with a differential coding mode in which differences between quantized residuals derived with a luma prediction mode and predictions of the quantized residuals are included in the bitstream:
the luma prediction mode is a vertical prediction mode or a horizontal prediction mode, and
the chroma prediction mode is identical to the luma prediction mode, and
wherein when the first luma block is a neighboring block of a second luma block, a default mode is assigned to the first luma block for constructing an intra mode candidate list of the second luma block in response to the second luma block and the first luma block being in a different slice or tile.

19. A non-transitory computer-readable recording medium storing a bitstream of a video which is generated by a method performed by a video processing apparatus, wherein the method comprises:
deriving, for a current chroma block of a video, a chroma prediction mode for the current chroma block based on a luma coding information of a first luma block corresponding to the current chroma block; and
generating the bitstream based on the derived chroma prediction mode,
wherein in response to the first luma block being coded with a differential coding mode in which differences between quantized residuals derived with a luma prediction mode and predictions of the quantized residuals are included in the bitstream:
the luma prediction mode is a vertical prediction mode or a horizontal prediction mode, and
the chroma prediction mode is identical to the luma prediction mode, and
wherein when the first luma block is a neighboring block of a second luma block, a default mode is assigned to the first luma block for constructing an intra mode candidate list of the second luma block in response to the second luma block and the first luma block being in a different slice or tile.

20. The non-transitory computer-readable storage medium of claim 18, wherein the first luma block covers a corresponding center position of the current chroma block.

* * * * *